US012754629B2

(12) United States Patent
Lim

(10) Patent No.: US 12,754,629 B2
(45) Date of Patent: Oct. 6, 2026

(54) ELECTRONIC DEVICE

(71) Applicant: SAMSUNG DISPLAY CO., LTD., Yongin-si (KR)

(72) Inventor: Sanghyun Lim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/887,102

(22) Filed: Sep. 17, 2024

(65) Prior Publication Data

US 2025/0251815 A1 Aug. 7, 2025

(30) Foreign Application Priority Data

Feb. 6, 2024 (KR) ........................ 10-2024-0017966

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 2203/04111* (2013.01); *G06F 2203/04112* (2013.01)

(58) Field of Classification Search
None
See application file for complete search history.

(56) References Cited

U.S. PATENT DOCUMENTS 11,768,559 B2 9/2023 Shin et al.
2012/0169631 A1* 7/2012 Ahn ...................... G06F 3/0443 345/173
2012/0268144 A1* 10/2012 Ahn ...................... G06F 3/0446 324/679
2013/0141119 A1* 6/2013 Yilmaz ............... G06F 3/04164 324/660
2016/0041677 A1 2/2016 Tahara
2016/0349906 A1* 12/2016 Lee ..................... G06F 3/04166
2020/0089343 A1* 3/2020 Kadowaki ............. G06F 3/0442
2020/0249793 A1* 8/2020 Xu ........................ G06F 3/0446

FOREIGN PATENT DOCUMENTS

JP 5819565 B1 11/2015
KR 10-1768052 B1 8/2017
KR 10-1811417 B1 12/2017
KR 10-2023-0004176 A 1/2023

* cited by examiner

*Primary Examiner* — Christopher R Lamb
(74) *Attorney, Agent, or Firm* — F. CHAU & ASSOCIATES, LLC

(57) ABSTRACT

An electronic device including a sensor layer and a sensor driver driving the sensor layer and selectively operating in a first mode for sensing a touch input and a second mode for sensing a pen input. The sensor layer includes first electrode groups arranged along a first direction. Second electrode groups are arranged along a second direction crossing the first direction. The second electrode groups cross the first electrode groups and include a (2-1)-th electrode group and a (2-2)-th electrode group spaced apart from each other in the second direction. A first crossing trace line is connected to one side of the (2-1)-th electrode group. A second crossing trace line is connected to one side of the (2-2)-th electrode group. The one side of the (2-1)-th electrode group and the one side of the (2-2)-th electrode group are opposite to each other with respect to the first direction.

31 Claims, 38 Drawing Sheets

ELECTRONIC DEVICE

CROSS-REFERENCE TO RELATED APPLICATIONS

This application claims priority under 35 U.S.C. § 119 to Korean Patent Application No. 10-2024-0017966, filed on Feb. 6, 2024 in the Korean Intellectual Property Office, the disclosure of which is incorporated by reference in its entirety herein.

TECHNICAL FIELD

The present disclosure herein relates to an electronic device capable of sensing an input by a pen.

DISCUSSION OF RELATED ART

Multimedia electronic devices such as televisions, mobile phones, tablet computers, laptops, navigation devices, and game consoles include a display device for displaying an image. In addition to typical input methods, such as a button, a keyboard, a mouse, etc., the electronic devices may include a sensor layer (e.g., an input sensor) providing a touch-based input method which enables a user to input information or commands easily, intuitively, and conveniently. The sensor layer may sense a user's touch or pressure. However, a demand for the use of a pen for a precise touch input for users that are familiar with information input using a writing instrument or for a specific application program (e.g., an application program for sketching or drawing) is increasing.

SUMMARY

The present disclosure provides an electronic device capable of sensing an input by a pen.

According to an embodiment of the present inventive concept, an electronic device including a sensor layer and a sensor driver driving the sensor layer and selectively operating in a first mode for sensing a touch input and in a second mode for sensing a pen input. The sensor layer includes a plurality of first electrode groups arranged along a first direction. A plurality of second electrode groups is arranged along a second direction crossing the first direction. The plurality of second electrode groups cross the plurality of first electrode groups and include a (2-1)-th electrode group and a (2-2)-th electrode group spaced apart from each other in the second direction. A first crossing trace line is connected to one side of the (2-1)-th electrode group. A second crossing trace line is connected to one side of the (2-2)-th electrode group. The one side of the (2-1)-th electrode group and the one side of the (2-2)-th electrode group are opposite to each other with respect to the first direction.

In an embodiment, each of the at least one (2-1)-th electrode group includes a plurality of (2-1)-th electrode groups and the at least one (2-2)-th electrode group includes a plurality of (2-2)-th electrode groups. The plurality of (2-1)-th electrode groups and the plurality of (2-2)-th electrode groups may be alternately arranged.

In an embodiment, a plurality of coupling capacitances may be defined between adjacent (2-1)-th electrode group and (2-2)-th electrode group among the plurality of (2-1)-th electrode groups and the plurality of (2-2)-th electrode groups.

In an embodiment, the sensor driver may output a first output signal by performing a differential operation on first signals received from the plurality of (2-1)-th electrode groups. The sensor driver may output a second output signal by performing a differential operation on second signals received from the plurality of (2-2)-th electrode groups.

In an embodiment, the sensor driver may include a first differential amplifier having an inverting terminal and a non-inverting terminal and a second differential amplifier having an inverting terminal and a non-inverting terminal. The second mode may include a pen sensing driving mode. In the pen sensing driving mode, the inverting terminal of the first differential amplifier may be electrically connected to a first (2-1)-th electrode group of the plurality of (2-1)-th electrode groups, and the non-inverting terminal of the first differential amplifier may be electrically connected to a second (2-1)-th electrode group of the plurality of (2-1)-th electrode groups. In the pen sensing driving mode, the inverting terminal of the second differential amplifier may be electrically connected to a first (2-2)-th electrode group of the plurality of (2-2)-th electrode groups, and a non-inverting terminal of the second differential amplifier may be electrically connected to a second (2-2)-th electrode group of the plurality of (2-2)-th electrode groups.

In an embodiment, the sensor driver may convert the first signals received from the plurality of (2-1)-th electrode groups into first digital signals and performs a difference operation on the first digital signals. The sensor driver may convert the second signals received from the plurality of (2-2)-th electrode groups into second digital signals and perform a difference operation on the second digital signals.

In an embodiment, the sensor driver may obtain a first output signal by performing a differential operation on the first signals, and obtain a second output signal by performing a differential operation on the second signals. The sensor driver may amplify the first output signal by applying a gain value to the first output signal when a magnitude of the first output signal is less than a magnitude of the second output signal.

In an embodiment, the plurality of first electrode groups may include at least one (1-1)-th electrode group and at least one (1-2)-th electrode group spaced apart from each other in the first direction, the sensor layer may include a third crossing trace line connected to one side of the at least one (1-1)-th electrode group, and a fourth crossing trace line connected to one side of the at least one (1-2)-th electrode group, and the one side of the at least one (1-1)-th electrode group and the one side of the at least one (1-2)-th electrode group may be disposed in opposite directions with respect to the second direction.

In an embodiment, each of the at least one (1-1)-th electrode group includes a plurality of (1-1)-th electrode groups and the at least one (1-2)-th electrode group may include a plurality of (1-2)-th electrode groups. The plurality of (1-1)-th electrode groups and the plurality of (1-2)-th electrode groups may be alternately arranged.

In an embodiment, a plurality of coupling capacitances may be defined between adjacent (1-1)-th electrode group and (1-2)-th electrode group among the plurality of (1-1)-th electrode groups and the plurality of (1-2)-th electrode groups.

In an embodiment, each of the at least one (2-1)-th electrode group may include a first sensing electrode, and each of the at least one (2-2)-th electrode group may include a second sensing electrode, the first sensing electrode may include first sensing patterns, first bridge patterns connecting adjacent first sensing patterns among the first sensing patterns, and a first cross pattern electrically connected to each of the first sensing patterns, the second sensing electrode may include second sensing patterns, second bridge patterns connecting adjacent second sensing patterns among the second sensing patterns, and a second cross pattern electrically connected to each of the second sensing patterns, the first and second sensing patterns and the first and second cross patterns may be disposed on different layers from each other, and at least a portion of the first cross pattern may overlap an adjacent second sensing pattern among the second sensing patterns, and at least a portion of the second cross pattern may overlap an adjacent first sensing pattern among the first sensing patterns.

In an embodiment, each of the at least one (1-1)-th electrode group may include a third sensing electrode, and each of the at least one (1-2)-th electrode group may include a fourth sensing electrode, the third sensing electrode may include third sensing patterns, third bridge patterns connecting adjacent third sensing patterns among the third sensing patterns, and a third cross pattern electrically connected to each of the third sensing patterns, the fourth sensing electrode may include fourth sensing patterns, fourth bridge patterns connecting adjacent fourth sensing patterns among the fourth sensing patterns, and a fourth cross pattern electrically connected to each of the fourth sensing patterns, the third and fourth sensing patterns and the third and fourth cross patterns may be disposed on different layers from each other, and at least a portion of the third cross pattern may overlap an adjacent fourth sensing pattern among the fourth sensing patterns, and at least a portion of the fourth cross pattern may overlap an adjacent third sensing pattern among the third sensing patterns.

In an embodiment, each of the at least one (2-1)-th electrode group may include a first sensing electrode, and each of the at least one (2-2)-th electrode group may include a second sensing electrode, the first sensing electrode may include first sensing patterns, first bridge patterns connecting adjacent first sensing patterns among the first sensing patterns, and a first cross pattern electrically connected to each of the first sensing patterns, the second sensing electrode may include second sensing patterns, second bridge patterns connecting adjacent second sensing patterns among the second sensing patterns, and a second cross pattern electrically connected to each of the second sensing patterns, the first and second sensing patterns and the first and second cross patterns may be disposed on a same layer as each other, and the first cross pattern may be disposed in an opening of adjacent second sensing pattern among the second sensing patterns, and the second cross pattern may be disposed in an opening of adjacent first sensing pattern among the first sensing patterns.

In an embodiment, each of the at least one (1-1)-th electrode group may include a third sensing electrode, and each of the at least one (1-2)-th electrode group may include a fourth sensing electrode, the third sensing electrode may include third sensing patterns, third bridge patterns connecting adjacent third sensing patterns among the third sensing patterns, and a third cross pattern electrically connected to each of the third sensing patterns, the fourth sensing electrode may include fourth sensing patterns, fourth bridge patterns connecting adjacent fourth sensing patterns among the fourth sensing patterns, and a fourth cross pattern electrically connected to each of the fourth sensing patterns, the third and fourth sensing patterns and the third and fourth cross patterns may be disposed on a same layer as each other, and the third cross pattern may be disposed in a recessed portion of an adjacent fourth sensing pattern among the fourth sensing patterns, and the fourth cross pattern may be disposed in a recessed portion of an adjacent third sensing pattern among the third sensing patterns.

In an embodiment, the sensor layer may further include a plurality of auxiliary electrodes respectively overlapping the plurality of first electrode groups, and a connection trace line connecting the plurality of auxiliary electrodes to each other.

In an embodiment, the sensor layer may further include a plurality of first trace lines electrically connected, in one-to-one correspondence, to the plurality of first electrode groups, and the plurality of first trace lines may be spaced apart from the connection trace line with the plurality of first electrode groups therebetween.

In an embodiment, each of the at least one (2-1)-th electrode group may include a first sensing electrode, each of the at least one (2-2)-th electrode group may include a second sensing electrode, and each of the plurality of first electrode groups may include a third sensing electrode, the first sensing electrode may include first sensing patterns, first bridge patterns connecting adjacent first sensing patterns among the first sensing patterns, and a first cross pattern electrically connected to each of the first sensing patterns, the second sensing electrode may include second sensing patterns, second bridge patterns connecting adjacent second sensing patterns among the second sensing patterns, and a second cross pattern electrically connected to each of the second sensing patterns, the third sensing electrode may include third sensing patterns and third bridge patterns connecting adjacent third sensing patterns among the third sensing patterns, and each of the third sensing patterns may overlap one corresponding auxiliary electrode among the plurality of auxiliary electrodes.

In an embodiment, the plurality of auxiliary electrodes and the first to third sensing patterns may be disposed on different layers from each other.

In an embodiment, the first and second sensing patterns and the first and second cross patterns may be disposed on different layers from each other, and at least a portion of the first cross pattern may overlap an adjacent second sensing pattern among the second sensing patterns, and at least a portion of the second cross pattern may overlap an adjacent first sensing pattern among the first sensing patterns.

In an embodiment, the first and second sensing patterns and the first and second cross patterns may be disposed on a same layer as each other, and the first cross pattern may be disposed in a recessed portion of an adjacent second sensing pattern among the second sensing patterns, and the second cross pattern may be disposed in a recessed portion of an adjacent first sensing pattern among the first sensing patterns.

In an embodiment, a plurality of holes respectively surrounding the third bridge patterns may be defined in the one corresponding auxiliary electrode.

In an embodiment, the sensor layer may further include a plurality of loop trace lines electrically connected to the plurality of auxiliary electrodes, the second mode may include a charge driving mode and a pen sensing driving mode, in the charge driving mode, the sensor driver may apply a first signal to at least one among the connection trace line and the plurality of loop trace lines and apply a second signal to another of at least one among the connection trace line and the plurality of loop trace lines, and in the pen sensing driving mode, all the plurality of loop trace lines may be electrically floated.

In an embodiment, in the first mode, the sensor driver may sequentially provide a transmission signal to the plurality of first electrode groups and receives signals from the plurality of second electrode groups.

In an embodiment, in the first mode, the sensor driver may sequentially provide a transmission signal to the plurality of second electrode groups and receive signals provided from the plurality of first electrode groups.

In an embodiment, the sensor layer may further include a first additional trace line connected to another side of the at least one (2-1)-th electrode group that is different from the one side of the at least one (2-1)-th electrode group, and a second additional trace line connected to another side of the at least one (2-2)-th electrode group that is different from the one side of the at least one (2-2)-th electrode group, in the first mode, the first additional trace line may be electrically connected to the first crossing trace line, and the second additional trace line may be electrically connected to the second crossing trace line, and in the second mode, each of the first additional trace line and the second additional trace line may be electrically floated.

In an embodiment, each of the at least one (2-1)-th electrode group and the at least one (2-2)-th electrode group may cross all of the plurality of first electrode groups.

According to an embodiment of the present inventive concept, an electronic device includes a sensor layer, and a sensor driver driving the sensor layer and selectively operating in a first mode for sensing a touch input and in a second mode for sensing a pen input. The sensor layer includes a plurality of first electrode groups arranged along a first direction, and a plurality of second electrode groups arranged along a second direction crossing the first direction. The plurality of second electrode groups cross the plurality of first electrode groups, and a plurality of coupling capacitances are defined between adjacent second electrode groups among the plurality of second electrode groups.

In an embodiment, the plurality of second electrode groups may include a (2-1)-th electrode group and a (2-2)-th electrode group spaced apart from each other in the second direction, the (2-1)-th electrode group may include a first sensing electrode, and the (2-2)-th electrode group may include a second sensing electrode, the first sensing electrode may include first sensing patterns, first bridge patterns connecting adjacent first sensing patterns among the first sensing patterns, and a first cross pattern electrically connected to each of the first sensing patterns, and the second sensing electrode may include second sensing patterns, second bridge patterns connecting adjacent second sensing patterns among the second sensing patterns, and a second cross pattern electrically connected to each of the second sensing patterns.

In an embodiment, the first and second sensing patterns and the first and second cross patterns may be disposed on different layers from each other, and at least a portion of the first cross pattern may overlap an adjacent second sensing pattern among the second sensing patterns, and at least a portion of the second cross pattern may overlap an adjacent first sensing pattern among the first sensing patterns.

In an embodiment, the first and second sensing patterns and the first and second cross patterns may be disposed on a same layer as each other, and the first cross pattern may be disposed in an opening of adjacent second sensing pattern among the second sensing patterns, and the second cross pattern may be disposed in an opening of adjacent first sensing pattern among the first sensing patterns.

In an embodiment, the sensor layer may further include a first crossing trace line connected to one side of a first electrode group of the adjacent second electrode groups, and a second crossing trace line connected to one side of a second electrode group of the adjacent second electrode groups, and the one side of the first electrode group of the adjacent second electrode groups and the one side of the second electrode group of the adjacent second electrode groups may be opposite to each other with respect to the first direction.

BRIEF DESCRIPTION OF THE DRAWINGS

The accompanying drawings are included to provide a further understanding of the present inventive concept, and are incorporated in and constitute a part of this specification. The drawings illustrate embodiments of the present inventive concept and, together with the description, serve to explain principles of the present inventive concept. In the drawings.

DETAILED DESCRIPTION OF EMBODIMENTS

Figure 1A:
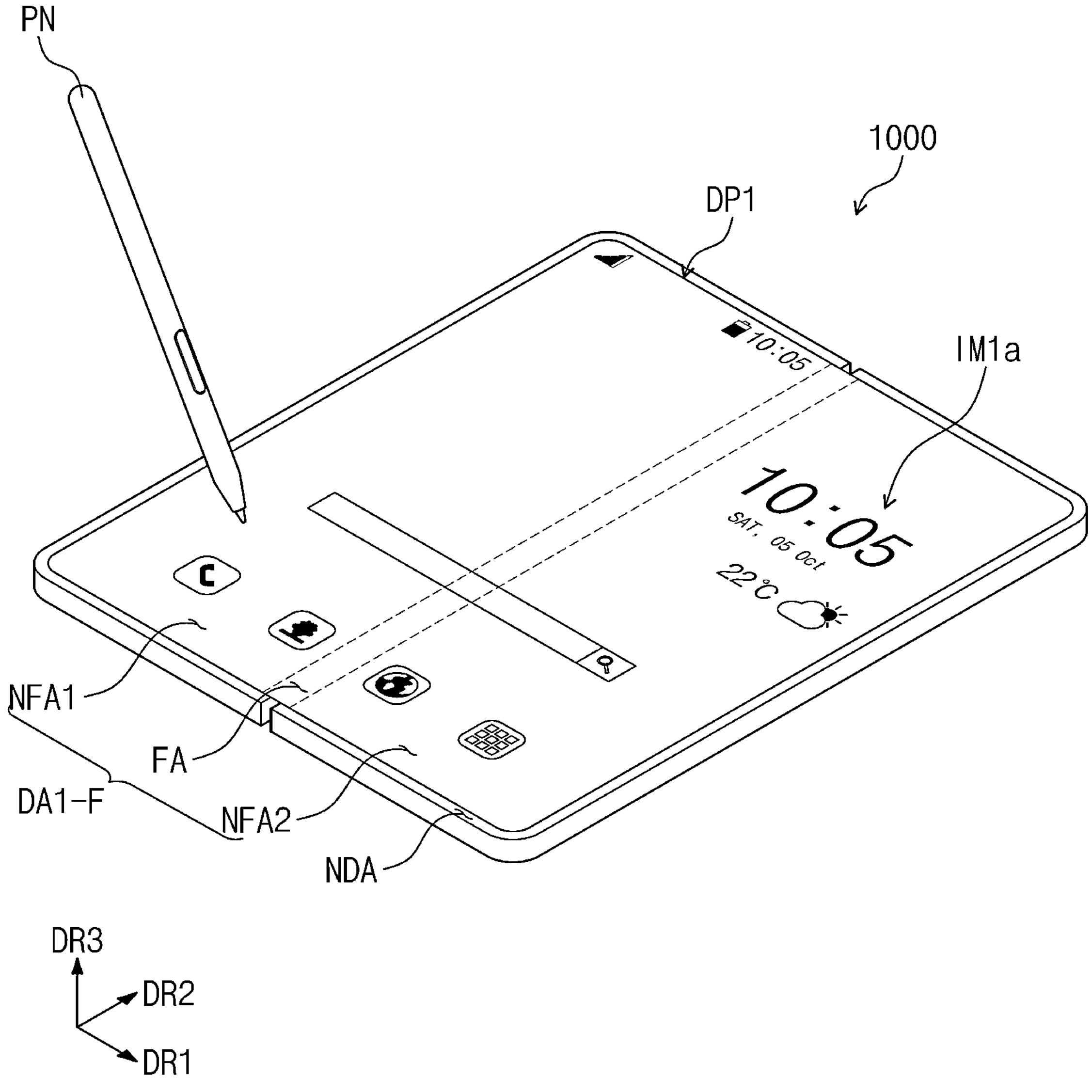
FIG. 1A is a perspective view of an electronic device according to an embodiment of the present inventive concept.

In this specification, it will be understood that when an element (or a region, a layer, a portion, or the like) is referred to as being "on", "connected to" or "coupled to" another element, it may be directly disposed on, connected or coupled to the other element, or an intervening element may be disposed therebetween. When an element, region, layer, portion, or the like is referred to as being "directly on", "directly connected to" or "directly coupled to" another element, no intervening elements may be disposed therebetween.

Like reference numerals or symbols refer to like elements. Also, in the drawings, the thicknesses, ratios, and dimensions of the elements may be exaggerated for effective description of the technical contents. The term "and/or" includes all of one or more combinations which may be defined by related elements.

Although the terms first, second, etc. may be used to describe various elements, these elements should not be limited by these terms. These terms are only used to distinguish one element from another element. For example, a first element may be referred to as a second element, and similarly, a second element may also be referred to as a first element without departing from the scope of embodiments of the present disclosure. The singular forms include the plural forms as well unless the context clearly indicates otherwise.

Also, terms such as "below", "on lower side", "above", and "on upper side" may be used to describe the relationships of the elements illustrated in the drawings. These terms have relative concepts and are described on the basis of the directions indicated in the drawings.

It will be understood that the terms such as "include" or "have", when used herein, are intended to specify the presence of stated features, integers, steps, operations, elements, components, or combinations thereof, but do not preclude the presence or addition of one or more other features, integers, steps, operations, elements, components, or combinations thereof.

Unless otherwise defined, all terms (including technical and scientific terms) used herein have the same meaning as commonly understood by one of ordinary skill in the art to which the present disclosure belongs. Also, terms, such as those defined in commonly used dictionaries, should be interpreted as having a meaning that is consistent with their meaning in the context of the relevant art and should not be interpreted in an idealized or overly formal sense unless expressly so defined herein.

The terms "part" and "unit" mean a software component or a hardware component for performing a specific function. The hardware component may include, for example, a field-programmable gate array (FPGA) or an application-specific integrated circuit (ASIC). The software component may refer to executable code and/or data used by executable code in an addressable storage medium. Thus, software components may be, for example, object-oriented software components, class components, and task components, and may include processes, functions, attributes, procedures, subroutines, program code segments, drivers, firmware, microcode, circuits, data, database, data structures, tables, arrays, or variables.

Hereinafter, embodiments of the present inventive concept will be described with reference to the accompanying drawings.

Figure 1B:
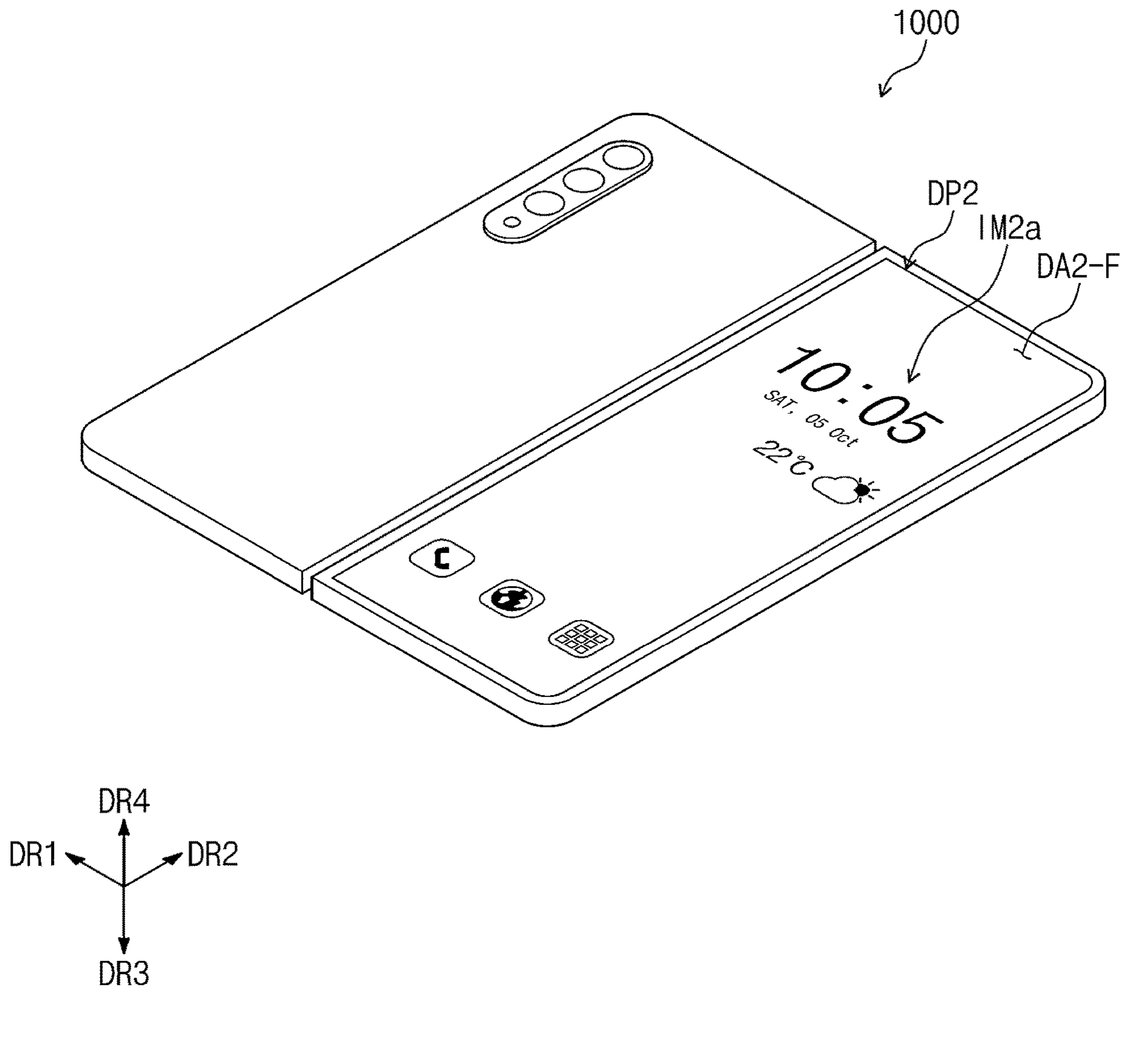
FIG. 1B is a rear perspective view of an electronic device according to an embodiment of the present inventive concept.

FIG. 1A is a perspective view of an electronic device 1000 according to an embodiment of the present inventive concept. FIG. 1B is a rear perspective view of an electronic device 1000 according to an embodiment of the present inventive concept.

Referring to FIGS. 1A and 1B, the electronic device 1000 may be activated in response to an electrical signal. For example, the electronic device 1000 may display an image and sense inputs applied from the outside (e.g., the external environment). In an embodiment, the external input may be a user's input. A user's input may include external inputs in various forms such as a part of a user's body, a pen PN, light, heat, or pressure.

In an embodiment, the electronic device 1000 may include a first display panel DP1 and a second display panel DP2. The first display panel DP1 and the second display panel DP2 may be separate panels separated from each other (e.g., in a third direction DR3). The first display panel DP1 may be referred to as a main display panel, and the second display panel DP2 may be referred to as an auxiliary display panel or an external display panel.

In an embodiment, the first display panel DP1 may include a first display portion DA1-F, and the second display panel DP2 may include a second display portion DA2-F. In an embodiment, an area size of the second display panel DP2 (e.g., area in a plane defined in first and second directions DR1, DR2) may be less than an area size of the first display panel DP1. In correspondence with sizes of the first display panel DP1 and the second display panel DP2, an area size of the first display portion DA1-F may be greater than an area size of the second display portion DA2-F.

In an unfolded state of the electronic device 1000, the first display portion DA1-F may have a plane substantially parallel to the first direction DR1 and the second direction DR2. A thickness direction of the electronic device 1000 may be parallel to the third direction DR3 crossing the first direction DR1 and the second direction DR2. For example, in an embodiment, the first to third directions DR1 to DR3 may be perpendicular to each other. However, embodiments of the present inventive concept are not necessarily limited thereto and the first to third directions DR1 to DR3 may cross each other at various different angles. Thus, a front surface (e.g., an upper surface) and a rear surface (e.g., a lower surface) of members constituting the electronic device 1000 may be defined on the basis of the third direction DR3.

The first display panel DP1 or the first display portion DA1-F may include a folding region FA which is folded and unfolded, and a plurality of non-folding regions NFA1 and NFA2 spaced apart from each other with the folding region FA therebetween (e.g., in the first direction DR1). The second display panel DP2 may overlap any one among the plurality of non-folding regions NFA1 and NFA2. For example, the second display panel DP2 may overlap a first non-folding region NFA1.

A display direction of a first image IM1*a* which is displayed in a portion of the first display panel PD1, e.g., the first non-folding region NFA1, and a display direction of a second image IM2*a* which is displayed in the second display panel DP2 may be opposed to each other. For example, in an embodiment the first image IM1*a* may be displayed in the third direction DR3, and the second image IM2*a* may be displayed in a fourth direction DR4 which is an opposite direction of the third direction DR3.

In an embodiment of the present inventive concept, the folding region FA may be bent with respect to a folding axis extending along a direction parallel to a long side of the electronic device 1000, e.g., a direction parallel to the second direction DR2. In a folded state of the electronic device 1000, the folding region FA has a predetermined curvature and a curvature radius. In an embodiment, the electronic device 1000 may be inner-folded so that the first non-folding region NFA1 and a second non-folding region NFA2 face each other and the first display portion DA1-F is not exposed to the outside (e.g., the external environment).

In an embodiment of the present inventive concept, the electronic device 1000 may be outer-folded so that the first display portion DA1-F is exposed to the outside (e.g., the external environment). In an embodiment of the present inventive concept, the electronic device 1000 may be capable of both being inner-folded or outer-folded in an unfolded state. However, embodiments of the present inventive concept are not necessarily limited thereto.

FIG. 1A illustrates that one folding region FA is defined in the electronic device 1000 as an example. However, embodiments of the present inventive concept are not necessarily limited thereto. For example, a plurality of folding axes and a plurality of folding regions corresponding to the folding axes may be defined in the electronic device 1000, and the electronic device 1000 may be inner-folded or outer-folded in an unfolded state at each of the plurality of folding regions.

According to an embodiment of the present inventive concept, at least one of the first display panel DP1 or the second display panel DP2 may sense an input by the pen PN even if a digitizer is not included. Thus, since a digitizer for sensing the pen PN may be omitted, an increase in thickness, an increase in weight, and deterioration in flexibility of the electronic device 1000 due to addition of a digitizer may be prevented. Thus, the second display panel DP2 as well as the first display panel DP1 may be designed to sense the pen PN.

Figure 2:
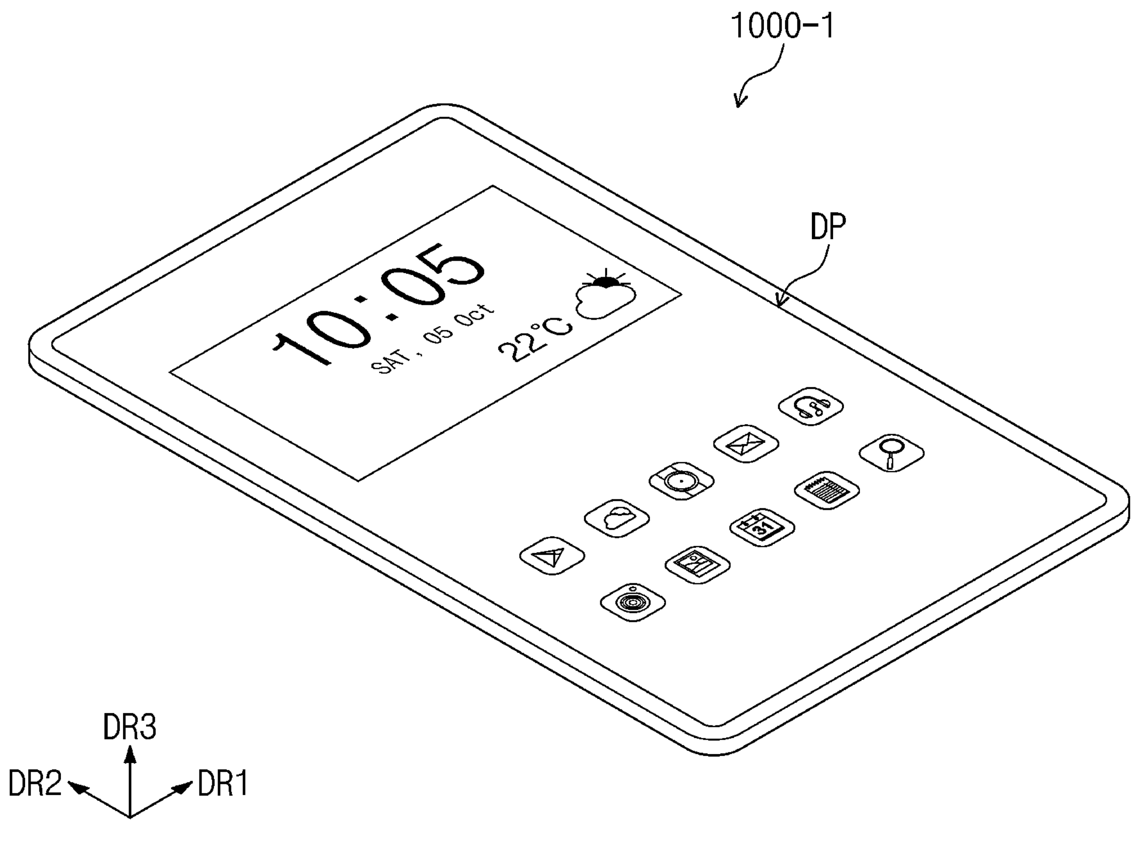
FIG. 2 is a perspective view of an electronic device according to an embodiment of the present inventive concept.

FIG. 2 is a perspective view of an electronic device 1000-1 according to an embodiment of the present inventive concept.

FIG. 2 illustrates that the electronic device 1000-1 is a mobile phone, and the electronic device 1000-1 may include a display panel DP. However, embodiments of the present inventive concept are not necessarily limited thereto and the electronic device 1000-1 may be various different small, medium or large-sized electronic devices.

In an embodiment of the present inventive concept, the display panel DP may sense inputs applied from the outside (e.g., the external environment). In an embodiment, the external input may be a user's input. A user's input may include external inputs in various forms such as a part of a user's body, the pen PN (see FIG. 1A), light, heat, or pressure.

According to an embodiment of the present inventive concept, the display panel DP may sense an input by the pen PN even if a digitizer is not included. Thus, since a digitizer for sensing the pen PN may be omitted, an increase in thickness and an increase in weight of the electronic device 1000-1 due to addition of a digitizer may be prevented.

FIG. 1A illustrates the foldable-type electronic device 1000, and FIG. 2 illustrates the bar-type electronic device 1000-1. However, embodiments of the present inventive concept are not necessarily limited thereto. For example, descriptions to be made below may be applied to various electronic devices such as a rollable-type electronic device, a slidable-type electronic device, and a stretchable-type electronic device.

Figure 3:
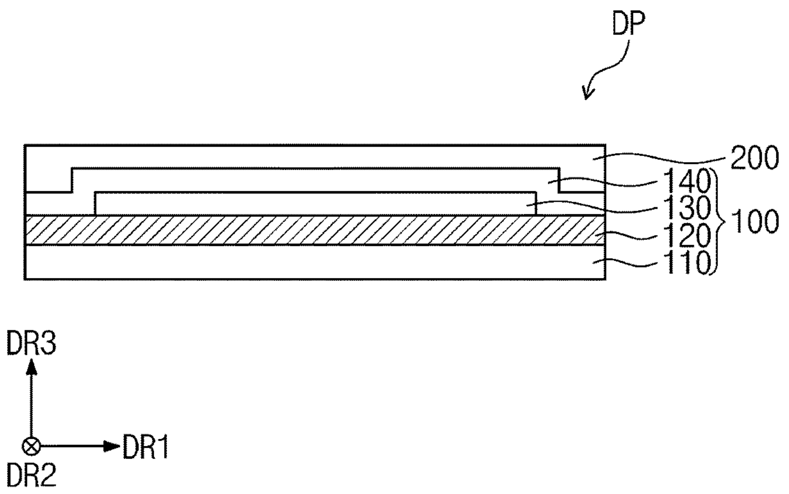
FIG. 3 is a schematic cross-sectional view of a display panel according to an embodiment of the present inventive concept.

FIG. 3 is a schematic cross-sectional view of a display panel DP according to an embodiment of the present inventive concept.

Referring to FIG. 3, in an embodiment the display panel DP may include a display layer 100 and a sensor layer 200.

The display layer 100 may be a component that substantially generates an image. In an embodiment, the display layer 100 may be an emissive display layer, and for example, the display layer 100 may be an organic light-emitting display layer, an inorganic light-emitting display layer, an organic-inorganic light-emitting display layer, a quantum dot display layer, a micro-LED display layer, or a nano-LED display layer. In an embodiment, the display layer 100 may include a base layer 110, a circuit layer 120, a light-emitting element layer 130, and an encapsulation layer 140.

The base layer 110 may be a member that provides a base surface on which the circuit layer 120 is disposed. The base layer 110 may have a multi-layered structure or a single-layered structure. In an embodiment, the base layer 110 may be a glass substrate, a metal substrate, a silicon substrate, a polymer substrate, or the like. However, embodiments of the present inventive concept are not necessarily limited thereto.

The circuit layer 120 may be disposed on the base layer 110 (e.g., disposed directly thereon in the third direction DR3). In an embodiment, the circuit layer 120 may include an insulating layer, a semiconductor pattern, a conductive pattern, a signal line, and the like. In an embodiment, an insulating layer, a semiconductor layer, and a conductive layer may be formed on the base layer 110 through coating, deposition, or the like, and the insulating layer, the semiconductor layer, and the conductive layer may be selectively patterned through a photolithography process performed multiple times.

The light-emitting element layer 130 may be disposed on the circuit layer 120 (e.g., disposed directly thereon in the third direction DR3). The light-emitting element layer 130 may include a light-emitting element. For example, in an embodiment the light-emitting element layer 130 may include an organic light-emitting material, an inorganic light-emitting material, an organic-inorganic light-emitting material, a quantum dot, a quantum rod, a micro-LED, or a nano-LED.

The encapsulation layer 140 may be disposed on the light-emitting element layer 130 (e.g., disposed directly thereon). The encapsulation layer 140 may protect the light-emitting element layer 130 from moisture, oxygen, and foreign substances such as dust particles.

The sensor layer 200 may be disposed on the display layer 100 (e.g., disposed directly thereon). The sensor layer 200 may sense an external input applied from the outside (e.g., the external environment). In an embodiment, the sensor layer 200 may be an integrated sensor continuously formed in a manufacturing process for the display layer 100, or the sensor layer 200 may be an external sensor attached to the display layer 100. The sensor layer 200 may be referred to as a sensor, an input sensing layer, an input sensing panel, an electronic device for sensing an input coordinate, or the like.

According to an embodiment of the present inventive concept, the sensor layer 200 may sense both an input from a passive-type input means such as a user's body and an input from an input device that generates a magnetic field having a predetermined resonant frequency. The input device may be referred to as a pen, an input pen, a magnetic pen, a stylus pen, or an electromagnetic resonance pen.

Figure 4:
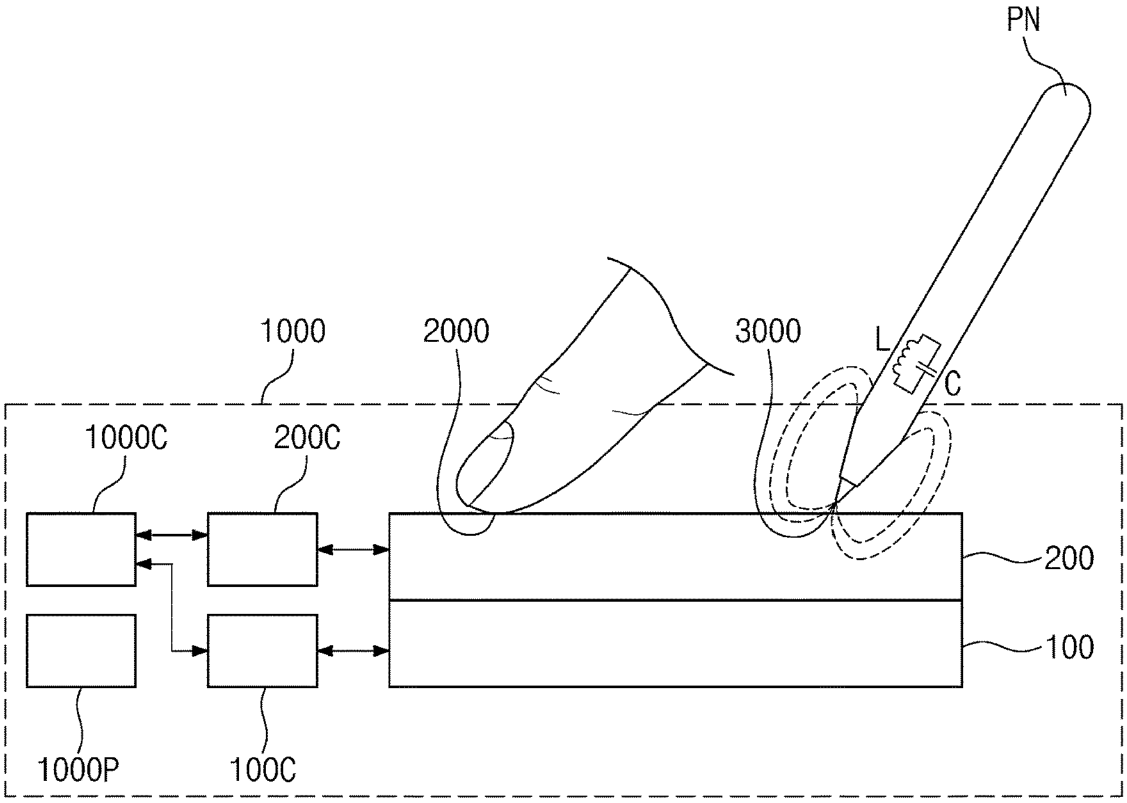
FIG. 4 is a diagram illustrating an operation of an electronic device according to an embodiment of the present inventive concept.

FIG. 4 is a diagram illustrating an operation of an electronic device 1000 according to an embodiment of the present inventive concept.

Referring to FIG. 4, the electronic device 1000 may include a display layer 100, a sensor layer 200, a display driver 100C, a sensor driver 200C, a main driver 1000C, and a power circuit 1000P.

The sensor layer 200 may sense a first input 2000 or a second input 3000 applied from the outside (e.g., the external environment). Each of the first input 2000 and the second input 3000 may be from an input means capable of providing a change to capacitance of the sensor layer 200 or an input means capable of causing induced current in the sensor layer 200. For example, in an embodiment the first input 2000 may be from a passive-type input means such as a user's body. The second input 3000 may be an input by a pen PN or an input by an RFIC tag. For example, the pen PN may be a passive-type pen or an active-type pen.

In an embodiment of the present inventive concept, the pen PN may be a device which generates a magnetic field having a predetermined resonant frequency. The pen PN may be configured to transmit an output signal based on an electromagnetic resonance method. The pen PN may be referred to as an input device, an input pen, a magnetic pen, a stylus pen, or an electromagnetic resonance pen.

In an embodiment, the pen PN may include an RLC resonant circuit, and the RLC resonant circuit may include an inductor L and a capacitor C. In an embodiment of the present inventive concept, the RLC resonant circuit may be a variable resonant circuit that varies a resonant frequency. In this embodiment, the inductor L may be a variable inductor and/or the capacitor C may be a variable capacitor. However, embodiments of the present inventive concept are not necessarily limited thereto.

The inductor L generates current due to a magnetic field which is formed in the sensor layer 200. However, an embodiment of the present inventive concept is not necessarily limited thereto. For example, if the pen PN operates as an active-type, the pen PN may generate current even if the pen PN is not provided with a magnetic field from the outside. The generated current is transmitted to the capacitor C. The capacitor C is charged with current inputted from the inductor L and discharges charged current to the inductor L. The inductor L may then emit a magnetic field having a resonant frequency. In an embodiment, induced current may flow in the sensor layer 200 due to a magnetic field emitted by the pen PN, and the induced current may be transmitted to the sensor driver 200C as a reception signal (or a sensing signal, a signal).

In an embodiment, the main driver 1000C may control an overall operation of the electronic device 1000. For example, the main driver 1000C may control an operation of the display driver 100C and the sensor driver 200C. The main driver 1000C may include at least one microprocessor, and may further include a graphics controller. The main driver 1000C may be referred to as an application processor, a central processing unit, or a main processor.

The display driver 100C may drive the display layer 100. The display driver 100C may receive image data and a control signal from the main driver 1000C. The control signal may include various signals. For example, in an embodiment the control signal may include an input vertical synchronization signal, an input horizontal synchronization signal, a main clock, a data enable signal, and the like.

The sensor driver 200C may drive the sensor layer 200. The sensor driver 200C may receive a control signal from the main driver 1000C. In an embodiment, the control signal may include a clock signal of the sensor driver 200C. In addition, the control signal may further include a mode determination signal that determines a driving mode of the sensor driver 200C and the sensor layer 200.

In an embodiment, the sensor driver 200C may be embodied as an integrated circuit (IC) and electrically connected to the sensor layer 200. For example, the sensor driver 200C may be directly mounted in a predetermined region of a display panel or mounted on a separate printed circuit board using a chip-on-film (COF) method and electrically connected to the sensor layer 200.

The sensor driver 200C and the sensor layer 200 may selectively operate in a first mode or a second mode. For example, the first mode may be a mode for sensing a touch input, such as the first input 2000. The second mode may be a mode for sensing an input by the pen PN, such as the second input 3000. The first mode may be referred to as a touch sensing mode, and the second mode may be referred to as a pen sensing mode.

Switching between the first mode and the second mode may be performed in various ways. For example, in an embodiment the sensor driver 200C and the sensor layer 200 may be driven in the first mode and the second mode in a time-division manner and sense the first input 2000 and the second input 3000. Alternatively, switching between the first mode and the second mode may be caused by a user's selection or a user's specific action, or any one of the first mode or the second mode may be activated or deactivated, or may be switched to the other by activation or deactivation of a specific application. Alternatively, while the sensor driver 200C and the sensor layer 200 are operating alternately in the first mode and the second mode, when the first input 2000 is sensed, the first mode may be maintained, or when the second input 3000 is sensed, the second mode may be maintained.

The sensor driver 200C may calculate coordinate information of an input on the basis of a signal received from the sensor layer 200 and provide a coordinate signal having coordinate information to the main driver 1000C. The main driver 1000C executes an operation corresponding to a user's input on the basis of the coordinate signal. For example, in an embodiment the main driver 1000C may operate the display driver 100C so that a new application image is displayed in the display layer 100.

The power circuit 1000P may include a power management integrated circuit (PMIC). The power circuit 1000P may generate a plurality of driving voltages for driving the display layer 100, the sensor layer 200, the display driver 100C, and the sensor driver 200C. For example, in an embodiment the plurality of driving voltages may include a gate high voltage, a gate low voltage, a first driving voltage (e.g., an ELVSS voltage), a second driving voltage (e.g., an ELVDD voltage), an initialization voltage, etc., However, embodiments of the present inventive concept are not necessarily limited thereto.

Figure 5A:
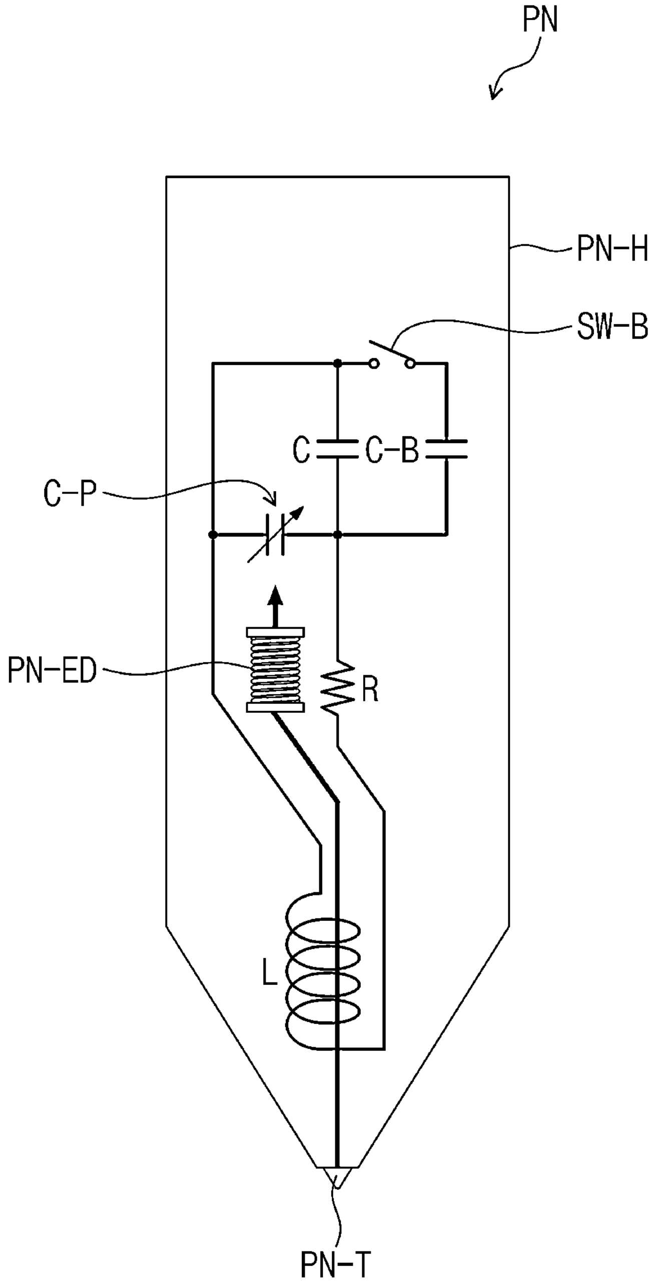
FIG. 5A is a diagram illustrating a pen according to an embodiment of the present inventive concept.

FIG. 5A is a diagram illustrating a pen PN according to an embodiment of the present inventive concept.

Referring to FIGS. 4 and 5A, in an embodiment the pen PN may include a housing PN-H, a pen tip PN-T, an inductor L, a capacitor C, a resistance R, an elastic body PN-ED, a pressure capacitor C-P, a switch SW-B, and a button capacitor C-B. In an embodiment, the pen PN may not include an active element such as a power, a transistor, or a diode except the switch SW-B connected to the button capacitor C-B. Components included in the pen PN are not necessarily limited to the components described above. At least some of the components described above may be omitted, and other components may be added.

In an embodiment of the present inventive concept, the pen tip PN-T may include a non-conductive material. The pen tip PN-T may have a structure protruding to the outside of the housing PN-H. The pen tip PN-T may be detachably coupled to the housing PN-H, and may be a replaceable component.

In an embodiment of the present inventive concept, the resistance R, the inductor L, and the capacitor C may be connected in series to each other. Thus, the pen PN may have a structure having a resonant frequency and selectivity which are characteristics of an RLC series circuit. In this embodiment, a frequency of signals which are provided when the sensor layer 200 is charge driven and are provided to the sensor layer 200 may correspond to a resonant frequency of the pen PN. In an embodiment, the capacitor C, the pressure capacitor C-P, and the button capacitor C-B may be connected in parallel. For reference, the button capacitor C-B may be connected to the capacitor C in parallel when the switch SW-B is turned on.

In an embodiment of the present inventive concept, according to the switch SW-B being turned on-off, the button capacitor C-B may be electrically connected to or separated from the capacitor C. For example, the pen PN may be provided so as to react to another resonant frequency by turning the switch SW-B on or off. For example, in an embodiment a button may be provided on an outer circumferential surface of the housing PN-H. When the button is pressed by the user, the switch SW-B may be turned on, and the button capacitor C-B may be electrically connected to the capacitor C, thereby increasing a total capacitance of the pen PN.

In an embodiment of the present inventive concept, the capacitor C may be provided by cutting a portion of a plurality of capacitors connected in parallel. For example, to achieve a target resonant frequency in a process of manufacturing the pen PN, a portion of the plurality of capacitors may be cut so that the capacitor C of the pen PN may be tuned.

In an embodiment of the present inventive concept, when a portion of the pen tip PN-T is inserted into the housing PN-H due to pen pressure, an area size, a distance, or an area size and a distance that forms a capacitance of the pressure capacitor C-P may be changed. Thus, the capacitance of the pressure capacitor C-P may be changed. For example, when pen pressure is applied to the pen PN, the capacitance of the pressure capacitor C-P may increase, and a resonant frequency of the pen PN may decrease according to the increased capacitance. When the pen pressure disappears, the capacitance of the pressure capacitor C-P may then be restored by the elastic body PN-ED.

Figure 5B:
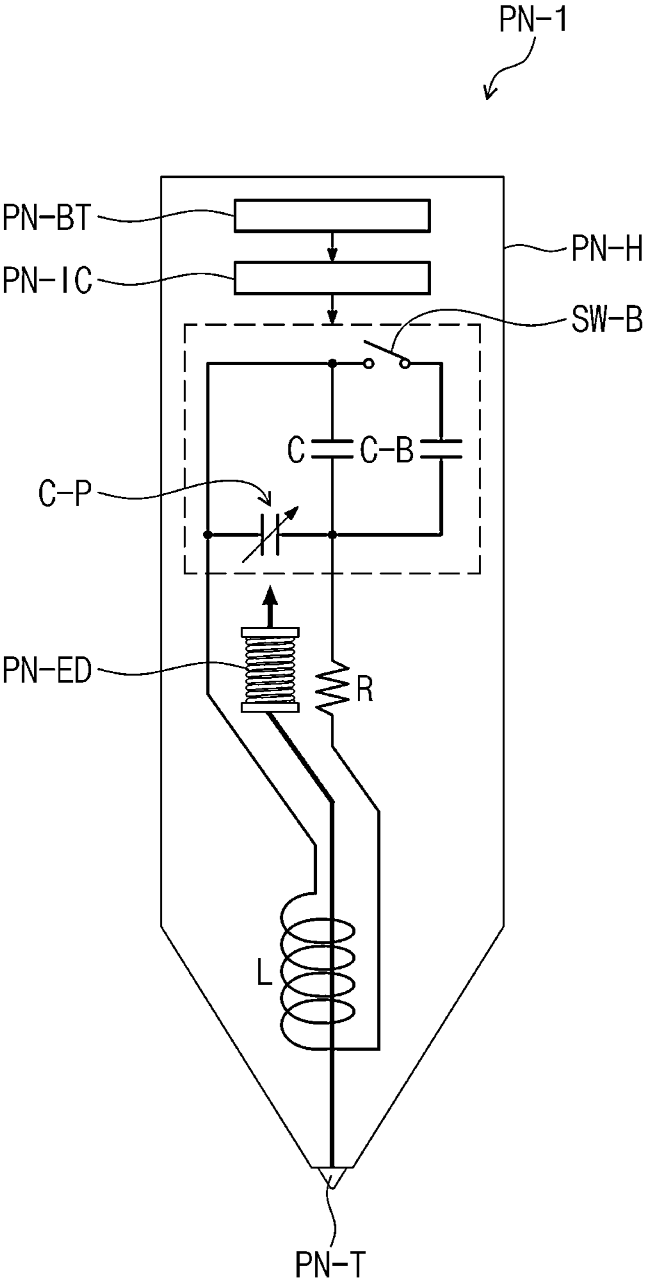
FIG. 5B is a diagram illustrating a pen according to an embodiment of the present inventive concept.

FIG. 5B is a diagram illustrating a pen PN-1 according to an embodiment of the present inventive concept.

In describing with reference to FIG. 5B, components described with reference to FIG. 5A will be denoted as the same reference numerals or symbols, and repeated description of identical or similar elements may be omitted for economy of explanation.

Referring to FIGS. 4 and 5B, in an embodiment the pen PN-1 may further include a power unit PN-BT and a control unit PN-IC, compared to the pen PN illustrated in FIG. 5A. In an embodiment, the power unit PN-BT may include a battery or a high-capacitance capacitor. The control unit PN-IC may be supplied with power from the power unit PN-BT and may adjust a frequency of a signal outputted from the pen PN-1.

According to an embodiment of the present inventive concept, the pen PN-1 may operate as an active-type as well as a passive-type since the pen PN-1 may include an RLC resonant circuit, the power unit PN-BT, and the control unit PN-IC. Thus, even if a magnetic field is not provided from the sensor layer 200, the pen PN-1 may emit a magnetic field. Thus, the sensor layer 200 may sense an input by the pen PN-1 that outputs a magnetic field without a charging mode in which a magnetic field is formed.

Figure 5C:
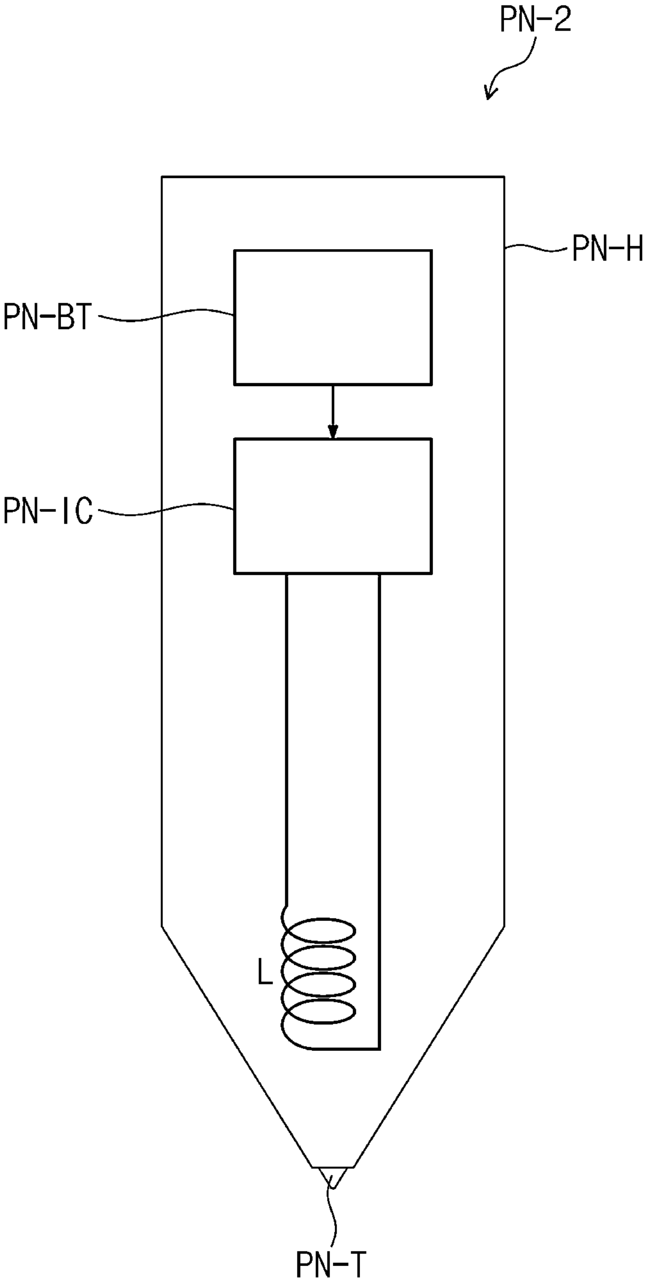
FIG. 5C is a diagram illustrating a pen according to an embodiment of the present inventive concept.

FIG. 5C is a diagram illustrating a pen PN-2 according to an embodiment of the present inventive concept.

Referring to FIGS. 4 and 5C, in an embodiment the pen PN-2 may not include an RLC resonant circuit. For example, the pen PN-2 may include a housing PN-H, a pen tip PN-T, an inductor L, a power unit PN-BT, and a control unit PN-IC. The power unit PN-BT may include a battery or a high-capacitance capacitor. The control unit PN-IC may be supplied with power from the power unit PN-BT and may adjust a frequency of a signal outputted from the pen PN-2.

According to an embodiment of the present inventive concept, the pen PN-2 may operate as an active-type. Thus, even if a magnetic field is not provided from the sensor layer 200, the pen PN-2 may emit a magnetic field.

Figure 5D:
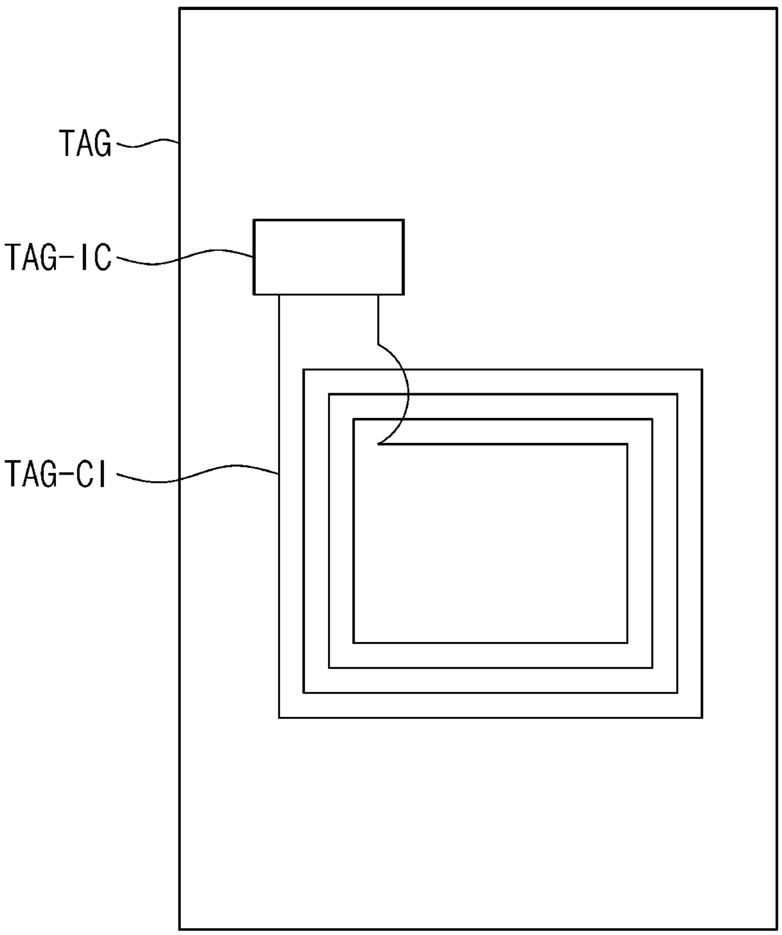
FIG. 5D is a diagram illustrating an input device according to an embodiment of the present inventive concept.

FIG. 5D is a diagram illustrating an input device TAG according to an embodiment of the present inventive concept.

Referring to FIGS. 4 and 5D, the sensor layer 200 may sense an input from an input device TAG. The input device TAG may be referred to as an electronic tag, a smart tag, an electronic label, or the like. In an embodiment, the input device TAG may include a controller TAG-IC and an antenna TAG-CI connected to the controller TAG-IC. For example, the antenna TAG-CI may emit a radio wave having a unique code. The sensor layer 200 may detect a code of the input device TAG.

Figure 6:
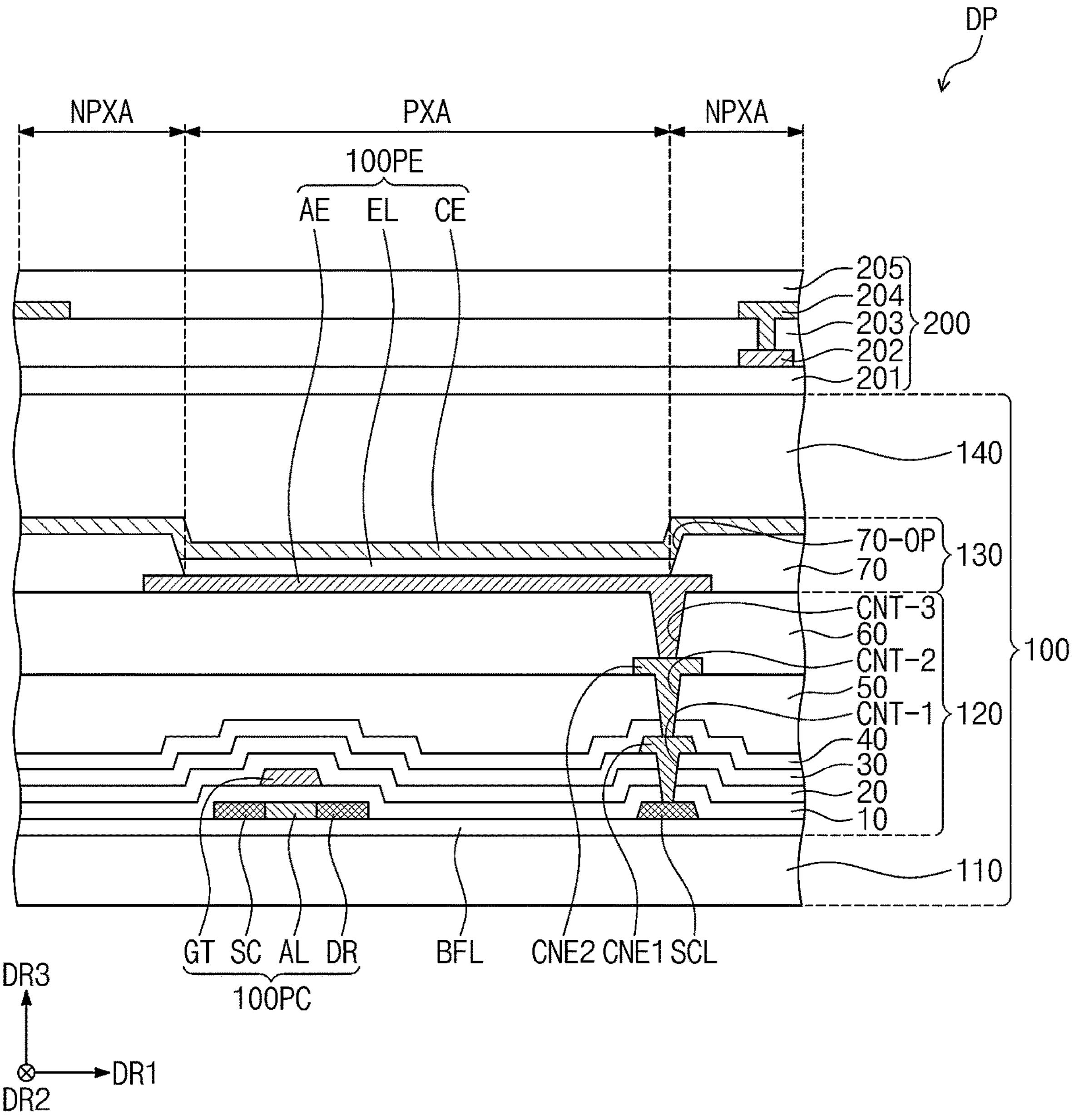
FIG. 6 is a cross-sectional view of a display panel according to an embodiment of the present inventive concept.

FIG. 6 is a cross-sectional view of a display panel DP according to an embodiment of the present inventive concept.

Referring to FIG. 6, at least one buffer layer BFL is formed on (e.g., disposed directly thereon in the third direction DR3) an upper surface of a base layer 110. The buffer layer BFL may increase bonding force between the base layer 110 and a semiconductor pattern. In an embodiment, the buffer layer BFL may be formed of multiple layers. Alternatively, a display layer 100 may further include a barrier layer. In an embodiment, the buffer layer BFL may include at least one of silicon oxide, silicon nitride, or silicon oxynitride. For example, the buffer layer BFL may have a structure in which a silicon oxide layer and a silicon nitride layer are alternately stacked (e.g., in the third direction DR3).

A semiconductor pattern SC, AL, DR, and SCL may be disposed on the buffer layer BFL (e.g., disposed directly thereon in the third direction DR3). In an embodiment, the semiconductor pattern SC, AL, DR, and SCL may include polysilicon. However, embodiments of the present inventive concept are not necessarily limited thereto, and the semiconductor pattern SC, AL, DR, and SCL may include amorphous silicon, low-temperature polycrystalline silicon, or an oxide semiconductor.

FIG. 6 merely illustrates a partial semiconductor pattern SC, AL, DR, and SCL, and other semiconductor patterns may be further disposed in another region. The semiconductor pattern SC, AL, DR, and SCL may be arranged according to a specific rule across pixels. The semiconductor pattern SC, AL, DR, and SCL may have a different electrical property according to whether the semiconductor pattern is doped or not. In an embodiment, the semiconductor pattern SC, AL, DR, and SCL may include a first region SC, DR, and SCL having high conductivity and a second region AL having low conductivity. The first region SC, DR, and SCL may be doped with an N-type dopant or a P-type dopant. A P-type transistor may include a doped region doped with a P-type dopant, and an N-type transistor may include a doped region doped with an N-type dopant. The second region AL may be an undoped region or a region doped with a lower concentration compared to the first region.

The first region SC, DR, and SCL may have higher conductivity than the second region AL and substantially serve as an electrode or a signal line. The second region AL may substantially correspond to an active region AL (e.g., a channel) of a transistor 100PC. For example, a portion AL of the semiconductor pattern SC, AL, DR, and SCL may be the active region AL of the transistor 100PC, another portion SC and DR may be a source region SC or a drain region DR of the transistor 100PC, and still another portion SCL may be a connection electrode or a connection signal line SCL.

In an embodiment, each of the pixels may have an equivalent circuit including seven transistors, one capacitor, and a light-emitting element. However, embodiments of the present inventive concept are not necessarily limited thereto, and an equivalent circuit diagram of the pixel may be changed in various forms. FIG. 6 illustrates one transistor 100PC and a light-emitting element 100PE included in the pixel.

The source region SC, the active region AL, and the drain region DR of the transistor 100PC may be formed from the semiconductor pattern SC, AL, DR, and SCL. The source region SC and the drain region DR may extend in opposite directions (e.g., the first direction DR1) from the active region AL in a cross-sectional view. FIG. 6 illustrates a portion of the connection signal line SCL formed from the semiconductor pattern SC, AL, DR, and SCL. In an embodiment, the connection signal line SCL may be connected to the drain region DR of the transistor 100PC in a plan view.

A first insulating layer 10 may be disposed on the buffer layer BFL (e.g., disposed directly thereon in the third direction DR3). The first insulating layer 10 may overlap the plurality of pixels in common and cover the semiconductor pattern SC, AL, DR, and SCL. The first insulating layer 10 may be an inorganic layer and/or an organic layer and have a single- or multi-layered structure. In an embodiment, the first insulating layer 10 may include at least one of aluminum oxide, titanium oxide, silicon oxide, silicon nitride, silicon oxynitride, zirconium oxide, or hafnium oxide. In this embodiment, the first insulating layer 10 may be a single-layered silicon oxide layer. An insulating layer of a circuit layer 120 to be described later as well as the first insulating layer 10 may be an inorganic layer and/or an organic layer and have a single- or multi-layered structure. The inorganic layer may include at least one of the materials described above. However, embodiments of the present inventive concept are not necessarily limited thereto.

A gate GT of the transistor 100PC is disposed on the first insulating layer 10 (e.g., disposed directly thereon in the third direction DR3). The gate GT may be a portion of a metal pattern. The gate GT overlaps the active region AL. In a process of doping or reducing the semiconductor pattern SC, AL, DR, and SCL, the gate GT may function as a mask.

A second insulating layer 20 may be disposed on the first insulating layer 10 and cover the gate GT. In an embodiment, the second insulating layer 20 may overlap the pixels in common. The second insulating layer 20 may be an inorganic layer and/or an organic layer and have a single- or multi-layered structure. In an embodiment, the second insulating layer 20 may include at least one of silicon oxide, silicon nitride, or silicon oxynitride. In this embodiment, the second insulating layer 20 may have a multi-layered structure including a silicon oxide layer and a silicon nitride layer.

A third insulating layer 30 may be disposed on the second insulating layer 20 (e.g., disposed directly thereon in the third direction DR3). The third insulating layer 30 may have a single- or multi-layered structure. For example, in an embodiment, the third insulating layer 30 may have a multi-layered structure including a silicon oxide layer and a silicon nitride layer.

A first connection electrode CNE1 may be disposed on the third insulating layer 30 (e.g., disposed directly thereon in the third direction DR3). In an embodiment, the first connection electrode CNE1 may be connected to the connection signal line SCL via a contact hole CNT-1 passing through the first, second, and third insulating layers 10, 20, and 30.

A fourth insulating layer 40 may be disposed on the third insulating layer 30 (e.g., disposed directly thereon in the third direction DR3). In an embodiment, the fourth insulating layer 40 may be a single-layered silicon oxide layer. A fifth insulating layer 50 may be disposed on the fourth insulating layer 40 (e.g., disposed directly thereon in the third direction DR3). In an embodiment, the fifth insulating layer 50 may be an organic layer.

A second connection electrode CNE2 may be disposed on the fifth insulating layer 50 (e.g., disposed directly thereon in the third direction DR3). The second connection electrode CNE2 may be connected to the first connection electrode CNE1 via a contact hole CNT-2 passing through the fourth insulating layer 40 and the fifth insulating layer 50.

A sixth insulating layer 60 may be disposed on (e.g., disposed directly thereon in the third direction DR3) the fifth insulating layer 50 and cover the second connection electrode CNE2. In an embodiment, the sixth insulating layer 60 may be an organic layer.

A light-emitting element layer 130 may be disposed on the circuit layer 120. The light-emitting element layer 130 may include the light-emitting element 100PE. For example, in an embodiment the light-emitting element layer 130 may include an organic light-emitting material, an inorganic light-emitting material, an organic-inorganic light-emitting material, a quantum dot, a quantum rod, a micro-LED, or a nano-LED. Hereinafter, the light-emitting element 100PE will be described as an organic light-emitting element as an example. However, embodiments of the present inventive concept are not necessarily limited thereto.

The light-emitting element 100PE may include a first electrode AE, an emission layer EL, and a second electrode CE.

The first electrode AE may be disposed on the sixth insulating layer 60 (e.g., disposed directly thereon in the third direction DR3). In an embodiment, the first electrode AE may be connected to the second connection electrode CNE2 via a contact hole CNT-3 passing through the sixth insulating layer 60.

A pixel-defining film 70 may be disposed on (e.g., disposed directly thereon in the third direction DR3) the sixth insulating layer 60 and cover a portion of the first electrode AE. An opening 70-OP is defined in the pixel-defining film 70. The opening 70-OP of the pixel-defining film 70 exposes at least a portion of the first electrode AE.

The first display portion DA1-F (see FIG. 1A) may include a light-emitting region PXA and a non-light-emitting region NPXA adjacent to the light-emitting region PXA. The non-light-emitting region NPXA may surround the light-emitting region PXA (e.g., in the first and/or second directions DR1, DR2). In this embodiment, the light-emitting region PXA is defined to correspond to a partial region of the first electrode AE exposed by the opening 70-OP.

The emission layer EL may be disposed on the first electrode AE. The emission layer EL may be disposed in a region corresponding to the opening 70-OP. For example, in an embodiment the emission layer EL may be separately formed in each of the pixels. If the emission layer EL is separately formed in each of the pixels, each emission layer EL may emit at least one of blue light, red light, or green light. However, embodiments of the present inventive concept are not necessarily limited thereto, and the emission layer EL may be connected to the pixels and included in common in the pixels. In an embodiment, the emission layer EL may provide blue light, or may provide white light. However, embodiments of the present inventive concept are not necessarily limited thereto.

The second electrode CE may be disposed on the emission layer EL. In an embodiment, the second electrode CE may have an integrated shape and may be included in common in the plurality of pixels.

In an embodiment of the present inventive concept, a hole control layer may be disposed between the first electrode AE and the emission layer EL (e.g., in the third direction DR3). In an embodiment, the hole control layer may be disposed in common in the light-emitting region PXA and the non-light-emitting region NPXA. The hole control layer may include a hole transport layer and may further include a hole injection layer. An electron control layer may be disposed between the emission layer EL and the second electrode CE (e.g., in the third direction DR3). The electron control layer may include an electron transport layer and may further include an electron injection layer. In an embodiment, the hole control layer and the electron control layer may be formed in common in the plurality of pixels by using an open mask or an inkjet process.

An encapsulation layer 140 may be disposed on the light-emitting element layer 130 (e.g., disposed directly thereon in the third direction DR3). The encapsulation layer 140 may include an inorganic layer, an organic layer, and an inorganic layer which are sequentially stacked (e.g., in the third direction DR3). However, embodiments of the present inventive concept are not necessarily limited thereto and the layers included in the encapsulation layer 140 may vary. The inorganic layers may protect the light-emitting element layer 130 from moisture and oxygen, and the organic layer may protect the light-emitting element layer 130 from foreign substances such as dust particles. In an embodiment, the inorganic layers may include a silicon nitride layer, a silicon oxynitride layer, a silicon oxide layer, a titanium oxide layer, an aluminum oxide layer, or the like. The organic layer may include an acrylic organic layer. However, embodiments of the present inventive concept are not necessarily limited thereto.

In an embodiment, a sensor layer 200 may include a base layer 201, a first conductive layer 202, an intermediate insulating layer 203, a second conductive layer 204, and a cover insulating layer 205.

In an embodiment, the base layer 201 may be an inorganic layer including at least one of silicon nitride, silicon oxynitride, or silicon oxide. Alternatively, the base layer 201 may be an organic layer including an epoxy resin, an acryl resin, or an imide-based resin. The base layer 201 may have a single-layered structure or a multi-layered structure in which layers are stacked along the third direction DR3.

In an embodiment, each of the first conductive layer 202 and the second conductive layer 204 may have a single-layered structure or a multi-layered structure in which layers are stacked along the third direction DR3.

In an embodiment in which each of the first conductive layer 202 and the second conductive layer 204 have a single-layered structure, each of the first conductive layer 202 and the second conductive layer 204 may include a metal layer or a transparent conductive layer. In an embodiment, the metal layer may include molybdenum, silver, titanium, copper, aluminum, or alloy thereof. The transparent conductive layer may include a transparent conductive oxide such as indium tin oxide (ITO), indium zinc oxide (IZO), zinc oxide (ZnO), or indium zinc tin oxide (IZTO). In addition, the transparent conductive layer may include a conductive polymer such as poly(3,4-ethylenedioxythiophene) (PEDOT), a metal nanowire, graphene, etc.

The first conductive layer 202 and the second conductive layer 204 each having a multi-layered structure may each include metal layers. The metal layers may have a three-layered structure of titanium/aluminum/titanium for example. The conductive layer having a multi-layered structure may include at least one metal layer and at least one transparent conductive layer.

In an embodiment of the present inventive concept, a thickness of the first conductive layer 202 (e.g., length in the third direction DR3) may be greater than or equal to a thickness of the second conductive layer 204 (e.g., length in the third direction DR3). In an embodiment in which the thickness of the first conductive layer 202 is greater than the thickness of the second conductive layer 204, resistance of a component included in the first conductive layer 202 may be reduced. In addition, even if the thickness of the first conductive layer 202 is increased, a pattern of the first conductive layer 202 may be less likely to be viewed due to external light reflection than that of the second conductive layer 204 since the first conductive layer 202 may be disposed lower than the second conductive layer 204.

In an embodiment of the present inventive concept, a width of a first mesh line included in the first conductive layer 202 may be less than or equal to a width of a second mesh line included in the second conductive layer 204. When a user faces the electronic device 1000 (see FIG. 1A), a probability that the first mesh line will be viewed by the user may be reduced since the first mesh line may have a smaller width than the second mesh line.

At least one of the intermediate insulating layer 203 or the cover insulating layer 205 may include an inorganic film. In an embodiment, the inorganic film may include at least one of aluminum oxide, titanium oxide, silicon oxide, silicon nitride, silicon oxynitride, zirconium oxide, or hafnium oxide.

At least one of the intermediate insulating layer 203 or the cover insulating layer 205 may include an organic film. In an embodiment, the organic film may include at least one of an acrylic resin, a methacryl-based resin, a polyisoprene-based resin, a vinyl-based resin, an epoxy-based resin, a urethane-based resin, a cellulose-based resin, a siloxane-based resin, a polyimide-based resin, a polyamide-based resin, or a perylene-based resin.

It is described above as an example that the sensor layer 200 includes the first conductive layer 202 and the second conductive layer 204, that is a total of two conductive layers. However, embodiments of the present inventive concept are not necessarily limited thereto. For example, in some embodiments the sensor layer 200 may include three or more conductive layers.

Figure 7:
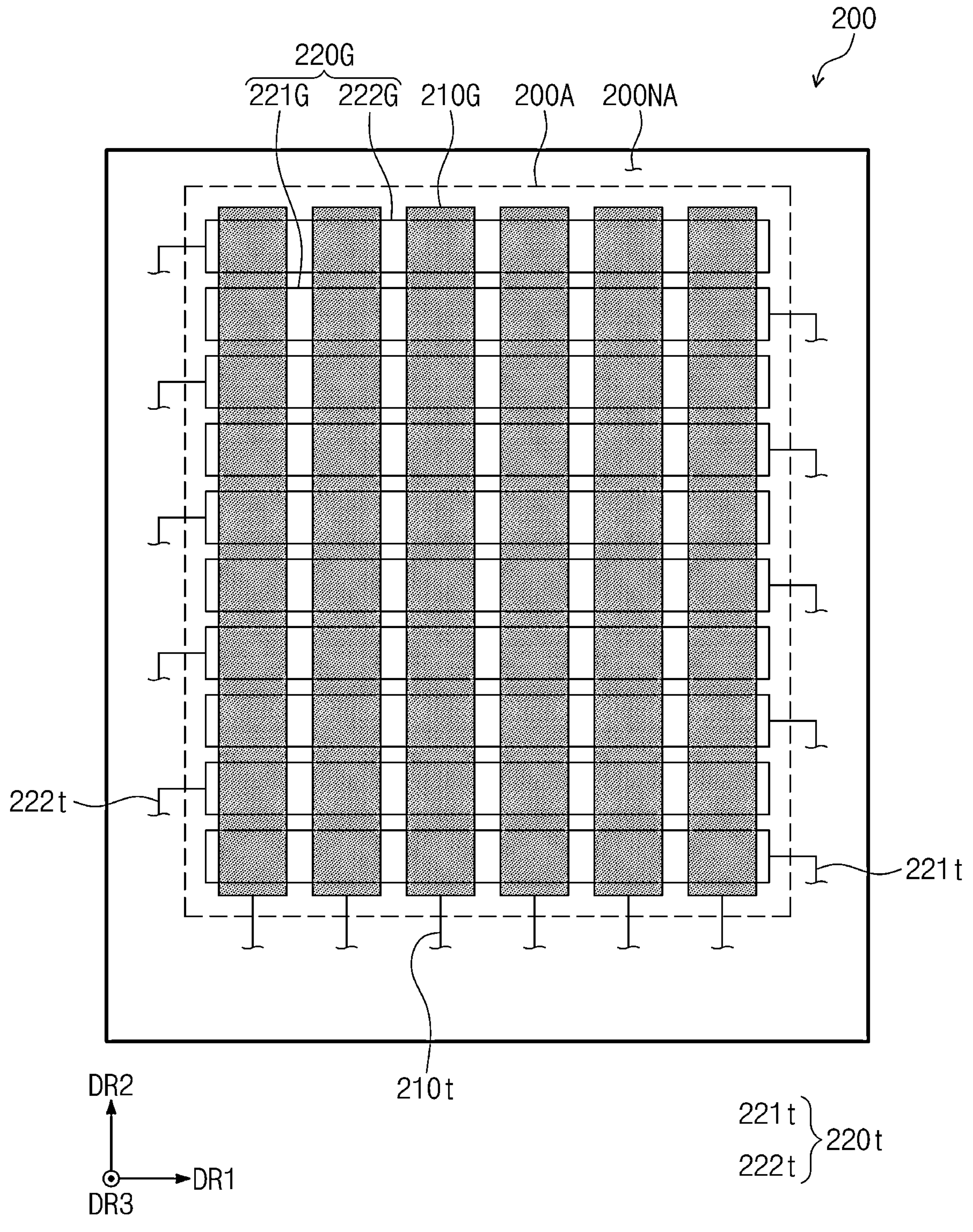
FIG. 7 is a plan view of a sensor layer according to an embodiment of the present inventive concept.

FIG. 7 is a plan view of a sensor layer 200 according to an embodiment of the present inventive concept.

Referring to FIG. 7, a sensing region 200A and a peripheral region 200NA adjacent to the sensing region 200A may be defined in the sensor layer 200.

The sensor layer 200 may include a plurality of first electrode groups 210G and a plurality of second electrode groups 220G disposed in the sensing region 200A. Each of the first electrode groups 210G may cross the second electrode groups 220G. In an embodiment, each of the first electrode groups 210G may extend longitudinally along a second direction DR2, and the first electrode groups 210G may be arranged to be spaced apart from each other in a first direction DR1. Each of the second electrode groups 220G may extend longitudinally along the first direction DR1, and the second electrode groups 220G may be arranged to be spaced apart from each other in the second direction DR2.

FIG. 7 illustrates six first electrode groups 210G and ten second electrode groups 220G. However, the number of the first electrode groups 210G and the number of the second electrode groups 220G are not necessarily limited thereto.

In an embodiment, the sensor layer 200 may further include a plurality of first trace lines 210*t* and a plurality of second trace lines 220*t* disposed in the peripheral region 200NA.

In an embodiment of the present inventive concept, the first trace lines 210*t* may be electrically connected, in one-to-one correspondence, to the first electrode groups 210G. For example, one first trace line 210*t* may be connected to one first electrode group 210G. In an embodiment of the present inventive concept, the second trace lines 220*t* may be electrically connected, in one-to-one correspondence, to the second electrode groups 220G. For example, one second trace line 220*t* may be electrically connected to one second electrode group 220G.

In an embodiment, the second electrode groups 220G may include at least one (2-1)-th electrode group 221G and at least one (2-2)-th electrode group 222G. In an embodiment of the present inventive concept, the second electrode groups 220G may include a plurality of (2-1)-th electrode groups 221G and a plurality of (2-2)-th electrode groups 222G, and the (2-1)-th electrode groups 221G and the (2-2)-th electrode groups 222G may be alternately arranged (e.g., in the second direction DR2). The (2-1)-th electrode groups 221G may correspond to second electrode groups disposed in odd-numbered positions among the second electrode groups 220G, and the (2-2)-th electrode groups 222G may correspond to second electrode groups disposed in even-numbered positions among the second electrode groups 220G.

In an embodiment, the second trace lines 220*t* may include at least one first crossing trace line 221*t* and at least one second crossing trace line 222*t*. Among the second trace lines 220*t*, second trace lines electrically connected to the (2-1)-th electrode groups 221G may be referred to as first crossing trace lines 221*t*. Among the second trace lines 220*t*, second trace lines electrically connected to the (2-2)-th electrode groups 222G may be referred to as second crossing trace lines 222*t*.

Routing directions of the (2-1)-th electrode groups 221G and the (2-2)-th electrode groups 222G may be different from each other. As used herein, different routing directions means different connection positions of electrodes and trace lines. For example, a first connection position of the first crossing trace lines 221*t* electrically connected to the (2-1)-th electrode groups 221G and a second connection position of the second crossing trace lines 222*t* electrically connected to the (2-2)-th electrode groups 222G may be different from each other. The first connection position may be a right end (e.g., in the first direction DR1) of each of the (2-1)-th electrode groups 221G, and the second connection position may be a left end (e.g., in a direction opposite to the first direction DR1) of each of the (2-2)-th electrode groups 222G. One side of the (2-1)-th electrode groups 221G corresponding to the first connection position and one side of the (2-2)-th electrode groups 222G corresponding to the second connection position may be disposed in opposite directions with respect to a first direction DR1.

Figure 8:
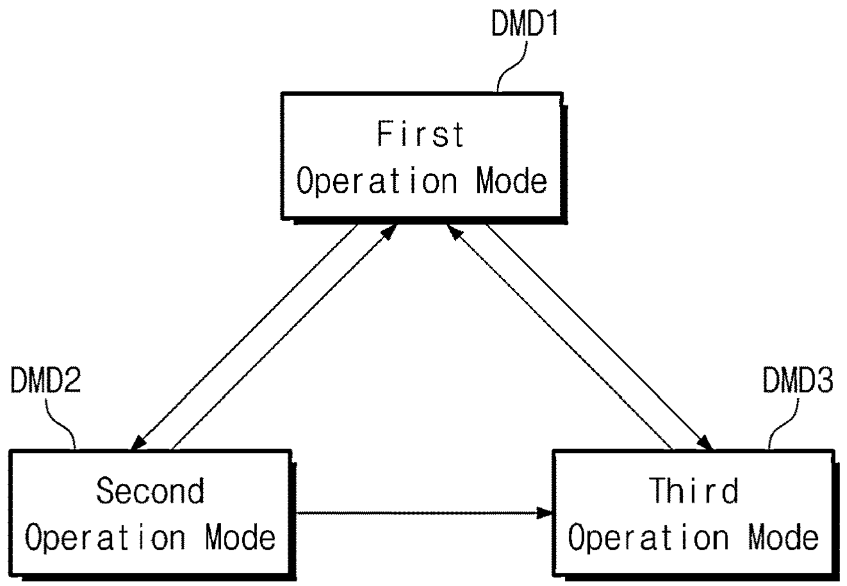
FIG. 8 is a diagram illustrating an operation of a sensor driver according to an embodiment of the present inventive concept.

FIG. 8 is a diagram illustrating an operation of the sensor driver 200C (see FIG. 4) according to an embodiment of the present inventive concept.

Referring to FIGS. 4 and 8, the sensor driver 200C may be configured to be selectively driven in any one of a first operation mode DMD1, a second operation mode DMD2, or a third operation mode DMD3.

The first operation mode DMD1 may be referred to as a touch and pen waiting mode, the second operation mode DMD2 may be referred to as a touch activating and pen waiting mode, and the third operation mode DMD3 may be referred to as a pen activating mode. In an embodiment, the first operation mode DMD1 may be a mode for waiting for the first input 2000 and the second input 3000. The second operation mode DMD2 may be a mode for sensing the first input 2000 and waiting for the second input 3000. The third operation mode DMD3 may be a mode for sensing the second input 3000.

In an embodiment of the present inventive concept, the sensor driver 200C may be driven in the first operation mode DMD1 first. When the first input 2000 is sensed in the first operation mode DMD1, the sensor driver 200C may be switched (e.g., changed) to the second operation mode DMD2. Alternatively, when the second input 3000 is sensed in the first operation mode DMD1, the sensor driver 200C may be switched (e.g., changed) to the third operation mode DMD3.

In an embodiment of the present inventive concept, when the second input 3000 is sensed in the second operation mode DMD2, the sensor driver 200C may be switched to the third operation mode DMD3. When the first input 2000 is released (e.g., not sensed) in the second operation mode DMD2, the sensor driver 200C may be switched to the first operation mode DMD1. When the second input 3000 is released (e.g., not sensed) in the third operation mode DMD3, the sensor driver 200C may be switched to the first operation mode DMD1.

Figure 9:
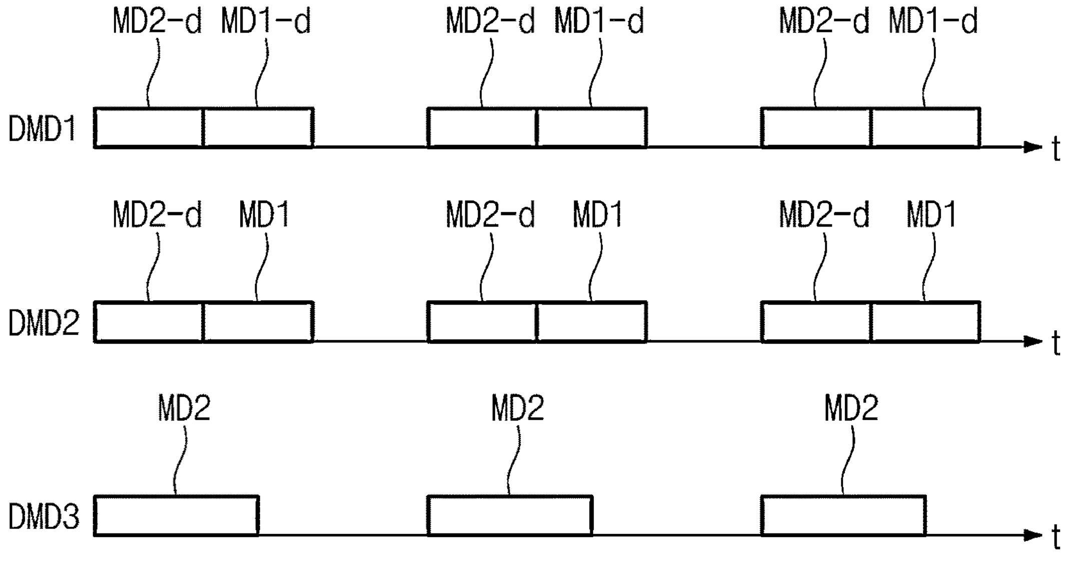
FIG. 9 is a diagram illustrating an operation of a sensor driver according to an embodiment of the present inventive concept.

FIG. 9 is a diagram illustrating an operation of the sensor driver 200C (see FIG. 4) according to an embodiment of the present inventive concept.

Referring to FIGS. 4, 8, and 9, an operation in the first to third operation modes DMD1, DMD2, and DMD3 is illustrated in a time t sequence according to an embodiment of the present inventive concept.

In an embodiment, in the first operation mode DMD1, the sensor driver 200C may be repeatedly driven in a second mode MD2-*d* and a first mode MD1-*d*. During the second mode MD2-*d*, the sensor layer 200 may be scan driven so as to detect the second input 3000. During the first mode MD1-*d*, the sensor layer 200 may be scan driven so as to detect the first input 2000. FIG. 9 illustrates that the sensor driver 200C is driven in the second mode MD2-*d* and then consecutively driven in the first mode MD1-*d*. However, embodiments of the present inventive concept are not necessarily limited thereto and a sequence may vary.

In an embodiment, in the second operation mode DMD2, the sensor driver 200C may be repeatedly driven in a second mode MD2-*d* and a first mode MD1. During the second mode MD2-*d*, the sensor layer 200 may be scan driven so as to detect the second input 3000. During the first mode MD1, the sensor layer 200 may be scan driven so as to detect a coordinate based on the first input 2000.

In the third operation mode DMD3, the sensor driver 200C may be driven in a second mode MD2. During the second mode MD2, the sensor layer 200 may be scan driven so as to detect a coordinate based on the second input 3000. In the third operation mode DMD3, the sensor driver 200C may not operate in a first mode MD1-*d* or MD1 until the second input 3000 is released (e.g., not sensed).

Figure 10:
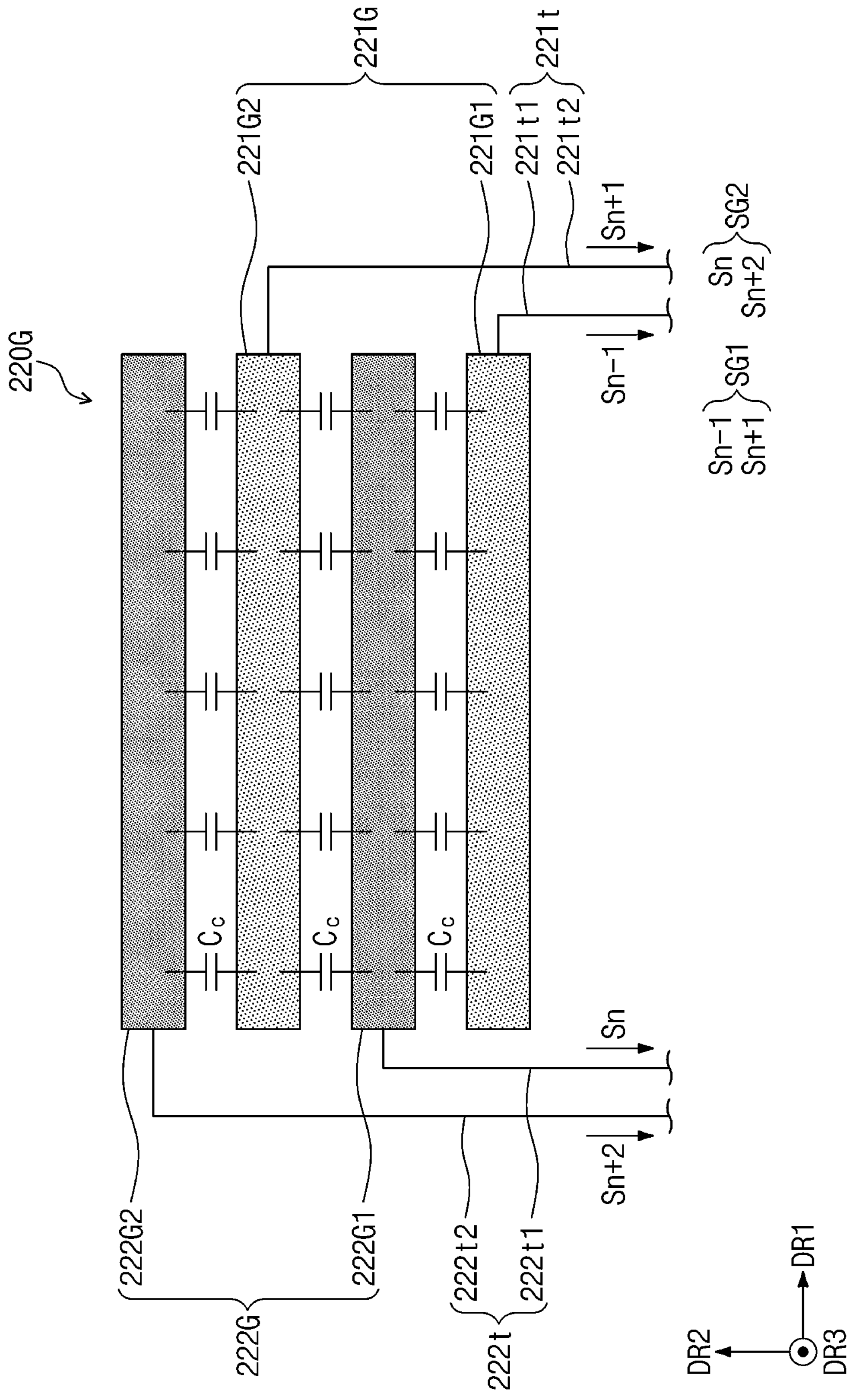
FIG. 10 is a diagram illustrating a portion of one electrode group according to an embodiment of the present inventive concept.

FIG. 10 is a diagram illustrating a portion of second electrode groups according to an embodiment of the present inventive concept.

Referring to FIGS. 7, 9, and 10, in an embodiment the second electrode groups 220G may include (2-1)-th electrode groups 221G and (2-2)-th electrode groups 222G. FIG. 10 illustrates two (2-1)-th electrode groups 221G and two (2-2)-th electrode groups 222G which are alternately arranged in one-to-one manner (e.g., in the second direction DR2).

The two (2-1)-th electrode groups 221G may respectively correspond to an electrode group 221G1 disposed in an (n−1)-th position and an electrode group 221G2 disposed in an (n+1)-th position, and the two (2-2)-th electrode groups 222G may respectively correspond to an electrode group 222G1 disposed in an n-th position and an electrode group 222G2 disposed in an (n+2)-th position. Here, n is a natural number greater than or equal to 2. Hereinafter, the electrode group 221G1 disposed in the (n−1)-th position, the electrode group 222G1 disposed in the n-th position, the electrode group 221G2 disposed in the (n+1)-th position, and the electrode group 222G2 disposed in the (n+2)-th position are respectively referred to as a first group 221G1, a second group 222G1, a third group 221G2, and a fourth group 222G2.

First crossing trace lines 221*t* electrically connected to the first group 221G1 and the third group 221G2 may be respectively referred to as a (1-1)-th crossing trace line 221*t*1 and a (1-2)-th crossing trace line 221*t*2, and second crossing trace lines 222*t* electrically connected to the second group 222G1 and the fourth group 222G2 may be respectively referred to as a (2-1)-th crossing trace line 222*t*1 and a (2-2)-th crossing trace line 222*t*2.

In an embodiment, a coupling capacitor Cc may be defined between one (2-1)-th electrode group 221G and one (2-2)-th electrode group 222G adjacent thereto (e.g., in the second direction DR2). In this embodiment, induced current generated at time of pen sensing may be transmitted, through the coupling capacitor Cc, from the (2-1)-th electrode group 221G to the (2-2)-th electrode group 222G or from the (2-2)-th electrode group 222G to the (2-1)-th electrode group 221G. For example, the (2-1)-th electrode group 221G may serve to supplement a signal transmitted from the (2-2)-th electrode group 222G to the sensor driver 200C, and the (2-2)-th electrode group 222G may serve to supplement a signal transmitted from the (2-1)-th electrode group 221G to the sensor driver 200C.

The second mode MD2-*d* or the second mode MD2 may include a pen sensing driving mode. In an embodiment, in the pen sensing driving mode, the sensor layer 200 and the sensor driver 200C may sense induced current generated due to a magnetic field which is emitted from the pen PN. In an embodiment, in the pen sensing driving mode, the sensor driver 200C may be configured to receive a first signal SG1 from the (2-1)-th electrode group 221G and to receive a second signal SG2 from the (2-2)-th electrode group 222G. For example, the first signal SG1 may include a (1-1)-th signal Sn−1 and a (1-2)-th signal Sn+1 respectively received from the first group 221G1 and the third group 221G2. The second signal SG2 may include a (2-1)-th signal Sn and a (2-2)-th signal Sn+2 respectively received from the second group 222G1 and the fourth group 222G2.

Figure 11:
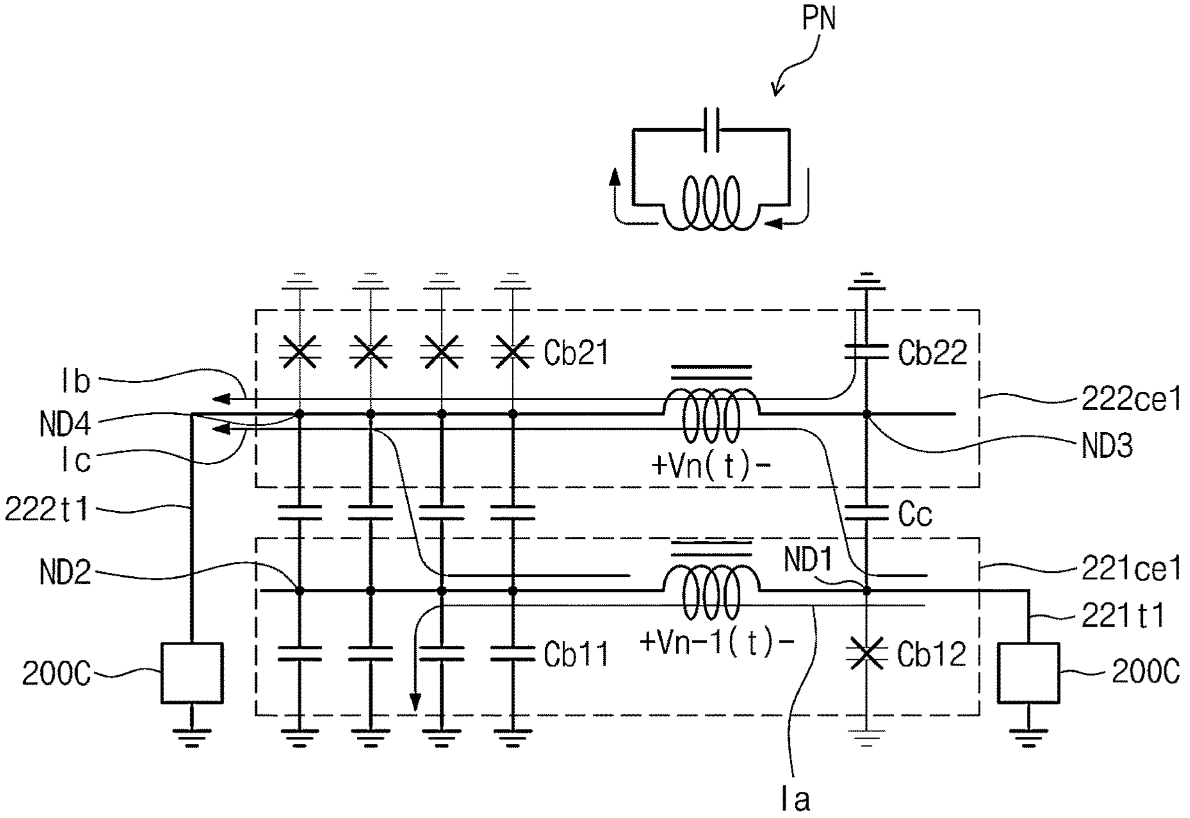
FIG. 11 is an equivalent circuit diagram illustrating a relationship between one electrode group and a pen according to an embodiment of the present inventive concept.
Figure 12:
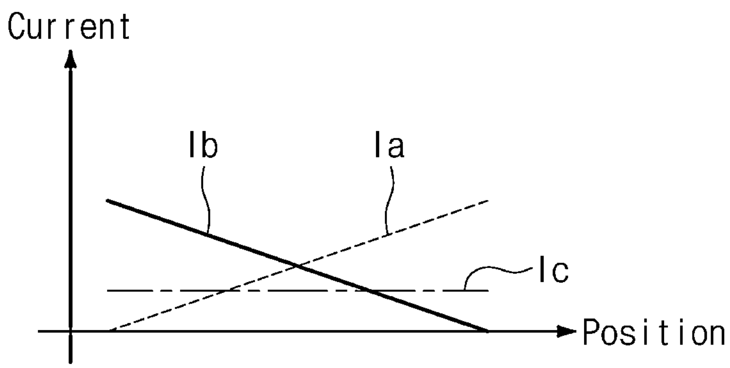
FIG. 12 is a graph showing a magnitude of current versus a position of a pen with respect to one channel according to an embodiment of the present inventive concept.
Figure 13:
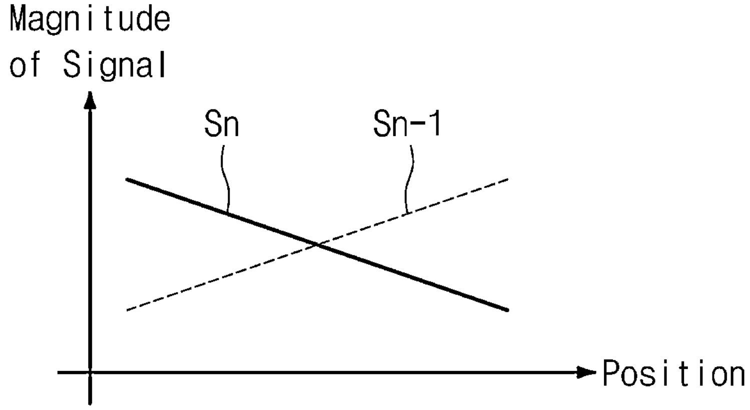
FIG. 13 is a graph showing a magnitude of an output signal versus a position of a pen with respect to one channel according to an embodiment of the present inventive concept.

FIG. 11 is an equivalent circuit diagram illustrating a relationship between one electrode group and a pen according to an embodiment of the present inventive concept. FIG. 12 is a graph showing a magnitude of current versus a position of a pen with respect to one channel. FIG. 13 is a graph showing a magnitude of an output signal versus a position of a pen with respect to one channel.

Referring to FIGS. 10 and 11, a (2-1)-th electrode group 221G (e.g., the first group 221G1) may be electrically connected to a sensor driver 200C through a first node ND1, and a (2-2)-th electrode group 222G (e.g., the second group 222G1) may be electrically connected to the sensor driver 200C through a fourth node ND4. In an embodiment, the first node ND1 may be a right node of the (2-1)-th electrode group 221G (e.g., the first group 221G1), and the fourth node ND4 may be a left node of the (2-2)-th electrode group 222G (e.g., the second group 222G1).

A plurality of coupling capacitors Cc may be defined between the (2-1)-th electrode group 221G and the (2-2)-th electrode group 222G adjacent to each other (e.g., in the second direction DR2). Referring to FIGS. 10 and 11, it is illustrated that five coupling capacitors Cc are defined between the (2-1)-th electrode group 221G and the (2-2)-th electrode group 222G adjacent to each other, such as between the first group 221G1 and the second group 222G1. However, embodiments of the present inventive concept are not necessarily limited thereto and the number of the capacitors may vary.

In an embodiment, five first base capacitors Cb11 and Cb12 may be defined in the (2-1)-th electrode group 221G (e.g., the first group 221G1), and five second base capacitors Cb21 and Cb22 may be defined in the (2-2)-th electrode group 222G (e.g., the second group 222G1) as well. The number of the first base capacitors Cb11 and Cb12 may correspond to the number of first sensing patterns 221*sp* (see FIG. 18) to be described later, and the number of the second base capacitors Cb21 and Cb22 may correspond to the number of second sensing patterns 222*sp* (see FIG. 18) to be described later.

If a pen PN is close to the (2-1)-th electrode group 221G and the (2-2)-th electrode group 222G adjacent to each other, due to a magnetic field generated from the pen PN, first induced electromotive force $v_{n-1}(t)$ may be generated in the (2-1)-th electrode group 221G and second induced electromotive force $v_n(t)$ may be generated in the (2-2)-th electrode group 222G.

First to third induced current Ia, Ib, and Ic may be generated in the (2-1)-th electrode group 221G and the (2-2)-th electrode group 222G due to the induced electromotive force $v_{n-1}(t)$ and $v_n(t)$. The first signal SG1 may correspond to a sum of first induced current Ia and second induced current Ib, and the second signal SG2 may correspond to a negative value of a sum of the second induced current Ib and third induced current Ic. FIGS. 11 and 12 illustrate a case in which the pen PN is close to the first group 221G1 and the second group 222G1, and FIG. 13 illustrates the (1-1)-th signal Sn−1 of the first signal SG1 received from the first group 221G1 and the (2-1)-th signal Sn of the second signal SG2 received from the second group 222G1.

For example, a capacitance of each of the first base capacitors Cb11 and Cb12 and a capacitance of each of the second base capacitors Cb21 and Cb22 are Cb, and a capacitance of the coupling capacitors Cc is Cc.

In an embodiment, the first node ND1 and the fourth node ND4 connected to the sensor driver 200C may be grounded. In addition, a voltage of a second node ND2 corresponding to a left end of the (2-1)-th electrode group 221G (e.g., the first group 221G1) may be $v_{n-1}(t)$, and a voltage of a third node ND3 corresponding to a right end of the (2-2)-th electrode group 222G (e.g., the second group 222G1) may be $-v_n(t)$. Thus, since voltage of both ends of the first base capacitor Cb11 and the second base capacitor Cb21 may be grounded, current may not flow.

The first induced current Ia according to time may be expressed as a following equation.

$$Ia(t) = 4Cb\frac{dv_{n-1}(t)}{dt}$$

The second induced current Ib according to time may be expressed as a following equation.

$$Ib(t) = Cb\frac{dv_n(t)}{dt}$$

The third induced current Ic according to time may be expressed as a following equation.

$$Ic(t) \approx 4Cc\frac{dv_{n-1}(t)}{dt} + Cc\frac{dv_n(t)}{dt}$$

The first signal SG1 (e.g., the (1-1)-th signal Sn−1) may correspond to −Ia(t)−Ic(t), and the second signal SG2 (e.g., the (2-1)-th signal Sn) may correspond to Ib(t)+Ic(t).

Referring to FIGS. 11, 12, and 13, as a position of the pen PN moves from the first node ND1 towards the second node ND2, the first induced current Ia may gradually decrease, and the third induced current Ic may be substantially the same. According to this embodiment, the third induced current Ic may be additionally generated due to the coupling capacitors Cc. Thus, total induced current may be increased compared to induced current in a comparative embodiment in which the coupling capacitors Cc are not generated, and a magnitude of the total induced current may be sufficient for sensing an input by the pen PN. For example, even if a position of the pen PN is close to the second node ND2 disposed far from a connection position with a (1-1)-th crossing trace line 221*t*1, a magnitude of the total induced current may be secured to be greater than or equal to a predetermined value, thereby sufficiently sensing an input by the pen PN.

As a position of the pen PN moves from the fourth node ND4 towards the third node ND3, the second induced current Ib may gradually decrease, and the third induced current Ic may be substantially the same. According to this embodiment, the third induced current Ic may be additionally generated due to the coupling capacitors Cc. Thus, total induced current may be increased compared to induced current in a comparative embodiment in which the coupling capacitors Cc are not generated, and a magnitude of the total induced current may be sufficient for sensing an input by the pen PN. For example, even if a position of the pen PN is close to the third node ND3 disposed far from a connection position with a (2-1)-th crossing trace line **222*t*1**, a magnitude of the total induced current may be secured to be greater than or equal to a predetermined value, and an input by the pen may be sufficiently sensed.

Thus, the sensor driver 200C may stably receive a signal from an electrode regardless of a distance between an input terminal and a region in which an input by the pen PN is inputted. As a result, the electronic device 1000 (see FIG. 1A) having increased sensing sensitivity may be provided.

In addition, according to an embodiment of the present inventive concept, coupling capacitances may be defined (e.g., provided or formed) between adjacent electrode groups in at least one electrode group in the sensor layer 200, thereby sensing both a touch input and a pen input. Thus, a degree of freedom in design of electrodes in the sensor layer 200 may be increased, and securing of a bandwidth may be facilitated.

Figure 14:
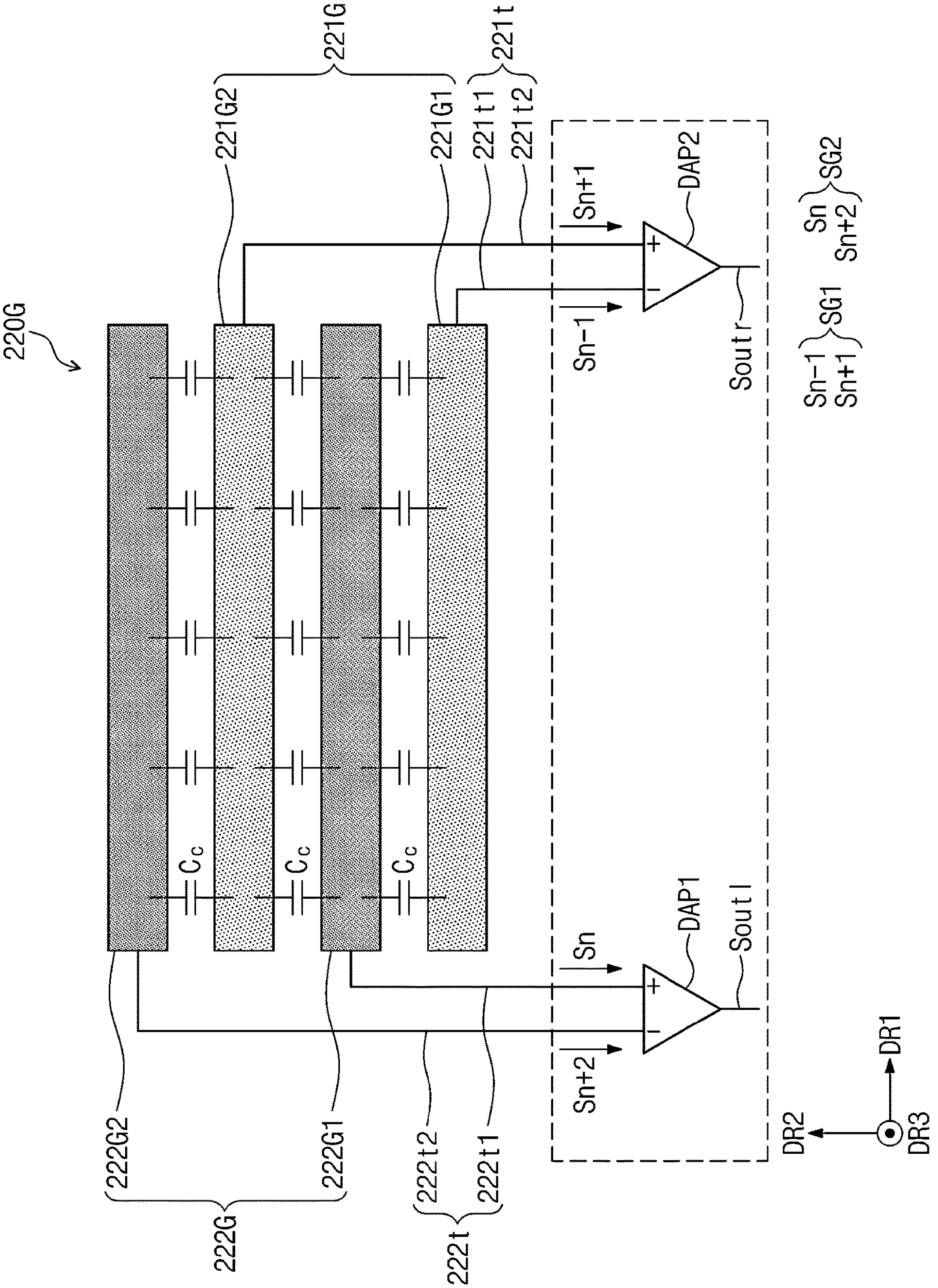
FIG. 14 is a diagram illustrating four electrode groups and a portion of a sensor driver according to an embodiment of the present inventive concept.

FIG. 14 is a diagram illustrating four electrode groups and a portion of a sensor driver according to an embodiment of the present inventive concept.

Referring to FIGS. 7 and 14, in an embodiment a sensor driver 200C may include a first differential amplifier DAP1 and a second differential amplifier DAP2.

In an embodiment, in a pen sensing driving mode, the first differential amplifier DAP1 may receive signals from (2-2)-th electrode groups 222G, and the second differential amplifier DAP2 may receive signals from (2-1)-th electrode groups 221G.

In an embodiment, in the pen sensing driving mode, an inverting terminal of the first differential amplifier DAP1 may be electrically connected to a fourth group 222G2 via a (2-2)-th crossing trace line **222*t*2, and a non-inverting terminal of the first differential amplifier DAP1 may be electrically connected to a second group 222G1 via a (2-1)-th crossing trace line 222*t*1. For example, the inverting terminal and the non-inverting terminal of the first differential amplifier DAP1 may be respectively electrically connected to two (2-2)-th electrode groups 222**G different from each other, such as a first (2-2)-th electrode group and a second (2-2)-th electrode group.

FIG. 14 illustrates that adjacent two (2-2)-th electrode groups (e.g., the second group 222G1 and the fourth group 222G2) among the (2-2)-th electrode groups 222G are set as two (2-2)-th electrode groups 222G electrically connected to an inverting terminal and a non-inverting terminal, respectively, of one first differential amplifier DAP1. However, embodiments of the present inventive concept are not necessarily limited thereto. For example, in some embodiments, two (2-2)-th electrode groups spaced apart from each other with at least one (2-2)-th electrode group therebetween (e.g., in the second direction DR2) may be set as the two (2-2)-th electrode groups 222G electrically connected to an inverting terminal and a non-inverting terminal, respectively, of one first differential amplifier DAP1.

In an embodiment, in the pen sensing driving mode, an inverting terminal of the second differential amplifier DAP2 may be electrically connected to a first group 221G1 via a (1-1)-th crossing trace line **221*t*1, and a non-inverting terminal of the second differential amplifier DAP2 may be electrically connected to a third group 221G2 via a (1-2)-th crossing trace line 221*t*2. For example, the inverting terminal and the non-inverting terminal of the second differential amplifier DAP2 may be respectively electrically connected to two (2-1)-th electrode groups 221**G different from each other, such as a first (2-1)-th electrode group and a second (2-1)-th electrode group.

FIG. 14 illustrates that adjacent two (2-1)-th electrode groups (e.g., the first group 221G1 and the third group 221G2) among the (2-1)-th electrode groups 221G are set as two (2-1)-th electrode groups 221G electrically connected to an inverting terminal and a non-inverting terminal, respectively, of one second differential amplifier DAP2. However, embodiments of the present inventive concept are not necessarily limited thereto. For example, in some embodiments two (2-1)-th electrode groups spaced apart from each other with at least one (2-1)-th electrode group therebetween (e.g., in the second direction DR2) may be set as two (2-1)-th electrode groups 221G electrically connected to an inverting terminal and a non-inverting terminal, respectively, of one second differential amplifier DAP2.

Figure 15A:
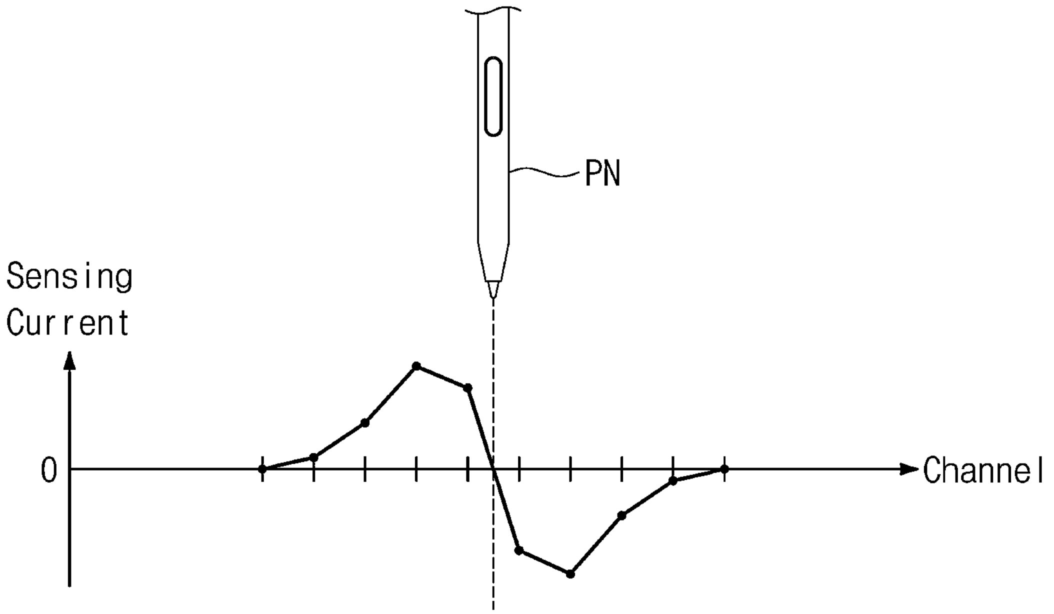
FIG. 15A is a diagram illustrating current sensed in a plurality of channels according to an embodiment of the present inventive concept.
Figure 15B:
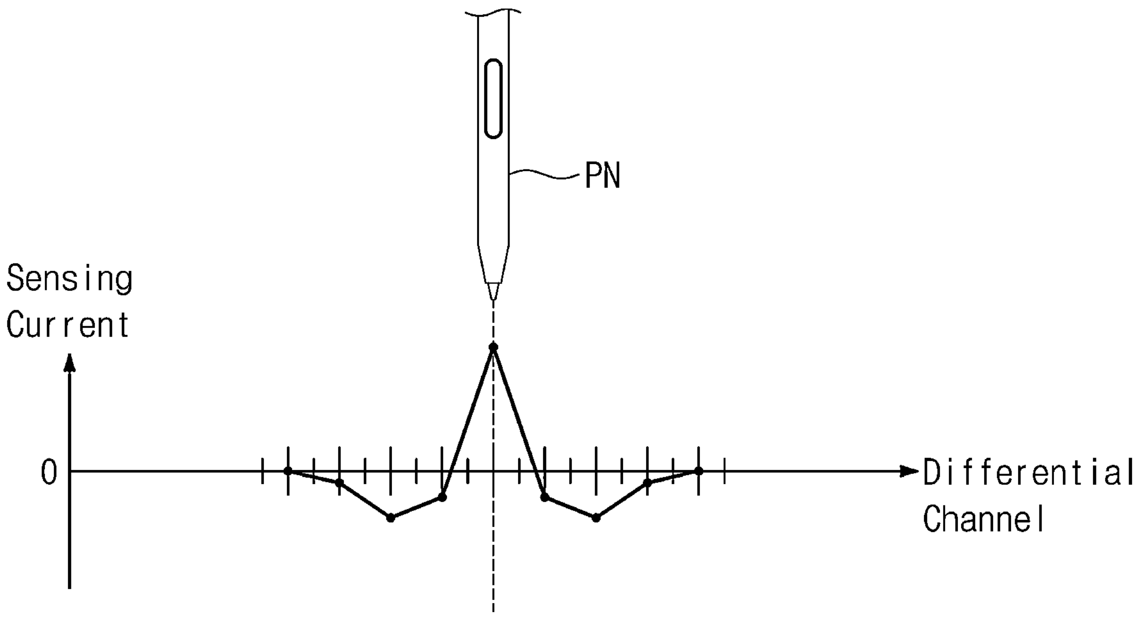
FIG. 15B is a diagram illustrating current obtained from a differential pair of a plurality of channels according to an embodiment of the present inventive concept.

FIG. 15A is a diagram illustrating current sensed in a plurality of channels according to an embodiment of the present inventive concept. FIG. 15B is a diagram illustrating current obtained from a differential pair of a plurality of channels according to an embodiment of the present inventive concept.

Referring to FIGS. 7 and 15A, directions of current sensed from the channels spaced apart from each other with a portion in which a pen PN is positioned therebetween may be different. In an embodiment, the channels may respectively correspond to the second electrode groups 220G. Thus, directions of current flowing to the channels on a left side and to the channels on a right side with respect to a position of the pen PN may be different. Thus, the sensor driver 200C may sense current flowing in directions different from each other with respect to the position of the pen PN. If the pen PN is positioned right above one electrode group 220G, a signal sensed from the one electrode group 220G may be "0". For example, as described with reference to FIG. 10, if a coordinate is calculated using an output signal SG1 or SG2 obtained from one electrode group 220G, a magnitude of a signal received from the one electrode group 220G directly corresponding to the position of the pen PN may be "0".

Referring to FIGS. 10, 14, and 15B, an output signal Soutl or Soutr is a signal obtained from two or more electrode groups 221G and 222G. For example, current may be sensed through differential sensing of channels adjacent to each other or channels spaced apart from each other (e.g., in the second direction DR2). In an embodiment, a coordinate of a pen PN may be relatively easily calculated based on a centroid method or a maximum point of a trend line. Referring to FIG. 14, an output signal Soutl (or referred to as a second output signal) outputted from the first differential amplifier DAP1 may be a signal obtained from the (2-2)-th electrode groups 222G, and an output signal Soutr (or referred to as a first output signal) outputted from the second differential amplifier DAP2 may be a signal obtained from the (2-1)-th electrode groups 221G. Thus, current may be sensed through differential sensing of channels corresponding to the (2-2)-th electrode groups 222G, and current may be sensed through differential sensing of channels corresponding to the (2-1)-th electrode groups 221G.

FIG. 14 illustrates that a differential operation is implemented via the differential amplifiers DAP1 and DAP2. However, embodiments of the present inventive concept are not necessarily limited thereto. For example, in an embodiment data may be obtained by converting analog signals received from the (2-1)-th electrode groups 221G into first digital signals and performing a difference operation on the first digital signals, and data may also be obtained by converting analog signals received from the (2-2)-th electrode groups 222G into second digital signals and performing a difference operation on the second digital signals.

Figure 16A:
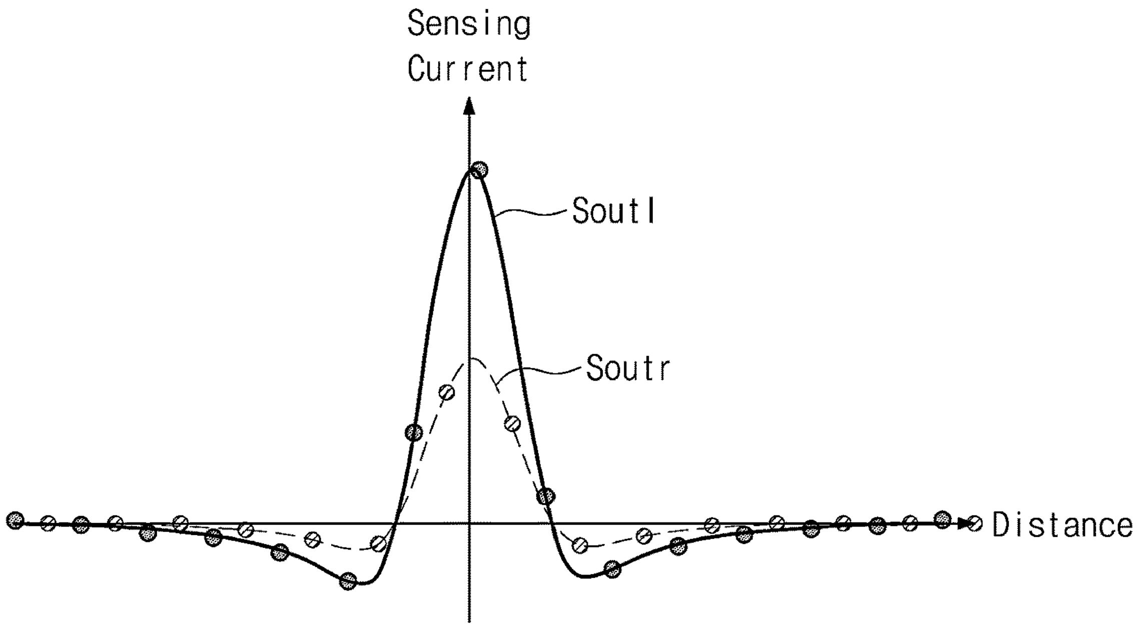
FIGS. 16A and 16B are diagrams illustrating current obtained from a differential pair of first cross electrodes and current obtained from a differential pair of second cross electrodes according to embodiments of the present inventive concept.
Figure 16B:
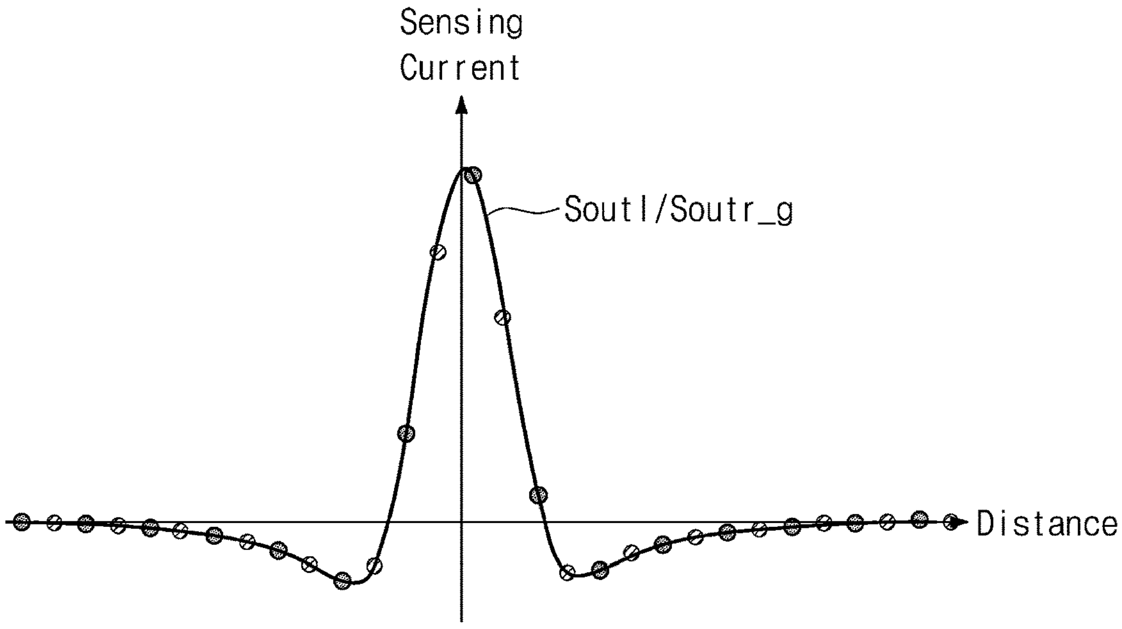

FIGS. 16A and 16B are diagrams illustrating current obtained from a differential pair of (2-1)-th electrode groups and current obtained from a differential pair of (2-2)-th electrode groups according to an embodiment of the present inventive concept.

Referring to FIGS. 14, 16A, and 16B, in an embodiment of the present inventive concept, the sensor driver 200C may further include a charge voltage amplifier, and the sensor driver 200C may be configured to change a gain applied to each of the (2-1)-th electrode groups 221G or the (2-2)-th electrode groups 222G according to a position of an active region.

For example, if a position of the pen PN is disposed relatively leftward (e.g., in the direction opposite to the first direction DR1), as illustrated in FIG. 16A, a magnitude of a second output signal Soutl obtained from the (2-2)-th electrode groups 222G may be greater than a magnitude of a first output signal Soutr obtained from the (2-1)-th electrode groups 221G. In this embodiment, the sensor driver 200C may amplify the first output signal Soutr obtained from the (2-1)-th electrode groups 221G with a predetermined gain value. In an embodiment, the sensor driver 200C may adjust the gain value, and for example, the gain value may be adjusted to a value which amplifies the magnitude of the first output signal Soutr obtained from the (2-1)-th electrode groups 221G so as to be substantially the same as that of the second output signal Soutl obtained from the (2-2)-th electrode groups 222G. FIG. 16B illustrates current of an output signal Soutr_g obtained by amplifying the first output signal Soutr obtained from the (2-1)-th electrode groups 221G with a predetermined gain value.

In an embodiment, if the position of the pen PN is disposed rightward (e.g., in the first direction DR1), a magnitude of a first output signal Soutr obtained from the (2-1)-th electrode groups 221G may be greater than a magnitude of a second output signal Soutl obtained from the (2-2)-th electrode groups 222G. In this case, the sensor driver 200C may amplify the second output signal Soutl obtained from the (2-2)-th electrode groups 222G with a predetermined gain value. In an embodiment, the sensor driver 200C may adjust the gain value, and for example, the gain value may be adjusted to a value which amplifies the magnitude of the second output signal Soutl obtained from the (2-2)-th electrode groups 222G so as to be substantially the same as that of the first output signal Soutr obtained from the (2-1)-th electrode groups 221G.

Figure 17:
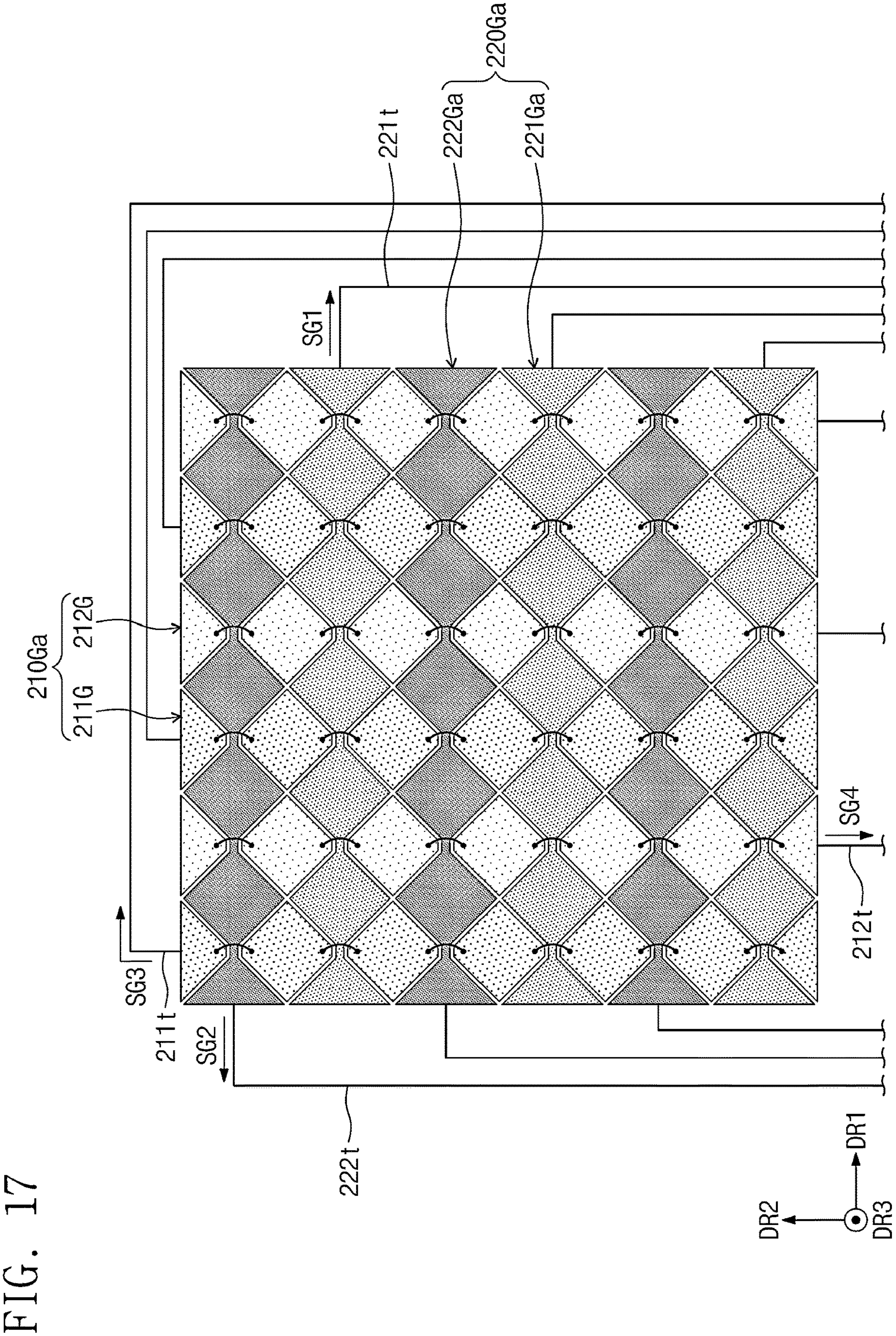
FIG. 17 is a plan view illustrating a portion of a sensor layer according to an embodiment of the present inventive concept.

FIG. 17 is a plan view illustrating a portion of a sensor layer according to an embodiment of the present inventive concept.

Referring to FIGS. 7, 9, and 17, in an embodiment a sensor layer 200 may include first electrode groups 210Ga and second electrode groups 220Ga.

The second electrode groups 220Ga may include at least one (2-1)-th electrode group 221Ga and at least one (2-2)-th electrode group 222Ga. For example, in an embodiment of the present inventive concept, the second electrode groups 220Ga may include a plurality of (2-1)-th electrode groups 221Ga and a plurality of (2-2)-th electrode groups 222Ga, and the (2-1)-th electrode groups 221Ga and the (2-2)-th electrode groups 222Ga may be alternately arranged (e.g., in the second direction DR2). In an embodiment, the (2-1)-th electrode groups 221Ga may correspond to second electrode groups disposed in odd-numbered positions among the second electrode groups 220Ga, and the (2-2)-th electrode groups 222Ga may correspond to second electrode groups disposed in even-numbered positions among the second electrode groups 220Ga.

The first electrode groups 210Ga may include at least one (1-1)-th electrode group 211G and at least one (1-2)-th electrode group 212G. For example, in an embodiment of the present inventive concept, the first electrode groups 210Ga may include a plurality of (1-1)-th electrode groups 211G and a plurality of (1-2)-th electrode groups 212G, and the (1-1)-th electrode groups 211G and the (1-2)-th electrode groups 212G may be alternately arranged (e.g., in the first direction DR1). In an embodiment, the (1-1)-th electrode groups 211G may correspond to first electrode groups disposed in odd-numbered positions among the first electrode groups 210Ga, and the (1-2)-th electrode groups 212G may correspond to first electrode groups disposed in even-numbered positions among the first electrode groups 210Ga.

In an embodiment, the (2-1)-th electrode groups 221Ga may each be electrically connected to a first crossing trace line 221*t* disposed on a right side of the (2-1)-th electrode groups 221Ga (e.g., in the first direction DR1), and the (2-2)-th electrode groups 222Ga may each be electrically connected to a second crossing trace line 222*t* disposed on a left side of the (2-2)-th electrode groups 222Ga (e.g., in a direction opposite to the first direction DR1). The (1-1)-th electrode groups 211G may each be electrically connected to a third crossing trace line 211*t* disposed on an upper side of the (1-1)-th electrode groups 211G (e.g., in the second direction DR2), and the (1-2)-th electrode groups 212G may each be electrically connected to a fourth crossing trace line 212*t* disposed on a lower side of the (1-2)-th electrode groups 212G (e.g., in a direction opposite to the second direction DR2).

In an embodiment, the second mode MD2-*d* or the second mode MD2 may include a pen sensing driving mode. In the pen sensing driving mode, the sensor layer 200 and the sensor driver 200C may sense induced current generated due to a magnetic field which is emitted from the pen PN. In an embodiment, in the pen sensing driving mode, the sensor driver 200C may be configured to receive a first signal SG1 from the (2-1)-th electrode group 221Ga, to receive a second signal SG2 from the (2-2)-th electrode group 222Ga, to receive a third signal SG3 from the (1-1)-th electrode group 211G, and to receive a fourth signal SG4 from the (1-2)-th electrode group 212G. In the pen sensing driving mode, the sensor driver 200C may process the first to fourth signals SG1, SG2, SG3, and SG4 as described with reference to FIG. 10, FIG. 14, or FIG. 16B.

Figure 18:
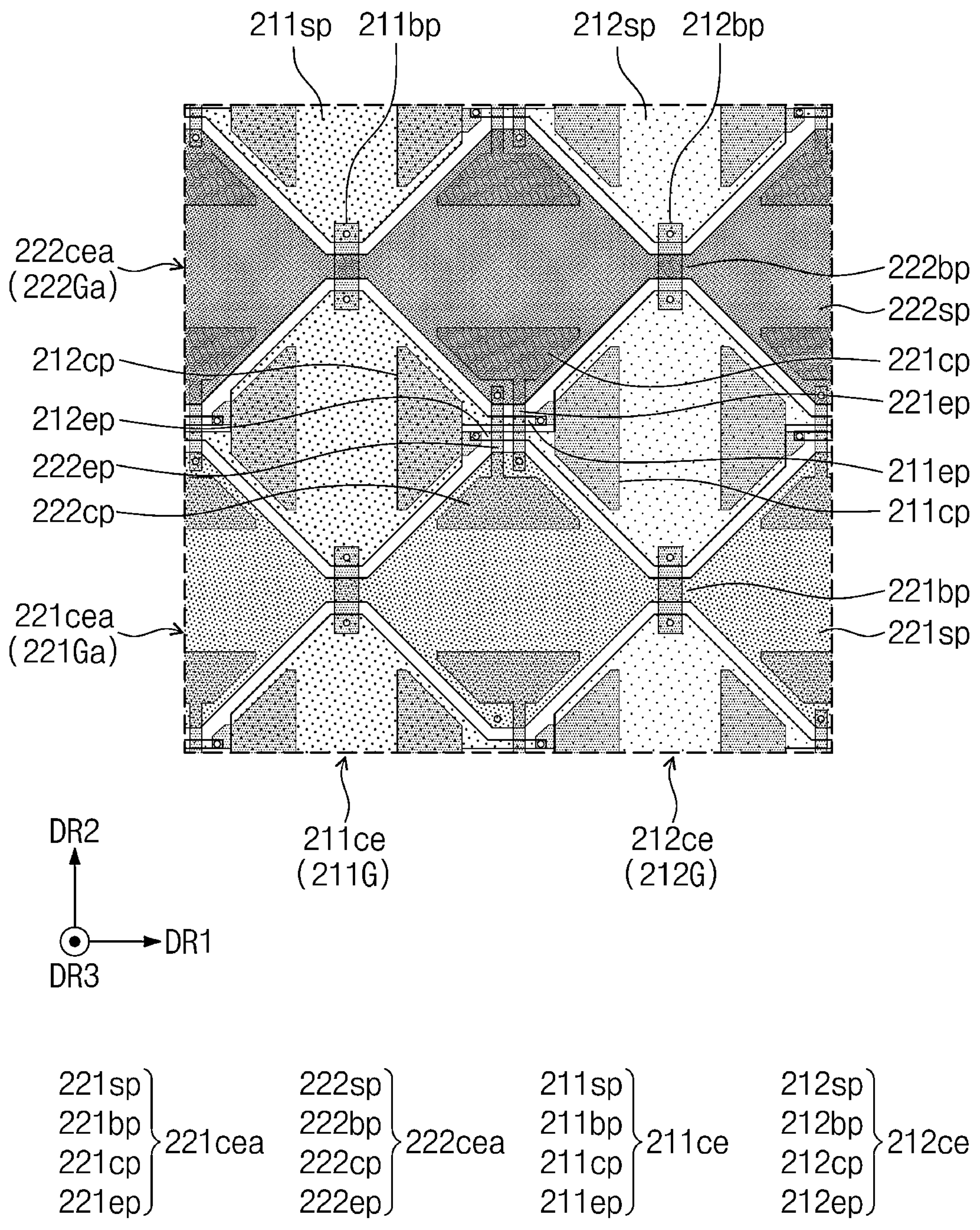
FIG. 18 is a plan view illustrating four sensing units according to an embodiment of the present inventive concept.
Figure 19A:
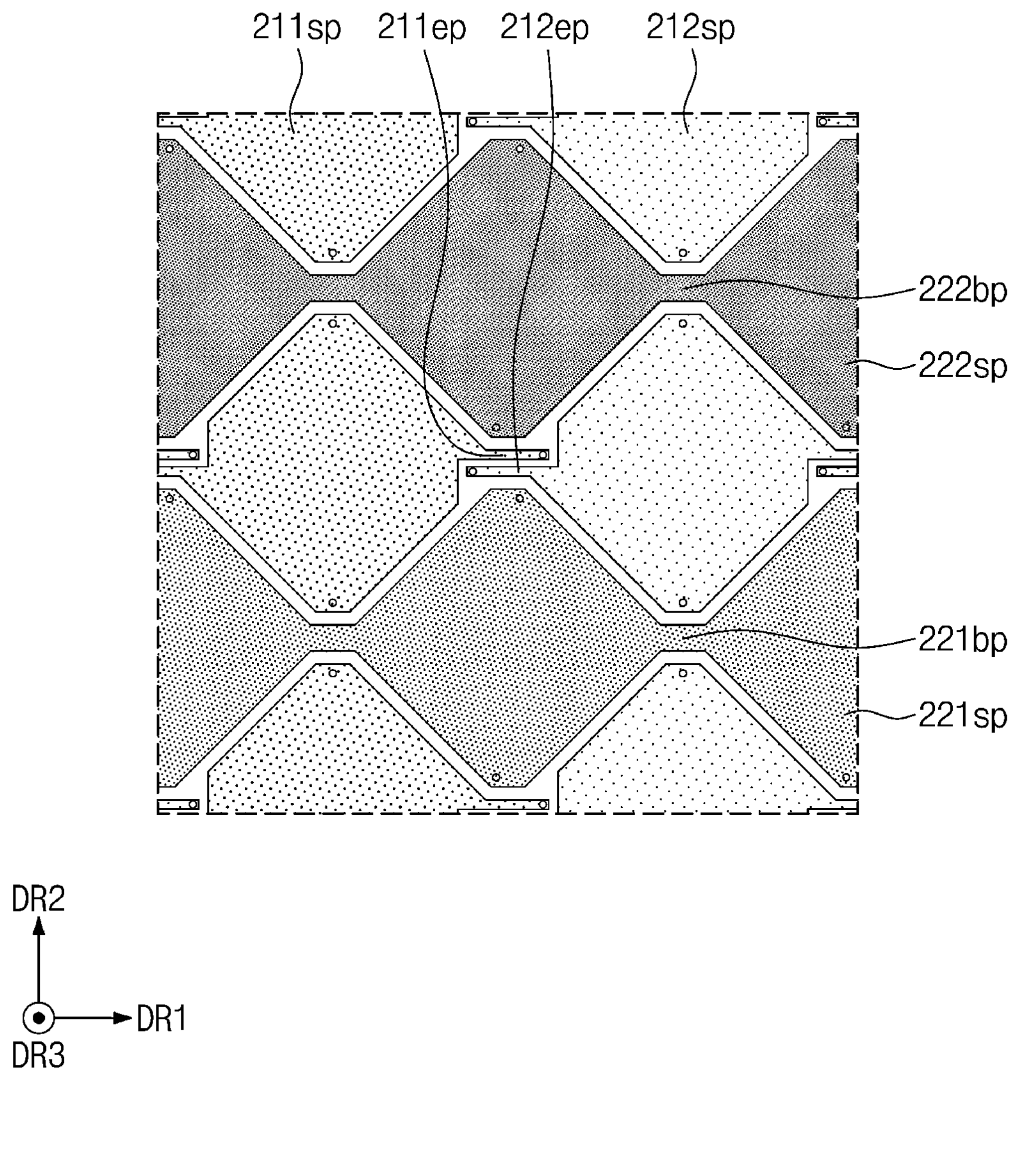
FIG. 19A is a plan view illustrating a second conductive layer of four sensing units according to an embodiment of the present inventive concept.
Figure 19B:
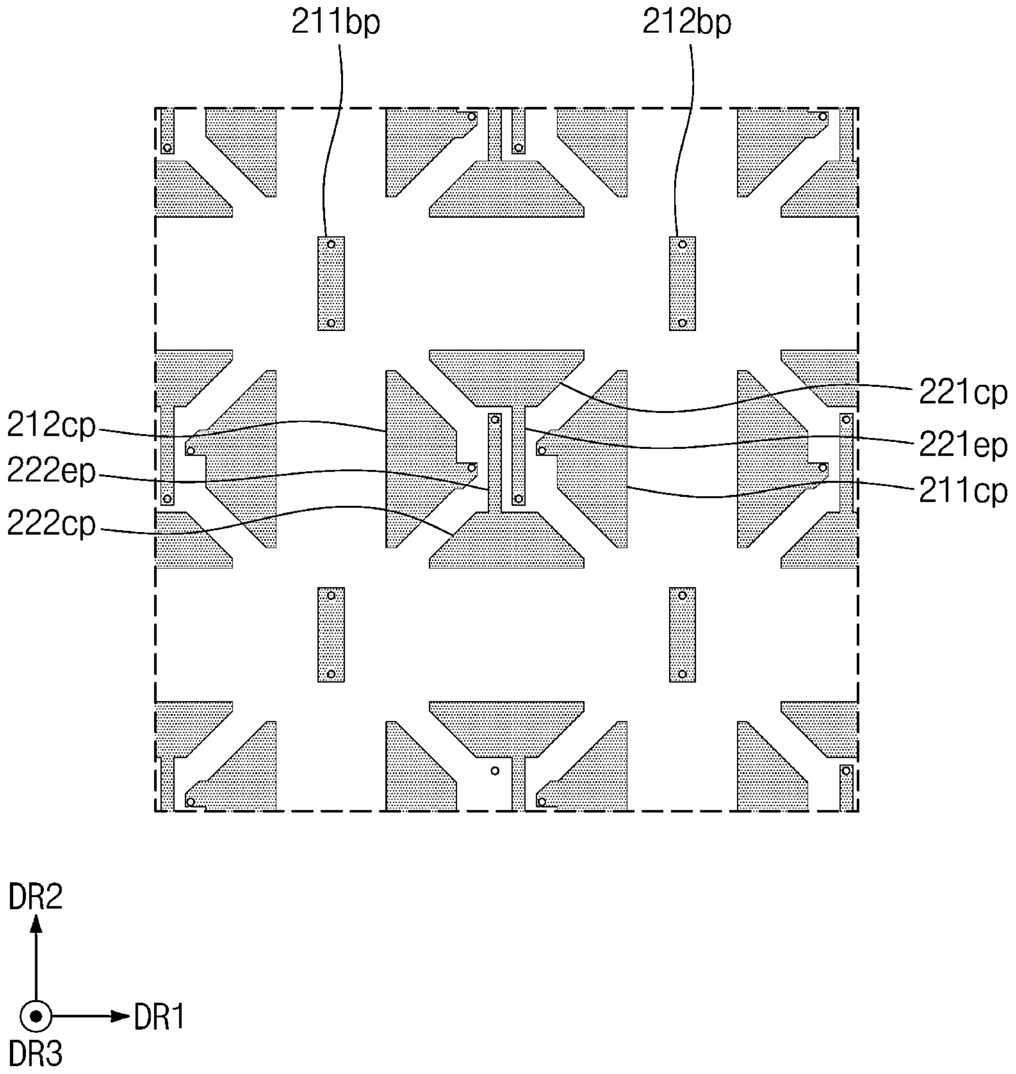
FIG. 19B is a plan view illustrating a first conductive layer of four sensing units according to an embodiment of the present inventive concept.

FIG. 18 is a plan view illustrating four sensing units according to an embodiment of the present inventive concept. FIG. 19A is a plan view illustrating a second conductive layer of four sensing units according to an embodiment of the present inventive concept. FIG. 19B is a plan view illustrating a first conductive layer of four sensing units according to an embodiment of the present inventive concept.

Referring to FIGS. 17, 18, 19A, and 19B, in an embodiment of the present inventive concept, the (2-1)-th electrode group 221Ga may include a first sensing electrode 221*cea*, and the (2-2)-th electrode group 222Ga may include a second sensing electrode 222*cea*. The (1-1)-th electrode group 211G may include a third sensing electrode 211*ce*, and the (1-2)-th electrode group 212G may include a fourth sensing electrode 212*ce*.

In an embodiment, the first sensing electrode 221*cea* may include first sensing patterns 221*sp*, first bridge patterns 221*bp*, first cross patterns 221*cp*, and first extension patterns 221*ep*. The second sensing electrode 222*cea* may include second sensing patterns 222*sp*, second bridge patterns 222*bp*, second cross patterns 222*cp*, and second extension patterns 222*ep*. In an embodiment, the third sensing electrode 211*ce* may include third sensing patterns 211*sp*, third bridge patterns 211*bp*, third cross patterns 211*cp*, and third extension patterns 211*ep*. The fourth sensing electrode 212*ce* may include fourth sensing patterns 212*sp*, fourth bridge patterns 212*bp*, fourth cross patterns 212*cp*, and fourth extension patterns 212*ep*.

In an embodiment, the first sensing patterns 221*sp*, the first bridge patterns 221*bp*, the second sensing patterns 222*sp*, the second bridge patterns 222*bp*, the third sensing patterns 211*sp*, the third extension patterns 211*ep*, the fourth sensing patterns 212*sp*, and the fourth extension patterns 212*ep* may be disposed on the same layer as each other, and for example, may be included in the second conductive layer 204 (see FIG. 6). The first cross patterns 221*cp*, the first extension patterns 221*ep*, the second cross patterns 222*cp*, the second extension patterns 222*ep*, the third bridge patterns 211*bp*, the third cross patterns 211*cp*, the fourth bridge patterns 212*bp*, and the fourth cross patterns 212*cp* may be disposed on the same layer as each other, and for example, may be included in the first conductive layer 202 (see FIG. 6).

The first sensing patterns 221*sp* may be spaced apart from each other in a first direction DR1. The first sensing patterns 221*sp* adjacent to each other in the first direction DR1 may be electrically connected to each other by the first bridge pattern 221*bp*. In an embodiment of the present inventive concept, the first sensing patterns 221*sp* spaced apart from each other in the first direction DR1 and the first bridge pattern 221*bp* connecting the first sensing patterns 221*sp* may have an integrated shape, and the first bridge pattern 221*bp* may be referred to as a first connection pattern or a first intermediate pattern.

In an embodiment, the second sensing patterns 222*sp* may be spaced apart from each other in the first direction DR1. The second sensing patterns 222*sp* adjacent to each other in the first direction DR1 may be electrically connected to each other by the second bridge pattern 222*bp*. In an embodiment of the present inventive concept, the second sensing patterns 222*sp* spaced apart from each other in the first direction DR1 and the second bridge pattern 222*bp* connecting the second sensing patterns 222*sp* may have an integrated shape, and the second bridge pattern 222*bp* may be referred to as a second connection pattern or a second intermediate pattern.

In an embodiment, the third sensing patterns 211*sp* may be spaced apart from each other in a second direction DR2. The third sensing patterns 211*sp* adjacent to each other in the second direction DR2 may be electrically connected to each other by the third bridge pattern 211*bp*. In an embodiment of the present inventive concept, the third sensing patterns 211*sp* adjacent to each other in the second direction DR2 and the third bridge pattern 211*bp* connecting the third sensing patterns 211*sp* may be disposed on different layers from each other and connected through a via hole defined in the intermediate insulating layer 203 (see FIG. 6).

In an embodiment, the fourth sensing patterns 212*sp* may be spaced apart from each other in the second direction DR2. The fourth sensing patterns 212*sp* adjacent to each other in the second direction DR2 may be electrically connected to each other by the fourth bridge pattern 212*bp*. In an embodiment of the present inventive concept, the fourth sensing patterns 212*sp* adjacent to each other in the second direction DR2 and the fourth bridge pattern 212*bp* connecting the fourth sensing patterns 212*sp* may be disposed on different layers from each other and connected through a via hole defined in the intermediate insulating layer 203 (see FIG. 6).

The first cross patterns 221*cp* may be electrically connected to the first sensing patterns 221*sp*. The first sensing patterns 221*sp* may be electrically connected to each other by the first extension patterns 221*ep*. In an embodiment of the present inventive concept, each of the first extension patterns 221*ep* may extend from a corresponding first cross pattern 221*cp*. For example, in an embodiment each of the first extension patterns 221*ep* may have an integrated shape with the corresponding first cross pattern 221*cp*. Each of the first extension patterns 221*ep* and a corresponding first sensing pattern 221*sp* may be disposed on different layers from each other and connected through a via hole defined in the intermediate insulating layer 203 (see FIG. 6).

In an embodiment, two first cross patterns 221*cp* may be electrically connected to one first sensing pattern 221*sp*. The one first sensing pattern 221*sp* may be connected to two first extension patterns 221*ep* respectively extending from the two first cross patterns 221*cp*. One of the two first cross patterns 221*cp* may overlap (e.g., in a plan view) the second sensing pattern 222*sp* disposed to be spaced apart from the one first sensing pattern 221*sp* in the second direction DR2. The other one of the two first cross patterns 221*cp* may overlap (e.g., in a plan view) the second sensing pattern 222*sp* disposed to be spaced apart from the one first sensing pattern 221*sp* in an opposite direction of the second direction DR2.

The second cross patterns 222*cp* may be electrically connected to the second sensing patterns 222*sp*. The second sensing patterns 222*sp* may be electrically connected to each other by the second extension patterns 222*ep*. In an embodiment of the present inventive concept, each of the second extension patterns 222*ep* may extend from a corresponding second cross pattern 222*cp*. For example, in an embodiment each of the second extension patterns 222*ep* may have an integrated shape with the corresponding second cross pattern 222*cp*. In a embodiment, each of the second extension patterns 222*ep* and a corresponding second sensing pattern 222*sp* may be disposed on different layers from each other and connected through a via hole defined in the intermediate insulating layer 203 (see FIG. 6).

In an embodiment, two second cross patterns 222*cp* may be electrically connected to one second sensing pattern 222*sp*. The one second sensing pattern 222*sp* may be connected to two second extension patterns 222*ep* respectively extending from the two second cross patterns 222*cp*. One of the two second cross patterns 222*cp* may overlap (e.g., in a plan view) the first sensing pattern 221*sp* disposed to be spaced apart from the one second sensing pattern 222*sp* in the second direction DR2. The other one of the two second cross patterns 222*cp* may overlap (e.g., in a plan view) the first sensing pattern 221*sp* disposed to be spaced apart from the one second sensing pattern 222*sp* in an opposite direction of the second direction DR2.

The third cross patterns 211*cp* may be electrically connected to the third sensing patterns 211*sp*. The third sensing patterns 211*sp* may be electrically connected to each other by the third extension patterns 211*ep*. In an embodiment of the present inventive concept, each of the third extension patterns 211*ep* may extend from a corresponding third sensing pattern 211*sp*. For example, in an embodiment each of the third extension patterns 211*ep* may have an integrated shape with the corresponding third sensing pattern 211*sp*. In an embodiment, each of the third extension patterns 211_ep_ and a corresponding third cross pattern 211_cp_ may be disposed on different layers from each other and connected through a via hole defined in the intermediate insulating layer 203 (see FIG. 6).

In an embodiment, two third cross patterns 211_cp_ may be electrically connected to one third sensing pattern 211_sp_. The one third sensing pattern 211_sp_ may be connected to the two third cross patterns 211_cp_ through two third extension patterns 211_ep_ extending from the one third sensing pattern 211_sp_. One of the two third cross patterns 211_cp_ may overlap (e.g., in a plan view) the fourth sensing pattern 212_sp_ disposed to be spaced apart from the one third sensing pattern 211_sp_ in the first direction DR1. The other one of the two third cross patterns 211_cp_ may overlap (e.g., in a plan view) the fourth sensing pattern 212_sp_ disposed to be spaced apart from the one third sensing pattern 211_sp_ in an opposite direction of the first direction DR1.

The fourth cross patterns 212_cp_ may be electrically connected to the fourth sensing patterns 212_sp_. The fourth sensing patterns 212_sp_ may be electrically connected to each other by the fourth extension patterns 212_ep_. In an embodiment of the present inventive concept, each of the fourth extension patterns 212_ep_ may extend from a corresponding fourth sensing pattern 212_sp_. For example, in an embodiment each of the fourth extension patterns 212_ep_ may have an integrated shape with the corresponding fourth sensing pattern 212_sp_. In an embodiment, each of the fourth extension patterns 212_ep_ and a corresponding fourth cross pattern 212_cp_ may be disposed on different layers from each other and connected through a via hole defined in the intermediate insulating layer 203 (see FIG. 6).

In an embodiment, two fourth cross patterns 212_cp_ may be electrically connected to one fourth sensing pattern 212_sp_. The one fourth sensing pattern 212_sp_ may be connected to the two fourth cross patterns 212_cp_ through two fourth extension patterns 212_ep_ extending from the one fourth sensing pattern 212_sp_. One of the two fourth cross patterns 212_cp_ may overlap (e.g., in a plan view) the third sensing pattern 211_sp_ disposed to be spaced apart from the one fourth sensing pattern 212_sp_ in the first direction DR1. The other one of the two fourth cross patterns 212_cp_ may overlap (e.g., in a plan view) the third sensing pattern 211_sp_ disposed to be spaced apart from the one fourth sensing pattern 212_sp_ in an opposite direction of the first direction.

Since the first cross pattern 221_cp_ may be disposed to overlap (e.g., in a plan view) a portion of the second sensing pattern 222_sp_, and the second cross pattern 222_cp_ may be disposed to overlap (e.g., in a plan view) a portion of the first sensing pattern 221_sp_, a coupling capacitance may be defined between the (2-1)-th electrode group 221Ga and the (2-2)-th electrode group 222Ga adjacent to each other. Since the third cross pattern 211_cp_ may be disposed to overlap (e.g., in a plan view) a portion of the fourth sensing pattern 212_sp_, and the fourth cross pattern 212_cp_ may be disposed to overlap (e.g., in a plan view) a portion of the third sensing pattern 211_sp_, a coupling capacitance may be defined between the (1-1)-th electrode group 211G and the (1-2)-th electrode group 212G adjacent to each other.

The four sensing units illustrated in FIG. 18 may be repeatedly arranged along the first direction DR1 and the second direction DR2.

Patterns illustrated in FIGS. 19A and 19B may each have a mesh structure. The mesh structures may each include a plurality of mesh lines. In an embodiment, the plurality of mesh lines may each have a straight-lined shape extending in a predetermined direction and may be connected to each other. However, embodiments of the present inventive concept are not necessarily limited thereto. For example, in an embodiment at least a portion of each of the plurality of mesh lines may have a curved shape.

Figure 20:
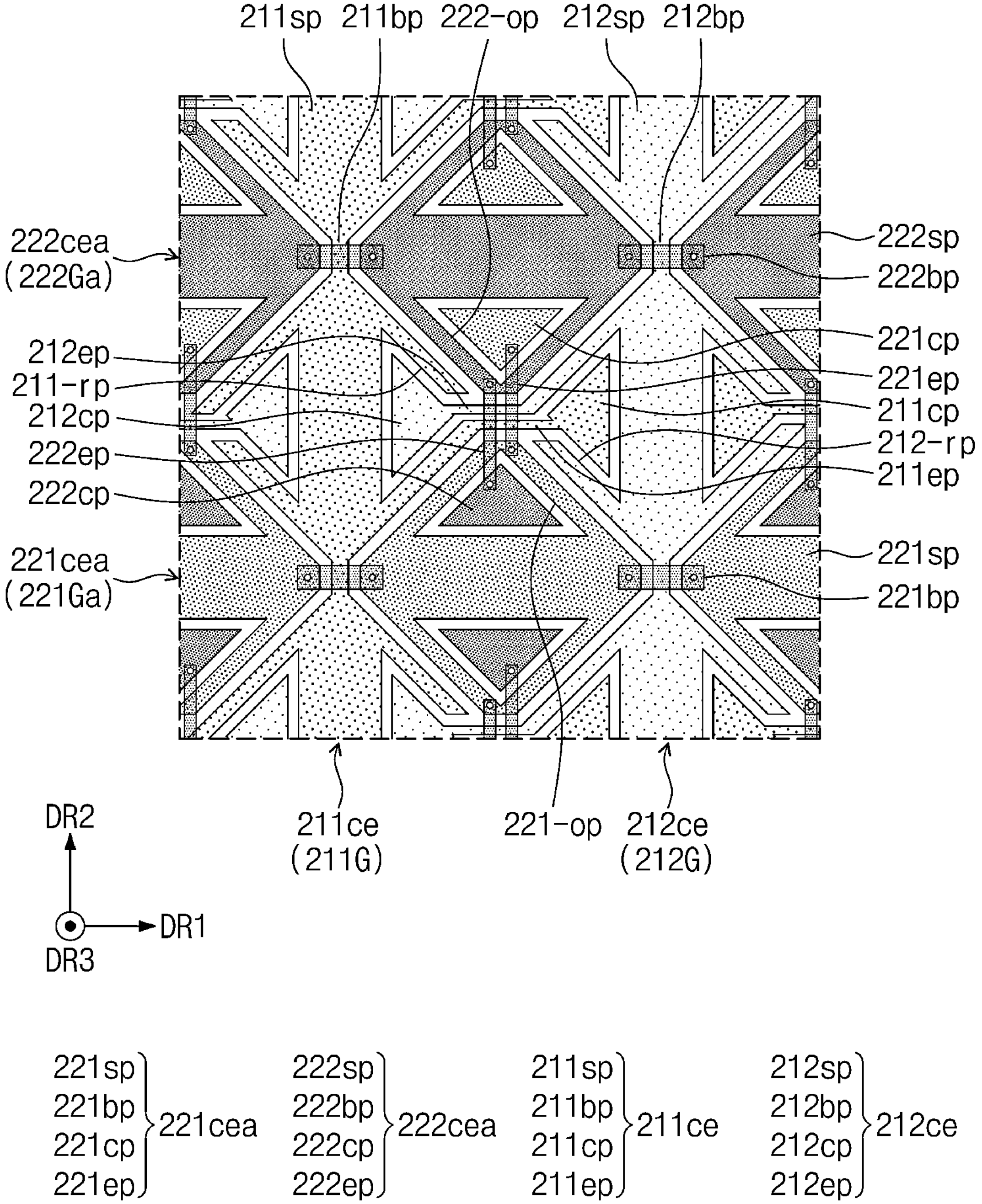
FIG. 20 is a plan view illustrating four sensing units according to an embodiment of the present inventive concept.
Figure 21A:
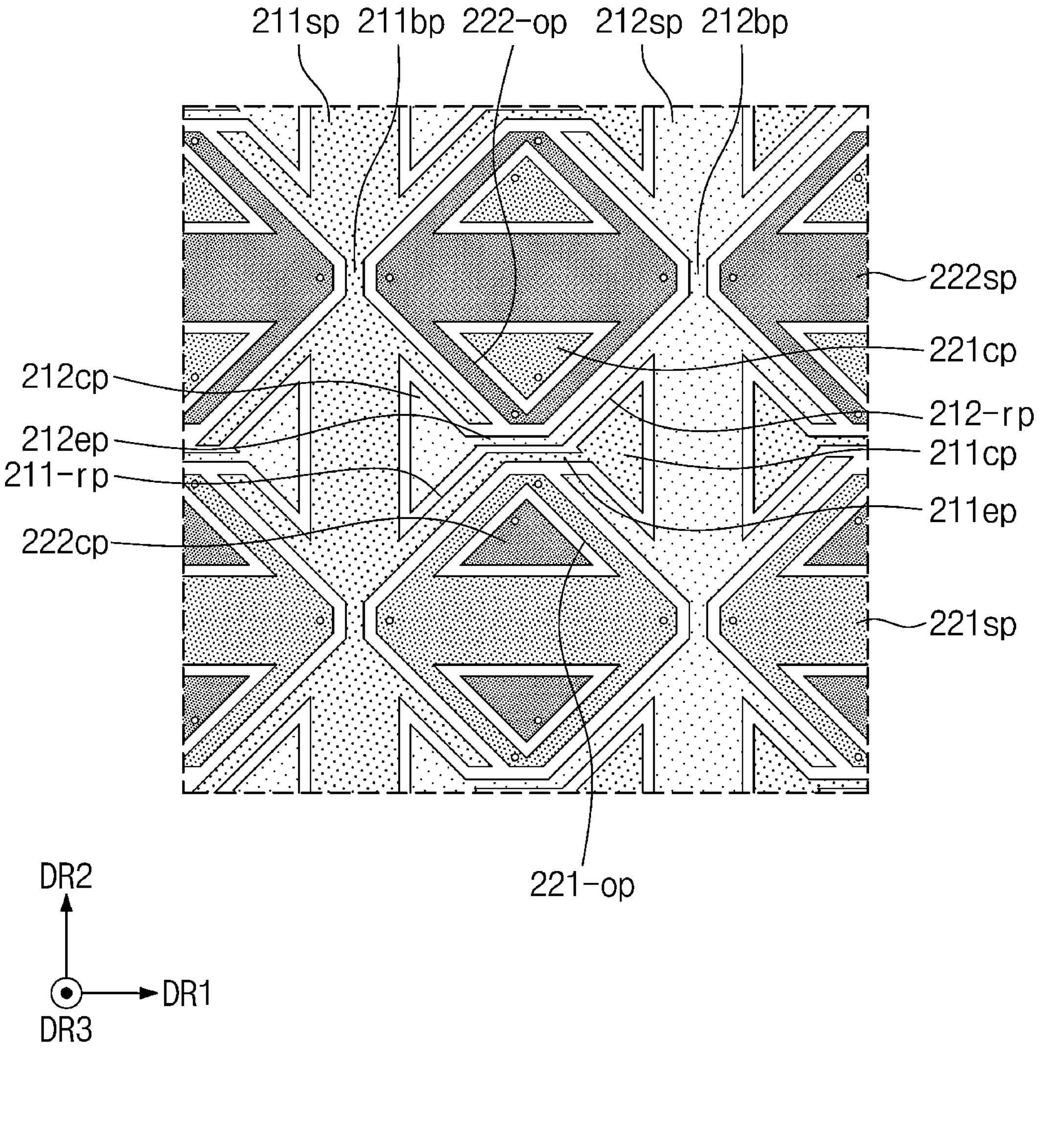
FIG. 21A is a plan view illustrating a second conductive layer of four sensing units according to an embodiment of the present inventive concept.
Figure 21B:
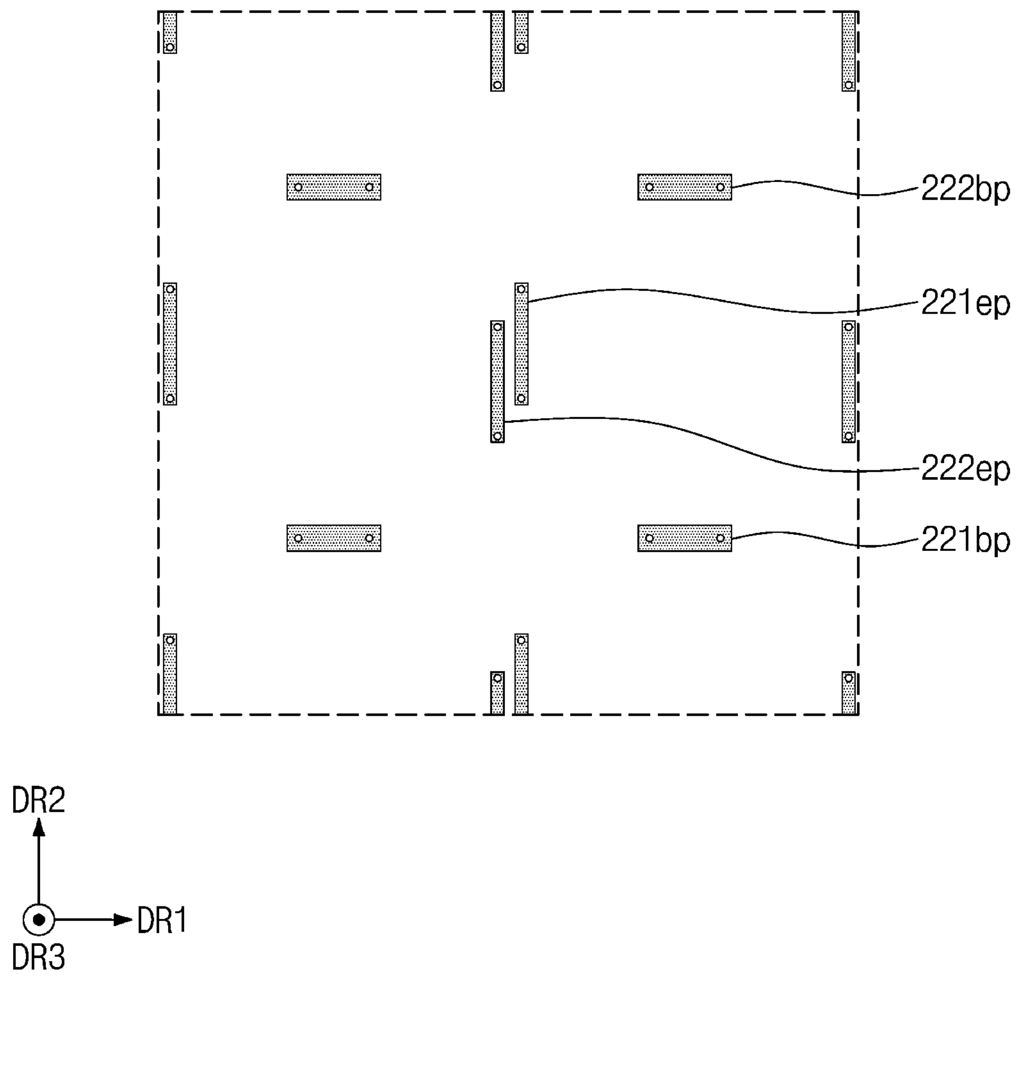
FIG. 21B is a plan view illustrating a first conductive layer of four sensing units according to an embodiment of the present inventive concept.

FIG. 20 is a plan view illustrating four sensing units according to an embodiment of the present inventive concept. FIG. 21A is a plan view illustrating a second conductive layer of four sensing units according to an embodiment of the present inventive concept. FIG. 21B is a plan view illustrating a first conductive layer of four sensing units according to an embodiment of the present inventive concept.

Referring to FIGS. 17, 20, 21A, and 21B, in an embodiment a first sensing electrode 221_cea_ may include first sensing patterns 221_sp_, first bridge patterns 221_bp_, first cross patterns 221_cp_, and first extension patterns 221_ep_. A second sensing electrode 222_cea_ may include second sensing patterns 222_sp_, second bridge patterns 222_bp_, second cross patterns 222_cp_, and second extension patterns 222_ep_. In an embodiment, a third sensing electrode 211_ce_ may include third sensing patterns 211_sp_, third bridge patterns 211_bp_, third cross patterns 211_cp_, and third extension patterns 211_ep_. A fourth sensing electrode 212_ce_ may include fourth sensing patterns 212_sp_, fourth bridge patterns 212_bp_, fourth cross patterns 212_cp_, and fourth extension patterns 212_ep_.

In an embodiment, the first sensing patterns 221_sp_, the first cross patterns 221_cp_, the second sensing patterns 222_sp_, the second cross patterns 222_cp_, the third sensing patterns 211_sp_, the third bridge patterns 211_bp_, the third cross patterns 211_cp_, the third extension patterns 211_ep_, the fourth sensing patterns 212_sp_, the fourth bridge patterns 212_bp_, the fourth cross patterns 212_cp_, and the fourth extension patterns 212_ep_ may be disposed on the same layer as each other, and for example, may be included in the second conductive layer 204 (see FIG. 4). The first bridge patterns 221_bp_, the first extension patterns 221_ep_, the second bridge patterns 222_bp_, and the second extension patterns 222_ep_ may be disposed on the same layer as each other, and for example, may be included in the first conductive layer 202 (see FIG. 4).

In an embodiment, the first and second bridge patterns 221_bp_ and 222_bp_ and the third and fourth bridge patterns 211_bp_ and 212_bp_ may be insulated (e.g., electrically insulated) from each other and may cross each other. The first and second bridge patterns 221_bp_ and 222_bp_ and the third and fourth bridge patterns 211_bp_ and 212_bp_ may be disposed on different layers from each other. In an embodiment, the first and second bridge patterns 221_bp_ and 222_bp_ may be included in the second conductive layer 204 (see FIG. 4), and the third and fourth bridge patterns 211_bp_ and 212_bp_ may be included in the first conductive layer 202 (see FIG. 4). In this embodiment, the first bridge patterns 221_bp_ may have an integrated shape with the first sensing patterns 221_sp_, and the second bridge patterns 222_bp_ may have an integrated shape with the second sensing patterns 222_sp_. However, embodiments of the present inventive concept are not necessarily limited thereto. For example, in an embodiment the first and second bridge patterns 221_bp_ and 222_bp_ may be included in the first conductive layer 202 (see FIG. 4), and the third and fourth bridge patterns 211_bp_ and 212_bp_ may be included in the second conductive layer 204 (see FIG. 4). In this embodiment, the third bridge patterns 211_bp_ may have an integrated shape with the third sensing patterns 211_sp_, and the fourth bridge patterns 212_bp_ may have an integrated shape with the fourth sensing patterns 212_sp_.

In an embodiment of the present inventive concept, at least one opening 221-*op* and 222-*op* may be defined in each of the first and second sensing patterns 221*sp* and 222*sp*, and at least one recessed portion 211-*rp* and 212-*rp* may be defined in each of the third and fourth sensing patterns 211*sp* and 212*sp*. FIG. 21A illustrates that two openings 221-*op* and 222-*op* are defined in each of the first and second sensing patterns 221*sp* and 222*sp*, and that two recessed portions 211-*rp* and 212-*rp* are defined in each of the third and fourth sensing patterns 211*sp* and 212*sp*.

In an embodiment of the present inventive concept, the first to fourth sensing patterns 221*sp*, 222*sp*, 211*sp*, and 212*sp* and the first to fourth cross patterns 221*cp*, 222*cp*, 211*cp*, and 212*cp* may be disposed on the same layer as each other. For example, in an embodiment the second cross pattern 222*cp* may be disposed in each of the openings 221-*op* of the first sensing pattern 221*sp*. An outer edge of the second cross pattern 222*cp* may be surrounded by the first sensing pattern 221*sp* (e.g., in a plan view). The first cross pattern 221*cp* may be disposed in each of the openings 222-*op* of the second sensing pattern 222*sp*. An outer edge of the first cross pattern 221*cp* may be surrounded by the second sensing pattern 222*sp* (e.g., in a plan view). Thus, a coupling capacitance may be defined between a (2-1)-th electrode group 221Ga and a (2-2)-th electrode group 222Ga adjacent to each other.

In an embodiment, the fourth cross pattern 212*cp* may be disposed in each of the recessed portions 211-*rp* of the third sensing pattern 211*sp*. An outer edge of the fourth cross pattern 212*cp* may be surrounded by the third sensing pattern 211*sp* (e.g., in a plan view). The third cross pattern 211*cp* may be disposed in each of the recessed portions 212-*rp* of the fourth sensing pattern 212*sp*. An outer edge of the third cross pattern 211*cp* may be surrounded by the fourth sensing pattern 212*sp* (e.g., in a plan view). Thus, a coupling capacitance may be defined between a (1-1)-th electrode group 211G and a (1-2)-th electrode group 212G adjacent to each other.

Patterns illustrated in FIGS. 21A and 21B may each have a mesh structure. The mesh structures may each include a plurality of mesh lines. In an embodiment, the plurality of mesh lines may each have a straight-lined shape extending in a predetermined direction and may be connected to each other. However, embodiment of the present inventive concept are not necessarily limited thereto. Foe example, in an embodiment at least a portion of each of the plurality of mesh lines may have a curved shape.

Figure 22:
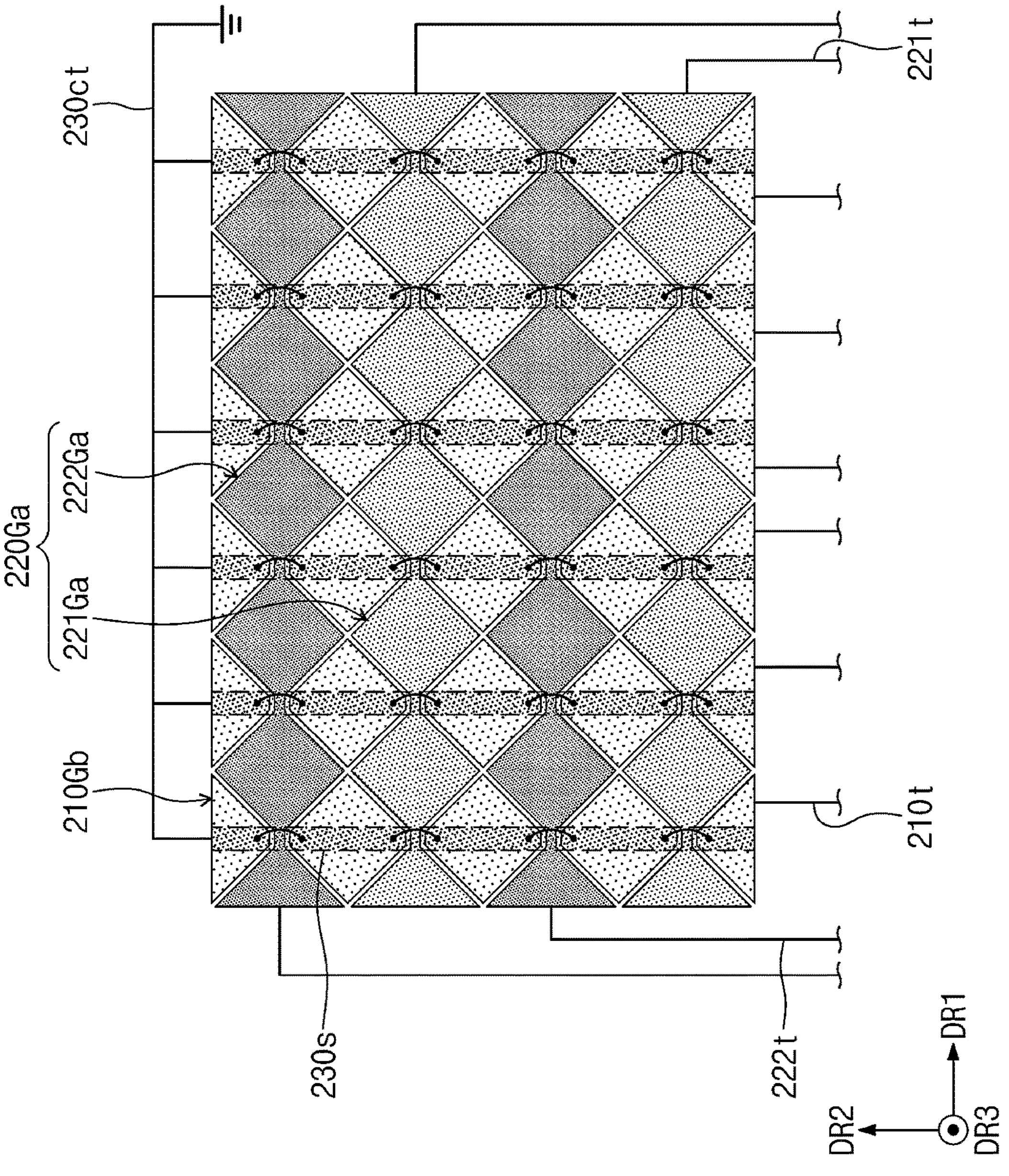
FIG. 22 is a plan view illustrating a portion of a sensor layer according to an embodiment of the present inventive concept.

FIG. 22 is a plan view illustrating a portion of a sensor layer according to an embodiment of the present inventive concept.

Referring to FIGS. 7 and 22, the sensor layer 200 may further include a plurality of auxiliary electrodes 230*s* respectively overlapping first electrode groups 210Gb (e.g., in a plan view). In addition, a connection trace line 230*ct* connecting (e.g., electrically connecting) the auxiliary electrodes 230*s* of the sensor layer 200 to each other may be further included.

In an embodiment, the connection trace line 230*ct* and first trace lines 210*t* may be spaced apart from each other (e.g., in the second direction DR2) with the first electrode groups 210Gb and the auxiliary electrodes 230*s* therebetween. For example, a routing direction of the first electrode groups 210Gb and a routing direction of the auxiliary electrodes 230*s* may be different.

According to an embodiment of the present inventive concept, one first electrode group 210Gb may cross each of (2-1)-th electrode groups 221Ga and (2-2)-th electrode groups 222Ga, and one auxiliary electrode may cross each of the (2-1)-th electrode groups 221Ga and the (2-2)-th electrode groups 222Ga.

The auxiliary electrode 230*s* may serve to supplement a signal which is transmitted from the first electrode group 210Gb to the sensor driver 200C. Thus, a maximum effect may be achieved when a signal induced to the auxiliary electrode 230*s* and a signal induced to the first electrode group 210Gb are in phase. Thus, a center of each of the first electrode groups 210Gb in a second direction DR2 may overlap a center of each of the auxiliary electrode 230*s* in the second direction DR2. In addition, a center of each of the first electrode groups 210Gb in a first direction DR1 and a center of each of the auxiliary electrodes 230*s* in the first direction DR1 may overlap each other.

In an embodiment of the present inventive concept, the first electrode groups 210Gb, second electrode groups 220Ga, and the auxiliary electrodes 230*s* may each be disposed separately in two conductive layers 202 and 204 (see FIG. 6). Description thereof will be made with reference to FIGS. 26 to 29B.

In an embodiment of the present inventive concept, the first electrode groups 210Gb and the second electrode groups 220Ga may each be disposed separately in two conductive layers 202 and 204, and the auxiliary electrodes 230*s* may be included in a third conductive layer which is provided below the two conductive layers 202 and 204 (e.g., in the third direction DR3). The third conductive layer may be provided below the base layer 201 (see FIG. 6). For example, the third conductive layer may be disposed between the base layer 201 and the display layer 100 (see FIG. 6), disposed below the display layer 100, or included in the display layer 100.

Figure 23:
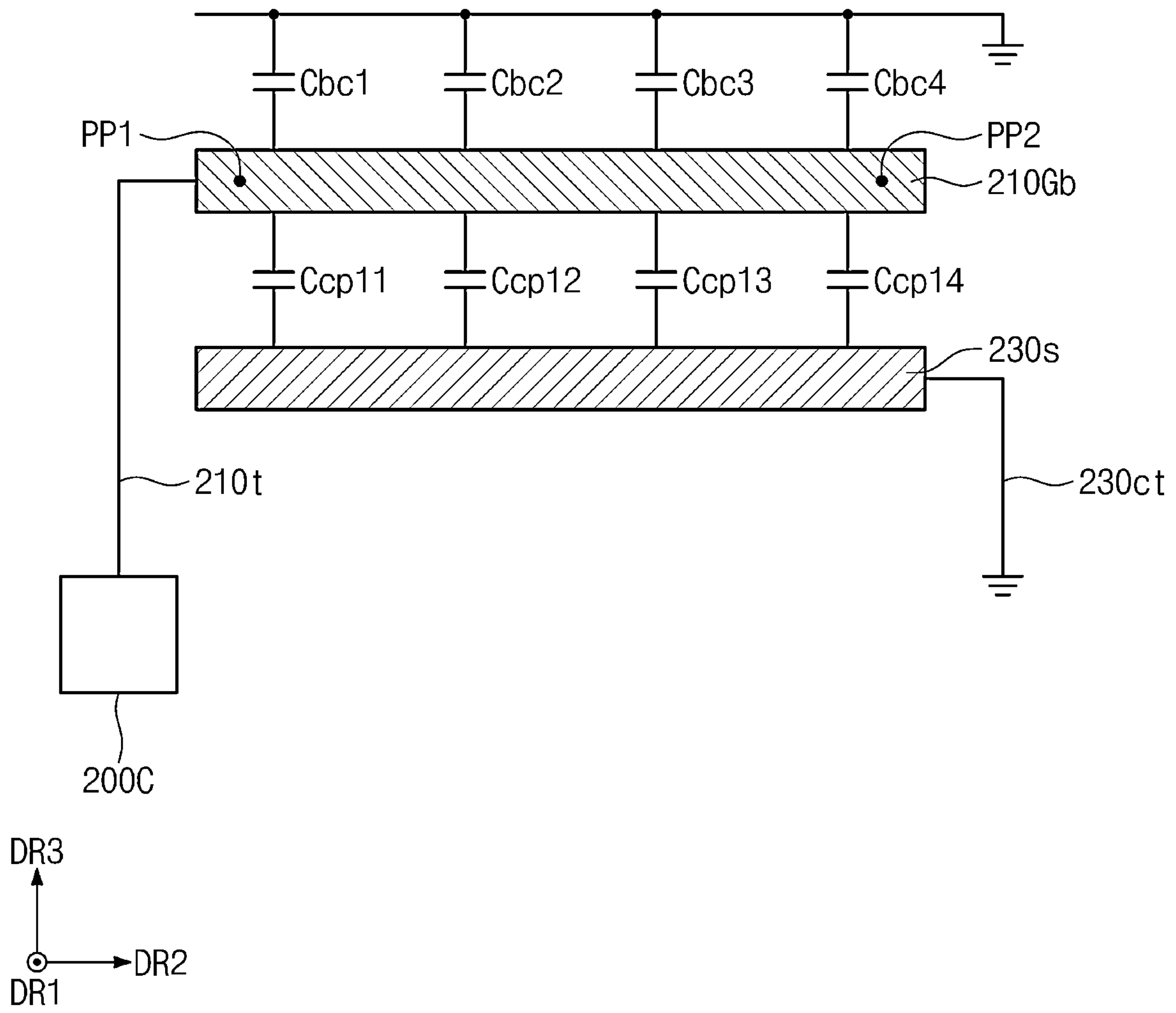
FIG. 23 is a schematic diagram illustrating one channel according to an embodiment of the present inventive concept.
Figure 24:
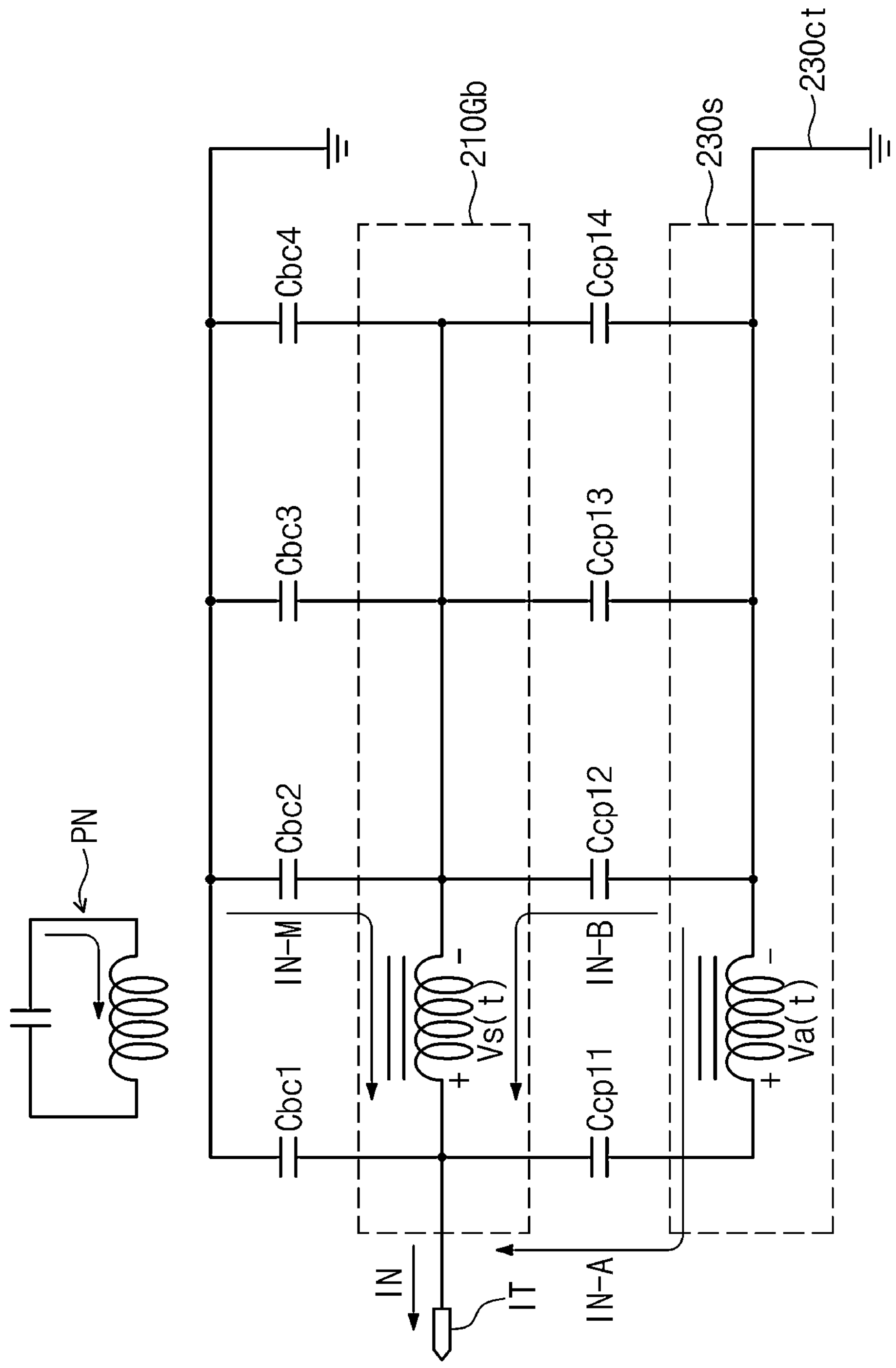
FIG. 24 is an equivalent circuit diagram illustrating a relationship between one channel and a pen according to an embodiment of the present inventive concept.

FIG. 23 is a schematic diagram illustrating one channel according to an embodiment of the present inventive concept. FIG. 24 is an equivalent circuit diagram illustrating a relationship between one channel and a pen according to an embodiment of the present inventive concept.

Referring to FIGS. 22, 23, and 24, one first electrode group 210Gb and one auxiliary electrode 230*s* are illustrated. The first electrode group 210Gb and the auxiliary electrode 230*s* may overlap each other when viewed in a third direction DR3 (e.g., in a plan view).

In an embodiment, one end (e.g., a first end) of the auxiliary electrode 230*s* may be floated (e.g., electrically isolated), and another end (e.g., a second end) of the auxiliary electrode 230*s* may be grounded. For example, the other end (e.g., the second end) of the auxiliary electrode 230*s* may be electrically connected to the connection trace line 230*ct*, and the connection trace line 230*ct* may be grounded. However, embodiments of the present inventive concept are not necessarily limited thereto. For example, in an embodiment the connection trace line 230*ct* may be grounded through a bias capacitor.

Capacitors Cbc1, Cbc2, Cbc3, and Cbc4 may be defined in the first electrode group 210Gb. The capacitors Cbc1, Cbc2, Cbc3, and Cbc4 may be referred to as a parasitic capacitor or a base capacitor. According to an embodiment of the present inventive concept, the capacitors Cbc1, Cbc2, Cbc3, and Cbc4 may also be used for increasing a magnitude of a signal.

If a pen PN is close to the first electrode group 210Gb, due to a magnetic field generated from the pen PN, first induced electromotive force Vs(t) may be generated in the first electrode group 210Gb and second induced electromotive force Va(t) may be generated in the auxiliary electrode 230*s*. In an embodiment, first induced current IN-M and third induced current IN-B may be generated due to the first induced electromotive force Vs(t), and second induced current IN-A may be generated due to the second induced electromotive force Va(t). Thus, total induced current IN inputted to an input terminal IT may correspond to a sum of the first to third induced current IN-M, IN-A, and IN-B.

For example, a capacitance of each of the capacitors Cbc1, Cbc2, Cbc3, and Cbc4 is Cb, and a capacitance of each of first coupling capacitors Ccp11, Ccp12, Ccp13, and Ccp14 is Cc.

The first induced current IN-M according to time may be expressed as a following equation.

$$3Cb\frac{dVs(t)}{dt}$$

The second induced current IN-A according to time may be expressed as a following equation.

$$Cc\frac{dVa(t)}{dt}$$

The third induced current IN-B according to time may be expressed as a following equation.

$$3Cc\frac{dVs(t)}{dt}$$

Figure 25A:
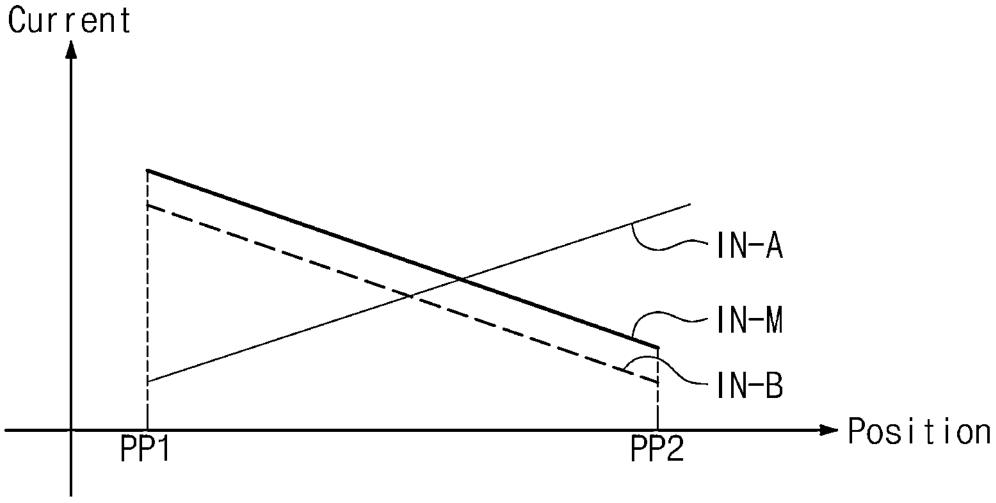
FIG. 25A is a graph showing a magnitude of current versus a position of a pen with respect to one channel according to an embodiment of the present inventive concept.
Figure 25B:
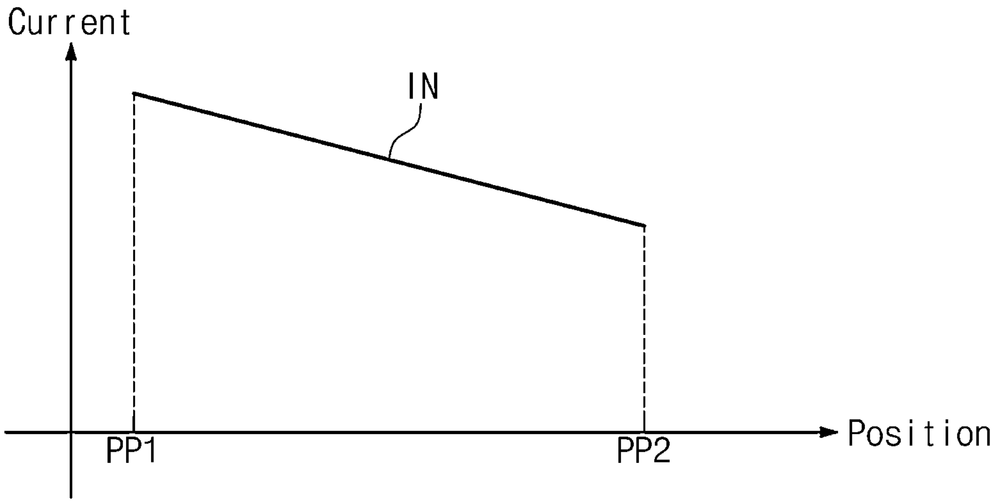
FIG. 25B is a graph showing a magnitude of a signal versus a position of a pen with respect to one channel according to an embodiment of the present inventive concept.

FIG. 25A is a graph showing a magnitude of current versus a position of a pen with respect to one channel. FIG. 25B is a graph showing a magnitude of a signal versus a position of a pen with respect to one channel.

Referring to FIGS. 23, 24, and 25A, since voltage of both ends of capacitors between the input terminal IT and a position of the pen PN among the capacitors Cbc1, Cbc2, Cbc3, and Cbc4 may be grounded, current may not flow. Thus, if the position of the pen PN moves from a first point PP1 to a second point PP2, the first induced current IN-M may gradually decrease. In addition, the second induced current IN-A may gradually increase, and the third induced current IN-B may gradually decrease.

Referring to FIGS. 23, 24, and 25B, if the position of the pen PN moves from a first point PP1 to a second point PP2, the total induced current IN may gradually decrease. However, as described above, the total induced current IN may correspond to a sum of the first to third induced current IN-M, IN-A, and IN-B, and a magnitude of the total induced current IN at the second point PP2 may be secured to be greater than or equal to a predetermined value.

Figure 26:
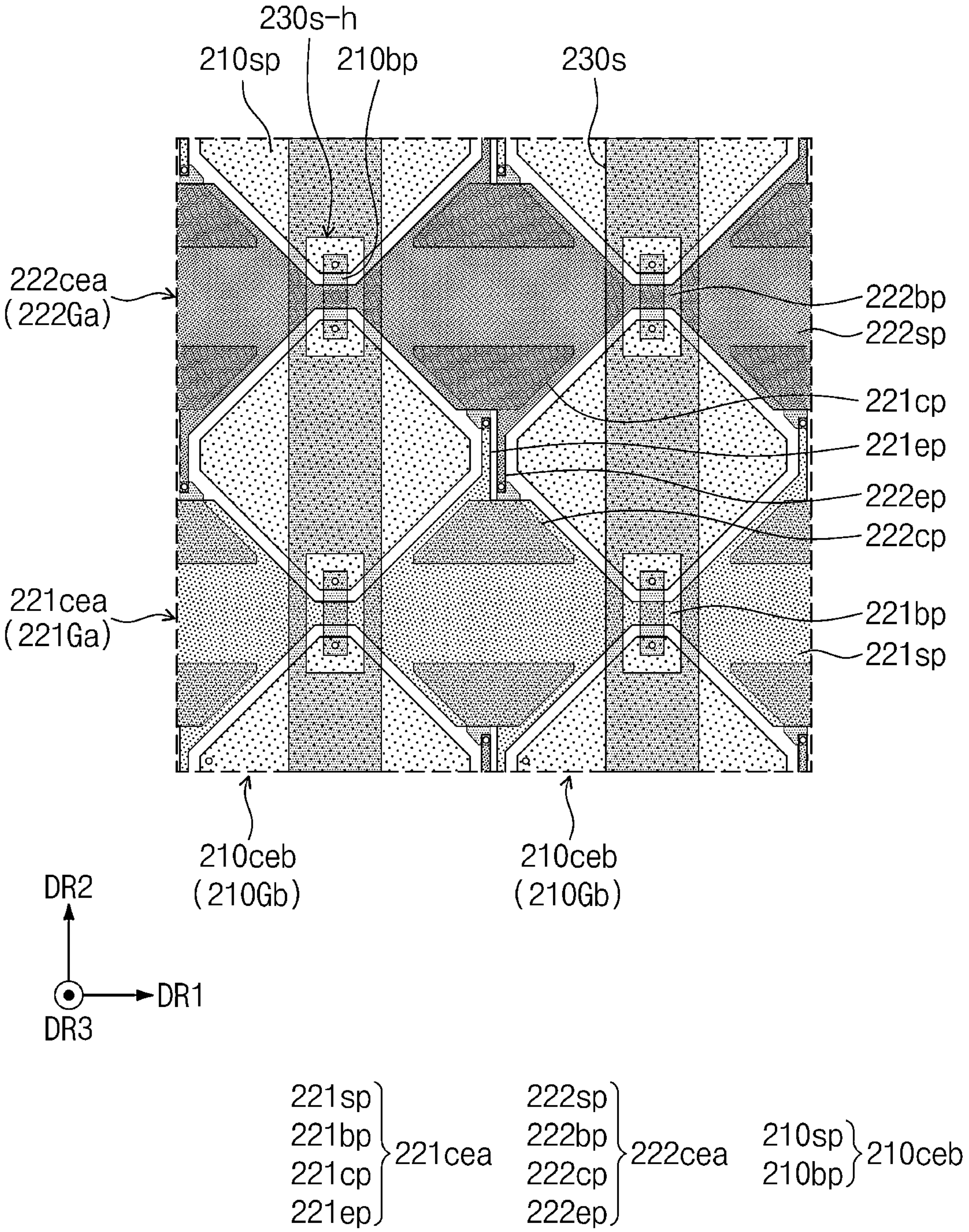
FIG. 26 is a plan view illustrating four sensing units according to an embodiment of the present inventive concept.
Figure 27A:
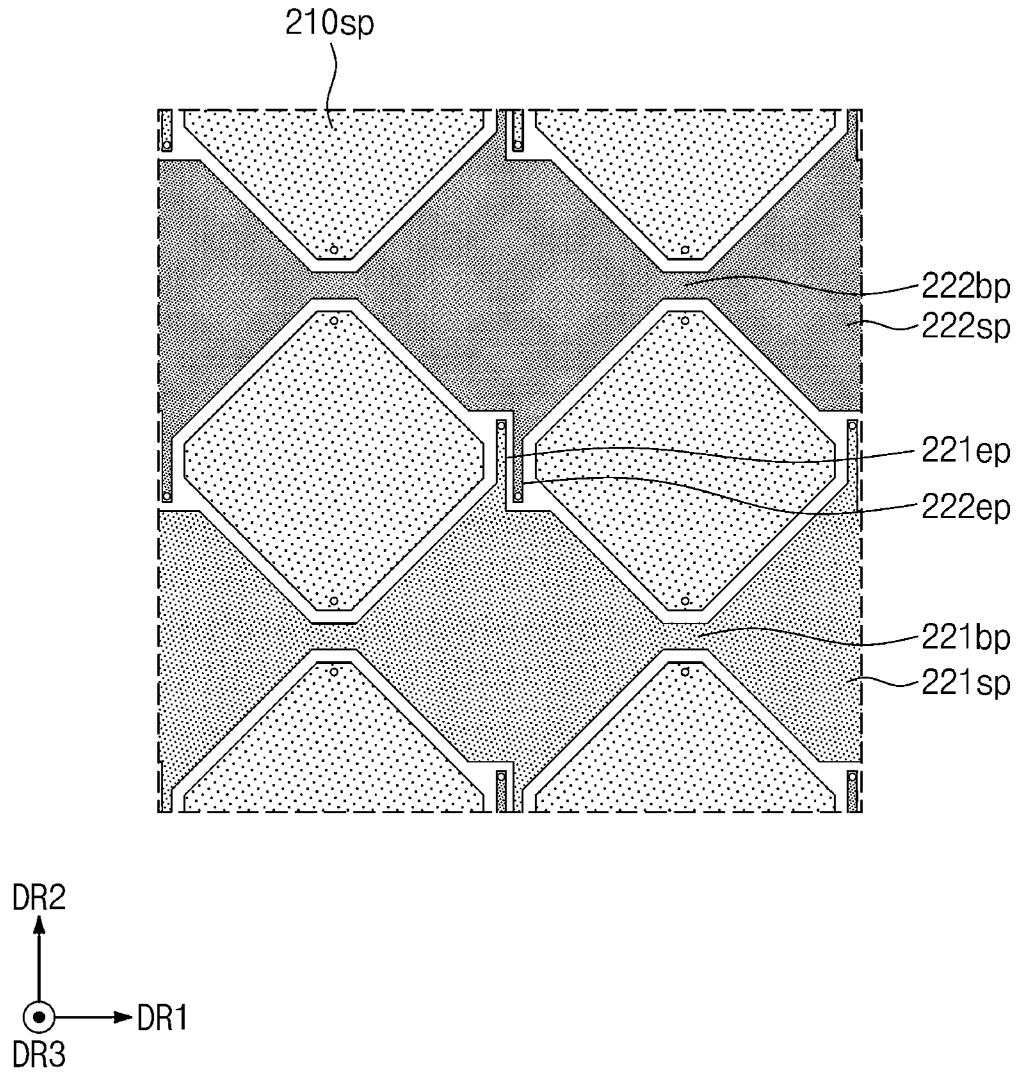
FIG. 27A is a plan view illustrating a second conductive layer of four sensing units according to an embodiment of the present inventive concept.
Figure 27B:
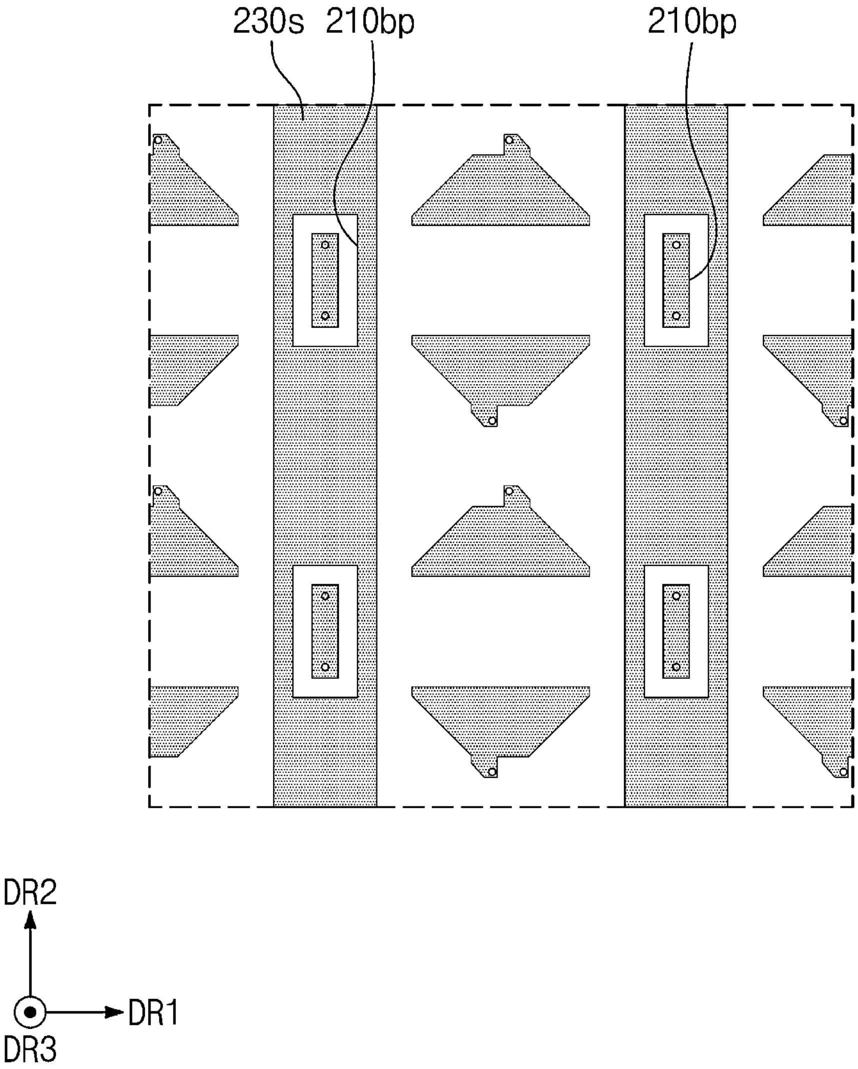
FIG. 27B is a plan view illustrating a first conductive layer of four sensing units according to an embodiment of the present inventive concept.

FIG. 26 is a plan view illustrating four sensing units according to an embodiment of the present inventive concept. FIG. 27A is a plan view illustrating a second conductive layer of four sensing units according to an embodiment of the present inventive concept. FIG. 27B is a plan view illustrating a first conductive layer of four sensing units according to an embodiment of the present inventive concept.

Referring to FIGS. 22, 26, 27A, and 27B, in an embodiment of the present inventive concept, the (2-1)-th electrode group 221Ga may include a first sensing electrode 221*cea*, and the (2-2)-th electrode group 222Ga may include a second sensing electrode 222*cea*. The first electrode group 210Gb may include a third sensing electrode 210*ceb*.

In an embodiment, the first sensing electrode 221*cea* may include first sensing patterns 221*sp*, first bridge patterns 221*bp*, first cross patterns 221*cp*, and first extension patterns 221*ep*. The second sensing electrode 222*cea* may include second sensing patterns 222*sp*, second bridge patterns 222*bp*, second cross patterns 222*cp*, and second extension patterns 222*ep*. The third sensing electrode 210*ceb* may solely include third sensing patterns 210*sp* and third bridge patterns 210*bp*. In an embodiment, the third sensing electrode 210*ceb* may not include cross patterns and connection patterns.

In an embodiment, the first sensing patterns 221*sp*, the first bridge patterns 221*bp*, the first extension patterns 221*ep*, the second sensing patterns 222*sp*, the second bridge patterns 222*bp*, the second extension patterns 222*ep*, and the third sensing patterns 210*sp* may be disposed on the same layer as each other, and for example, may be included in the second conductive layer 204 (see FIG. 4). The first cross patterns 221*cp*, the second cross patterns 222*cp*, the third bridge patterns 210*bp*, and the auxiliary electrode 230*s* may be disposed on the same layer as each other, and for example, may be included in the first conductive layer 202 (see FIG. 4).

In an embodiment of the present inventive concept, two first extension patterns 221*ep* may extend from one first sensing pattern 221*sp*. In an embodiment, each of the first extension patterns 221*ep* may extend from a corresponding first sensing pattern 221*sp* and have an integrated shape with the corresponding first sensing pattern 221*sp*. In an embodiment, each of the first extension patterns 221*ep* and a corresponding first cross pattern 221*cp* may be disposed on different layers from each other and connected through a via hole defined in the intermediate insulating layer 203 (see FIG. 6). However, embodiments of the present inventive concept are not necessarily limited thereto, and each of the first extension patterns 221*ep* may extend from a corresponding first cross pattern 221*cp* and have an integrated shape with the corresponding first cross pattern 221*cp*.

In an embodiment, two second extension patterns 222*ep* may extend from one second sensing pattern 222*sp*. In an embodiment, each of the second extension patterns 222*ep* may extend from a corresponding second sensing pattern 222*sp* and have an integrated shape with the corresponding second sensing pattern 222*sp*. In an embodiment, each of the second extension patterns 222*ep* and a corresponding second cross pattern 222*cp* may be disposed on different layers from each other and connected through a via hole defined in the intermediate insulating layer 203 (see FIG. 6). However, embodiments of the present inventive concept are not necessarily limited thereto, and each of the second extension patterns 222*ep* may extend from a corresponding cross pattern 222*cp* and have an integrated shape with the corresponding second cross pattern 222*cp*.

In an embodiment, the third sensing patterns 210*sp* may be spaced apart from each other in a second direction DR2. The third sensing patterns 210*sp* spaced apart from each other in the second direction DR2 may be electrically connected to each other by the third bridge pattern 210*bp*. In an embodiment of the present inventive concept, the third sensing patterns 210*sp* spaced apart from each other in the second direction DR2 and the third bridge pattern 210*bp* connecting the third sensing patterns 210*sp* may be disposed on different layers from each other and connected through a via hole defined in the intermediate insulating layer 202 (see FIG. 6).

Each of the auxiliary electrodes 230*s* may extend along the second direction DR2. The third sensing patterns 210*sp* included in one first electrode group 210Gb may overlap (e.g. in a plan view) one corresponding auxiliary electrode 230*s* among the auxiliary electrodes 230*s*. A hole 230*s-h* may be defined in each of the auxiliary electrodes 230*s*. Each of the third bridge patterns 210*bp* may be surrounded (e.g., in a plan view) by a corresponding hole 230*s-h* and insulated from the auxiliary electrode 230*s*.

Patterns illustrated in FIGS. 27A and 27B may each have a mesh structure. The mesh structures may each include a plurality of mesh lines. In an embodiment, the plurality of mesh lines may each have a straight-lined shape extending in a predetermine direction and may be connected to each other. However, embodiments of the present inventive concept are not necessarily limited thereto, and at least a portion of each of the plurality of mesh lines may have a curved shape.

Figure 28:
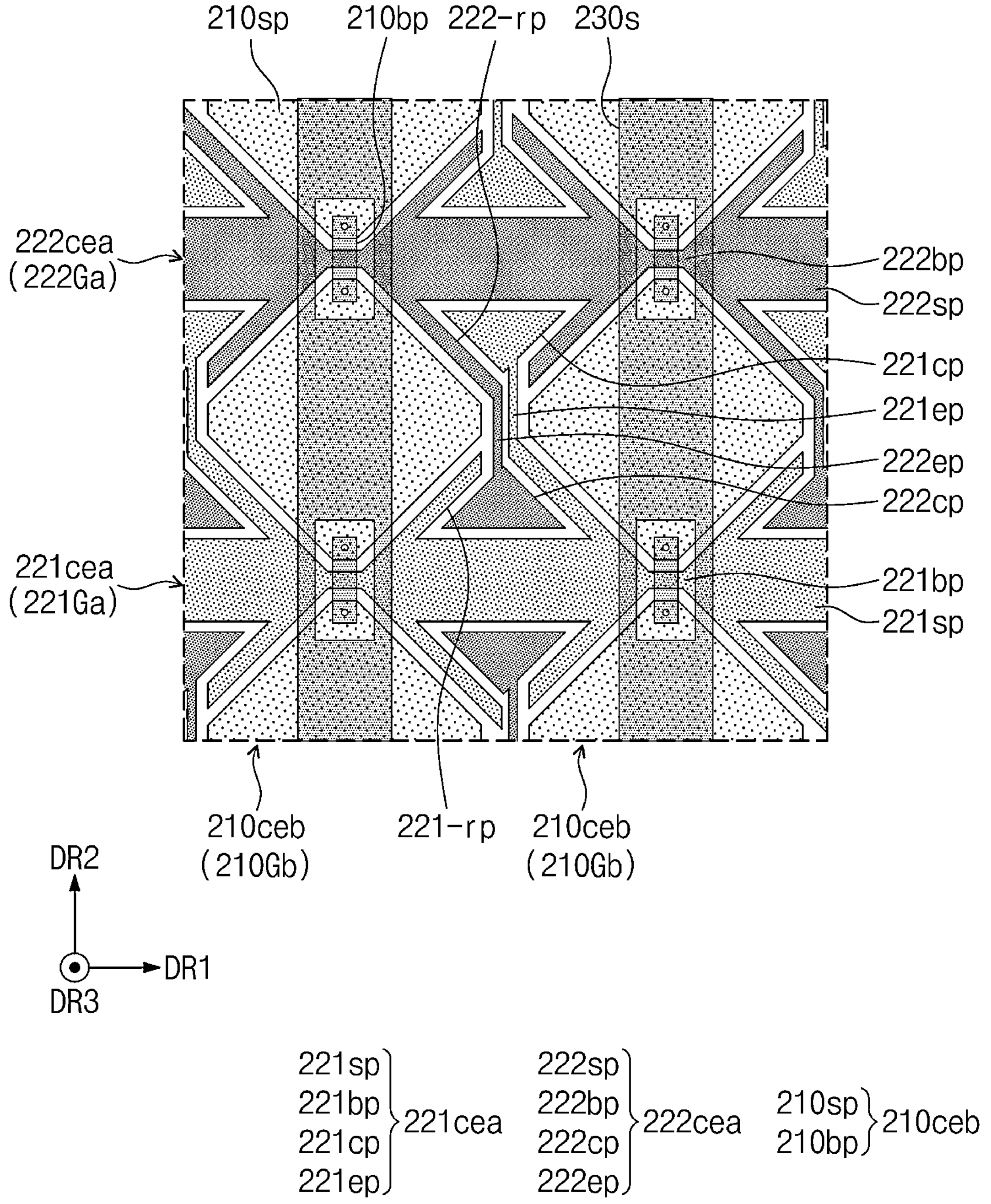
FIG. 28 is a plan view illustrating four sensing units according to an embodiment of the present inventive concept.
Figure 29A:
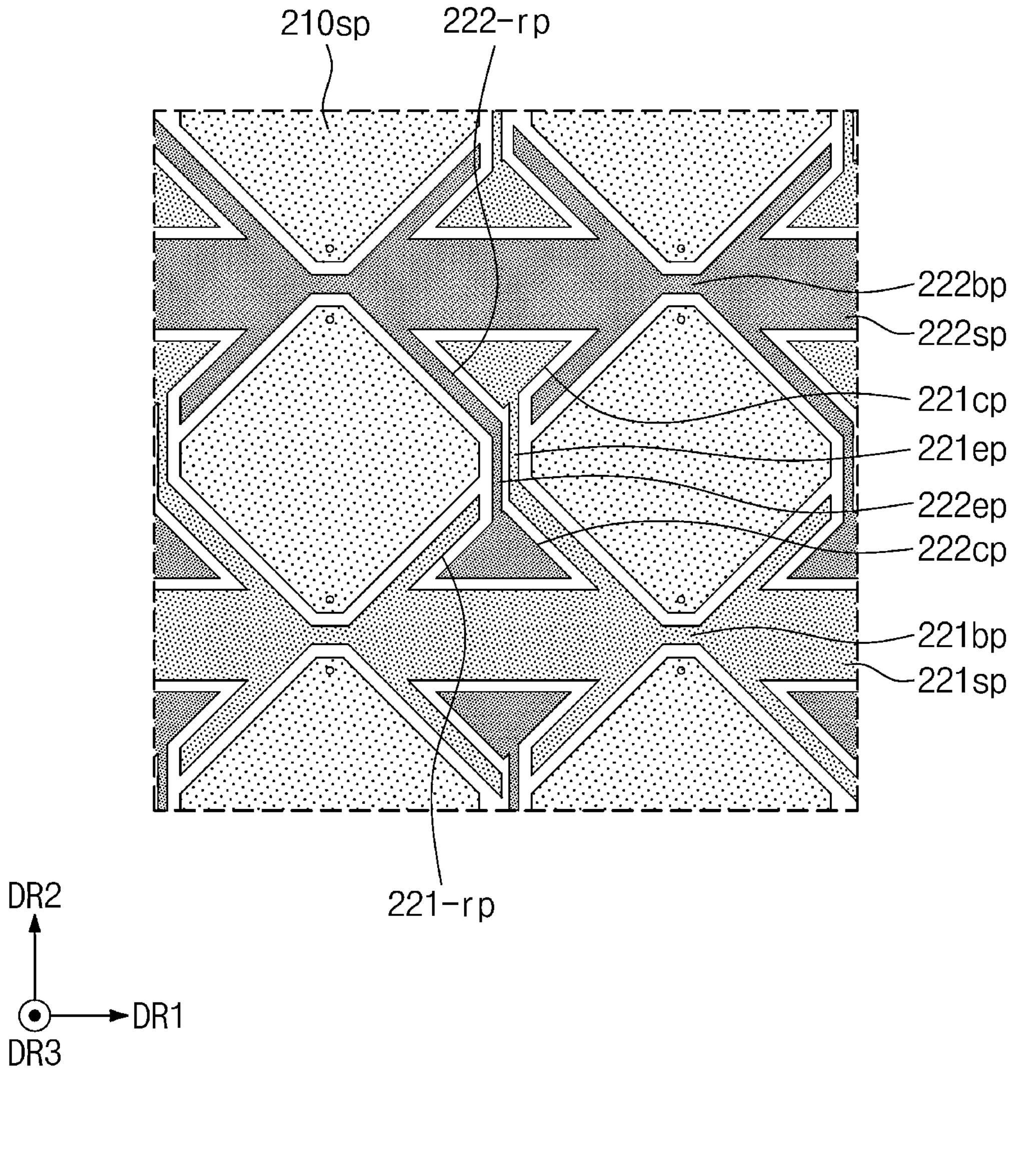
FIG. 29A is a plan view illustrating a second conductive layer of four sensing units according to an embodiment of the present inventive concept.
Figure 29B:
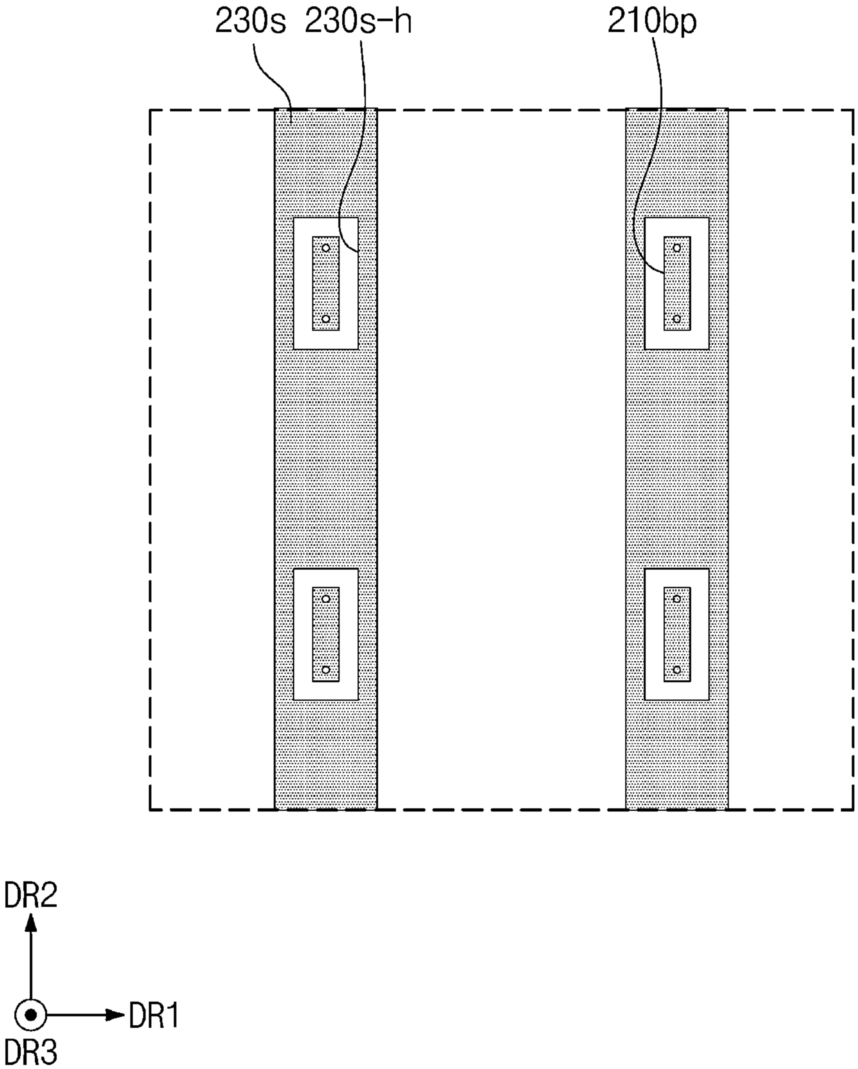
FIG. 29B is a plan view illustrating a first conductive layer of four sensing units according to an embodiment of the present inventive concept.

FIG. 28 is a plan view illustrating four sensing units according to an embodiment of the present inventive concept. FIG. 29A is a plan view illustrating a second conductive layer of four sensing units according to an embodiment of the present inventive concept. FIG. 29B is a plan view illustrating a first conductive layer of four sensing units according to an embodiment of the present inventive concept.

Referring to FIGS. 22, 28, 29A, and 29B, in an embodiment a first sensing electrode 221*cea* may include first sensing patterns 221*sp*, first bridge patterns 221*bp*, first cross patterns 221*cp*, and first extension patterns 221*ep*. A second sensing electrode 222*cea* may include second sensing patterns 222*sp*, second bridge patterns 222*bp*, second cross patterns 222*cp*, and second extension patterns 222*ep*. A third sensing electrode 210*ceb* may solely include third sensing patterns 210*sp* and third bridge patterns 210*bp*. In an embodiment, the third sensing electrode 210*ceb* may not include additional cross patterns and connection patterns.

In an embodiment, the first sensing patterns 221*sp*, the first bridge patterns 221*bp*, the first cross patterns 221*cp*, the first extension patterns 221*ep*, the second sensing patterns 222*sp*, the second bridge patterns 222*bp*, the second cross patterns 222*cp*, the second extension patterns 222*ep*, and the third sensing patterns 210*sp* may be disposed on the same layer as each other, and for example, may be included in the second conductive layer 204 (see FIG. 4). For example, in an embodiment the first sensing patterns 221*sp*, the first bridge patterns 221*bp*, the first cross patterns 221*cp*, and the first extension patterns 221*ep* of one first sensing electrode may be disposed on the same layer as each other and have an integrated shape. In an embodiment, the second sensing patterns 222*sp*, the second bridge patterns 222*bp*, the second cross patterns 222*cp*, and the second extension patterns 222*ep* of one second sensing electrode may be disposed on the same layer as each other and have an integrated shape. The third bridge patterns 210*bp* and auxiliary electrode 230*s* may be disposed on the same layer as each other, and for example, may be included in the first conductive layer 202 (see FIG. 4).

In an embodiment of the present inventive concept, at least one recessed portion 221-*rp* and 222-*rp* may be defined in each of the first and second sensing patterns 221*sp* and 222*sp*. FIG. 29A illustrates that two recessed portions 221-*rp* and 222-*rp* are defined in each of the first and second sensing patterns 221*sp* and 222*sp*. However, embodiments of the present inventive concept are not necessarily limited thereto.

The second cross pattern 222*cp* may be disposed in each of the recessed portions 221-*rp* of the first sensing pattern 221*sp*. An outer edge of the second cross pattern 222*cp* may be surrounded (e.g., in a plan view) by the first sensing pattern 221*sp*. The first cross pattern 221*cp* may be disposed in each of the recessed portions 222-*rp* of the second sensing pattern 222*sp*. An outer edge of the first cross pattern 221*cp* may be surrounded (e.g., in a plan view) by the second sensing pattern 222*sp*. Thus, a coupling capacitance may be defined between a (2-1)-th electrode group 221Ga and a (2-2)-th electrode group 222Ga adjacent to each other.

Patterns illustrated in FIGS. 29A and 29B may each have a mesh structure. The mesh structures may each include a plurality of mesh lines. In an embodiment, the plurality of mesh lines may each have a straight-lined shape extending in a predetermined direction and may be connected to each other. However, embodiments of the present inventive concept are not necessarily limited thereto, and at least a portion of each of the plurality of mesh lines may have a curved shape.

Figure 30:
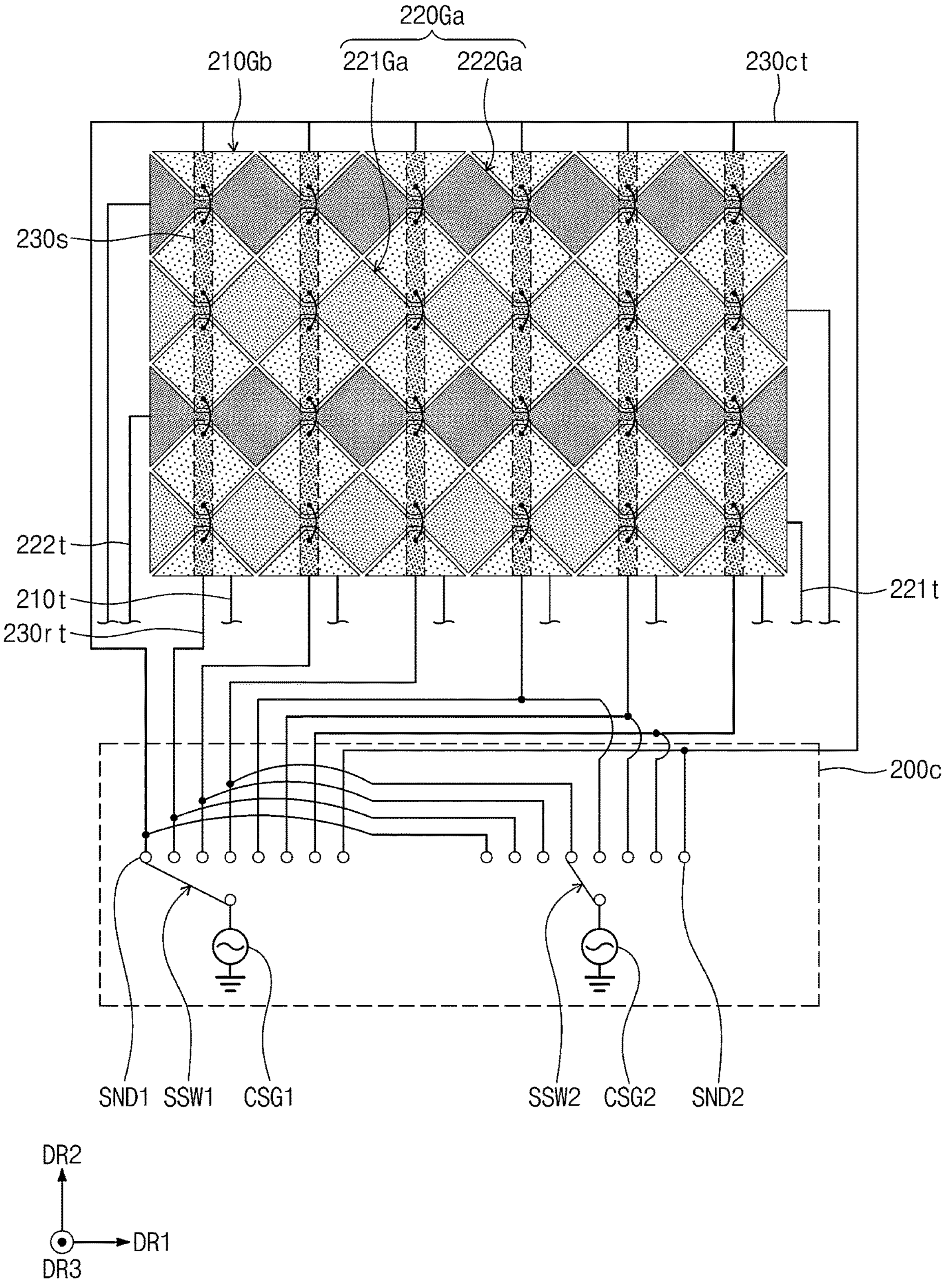
FIG. 30 is a plan view illustrating a portion of a sensor layer and a portion of a sensor driver according to an embodiment of the present inventive concept.

FIG. 30 is a plan view illustrating a portion of a sensor layer and a portion of a sensor driver according to an embodiment of the present inventive concept.

Referring to FIGS. 7 and 30, in an embodiment the sensor layer 200 may further include a plurality of loop trace lines 230*rt* electrically connected to a plurality of auxiliary electrodes 230*s*. FIG. 30 illustrates that the auxiliary electrodes 230*s* and the loop trace lines 230*rt* are electrically connected in one-to-one correspondence. However, embodiments of the present inventive concept are not necessarily limited thereto. For example, in some embodiments two or more auxiliary electrodes 230*s* may be electrically connected to one loop trace line 230*rt*.

The second mode MD2 (see FIG. 9) may include a charge driving mode and a pen sensing driving mode. FIG. 30 is a diagram illustrating the charge driving mode. In an embodiment, a sensor driver 200C may include a first switch SSW1 and a second switch SSW2. A first signal CSG1 may be transmitted to the sensor layer 200 through the first switch SSW1, and a second signal CSG2 may be transmitted to the sensor layer 200 through the second switch SSW2.

In an embodiment, each of the first signal CSG1 and the second signal CSG2 may be a sine wave or square wave signal. In an embodiment, the first signal CSG1 and the second signal CSG2 may be in a reverse phase relationship. Thus, a direction of current may periodically change in the charge driving mode. However, embodiments of the present inventive concept are not necessarily limited thereto. For example, in an embodiment of the present inventive concept, one of the first signal CSG1 or the second signal CSG2 may be a sine wave or square wave signal, and the other may have a predetermined constant voltage.

In the charge driving mode, the first switch SSW1 and the second switch SSW2 may be electrically connected to at least one among and at least another one among a connection trace line 230*ct* and the loop trace lines 230*rt*. FIG. 30 illustrates that the first signal CSG1 is provided to the connection trace line 230*ct* and the second signal CSG2 is provided to one loop trace line 230*rt*. However, embodiments of the present inventive concept are not necessarily limited thereto. For example, in some embodiments the first signal CSG1 may be provided to two or more lines, and the second signal CSG2 may also be provided to two or more different lines.

In an embodiment, in the pen sensing driving mode, all the loop trace lines 230*rt* may be electrically floated, and the connection trace line 230*ct* may be grounded.

Figure 31:
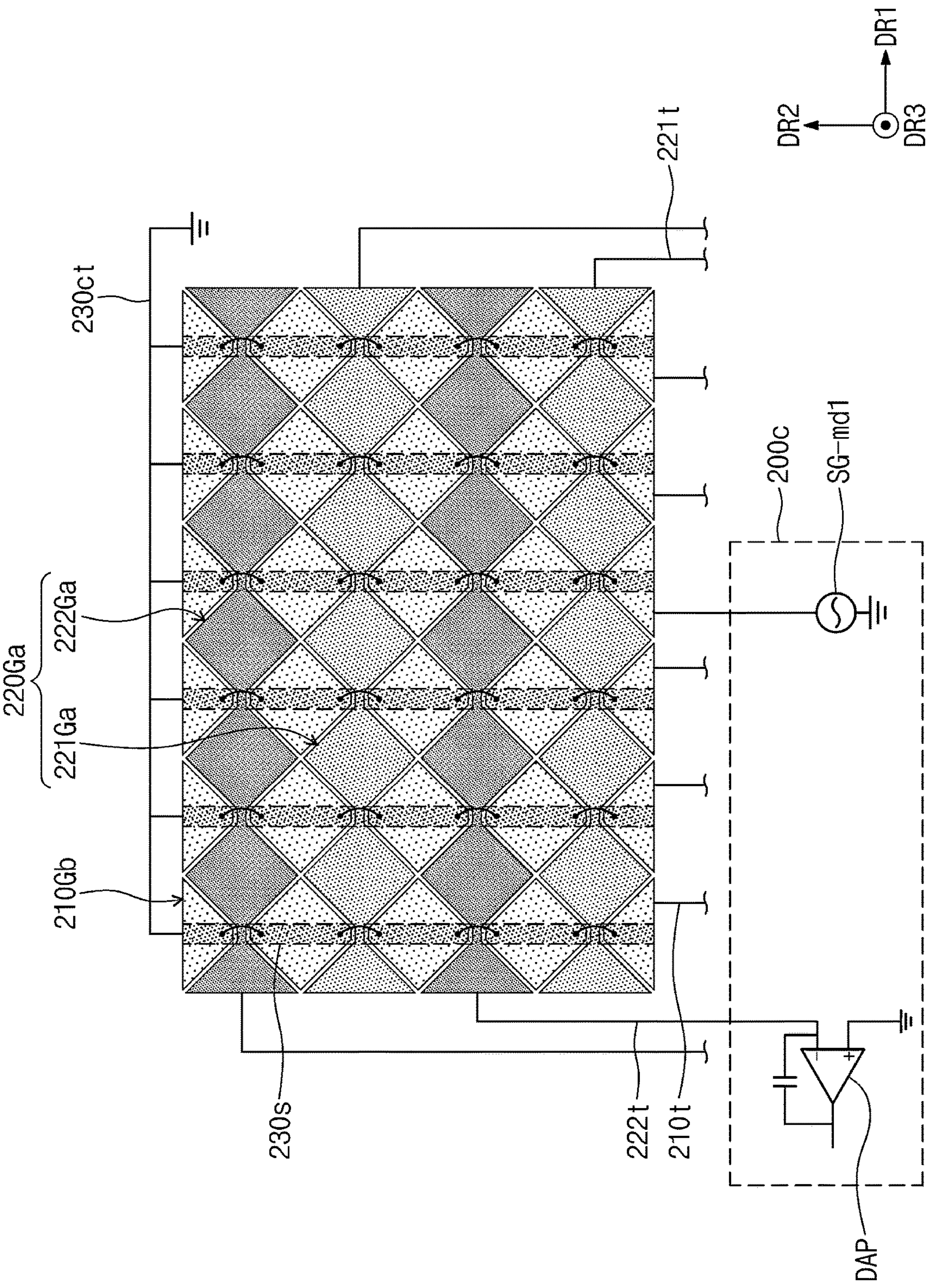
FIG. 31 is a plan view illustrating a portion of a sensor layer and a portion of a sensor driver according to an embodiment of the present inventive concept.

FIG. 31 is a plan view illustrating a portion of a sensor layer and a portion of a sensor driver according to an embodiment of the present inventive concept.

Referring to FIGS. 7 and 31, an operation of the sensor layer 200 in the first mode MD1 (see FIG. 9) is schematically illustrated. In an embodiment, the first mode MD1 may include a mutual capacitance detecting mode.

In an embodiment, a sensor driver 200C may include a differential amplifier DAP. In the first mode MD1, an inverting terminal of the differential amplifier DAP may be electrically connected to second electrode groups 220Ga. A non-inverting terminal of the differential amplifier DAP may be grounded or applied with a reference voltage.

In the first mode MD1, the sensor driver 200C may sequentially provide a transmission signal SG-md1 to first electrode groups 210Gb. The sensor driver 200C may detect a coordinate based on the first input 2000 (see FIG. 4) by using a reception signal detected through the second electrode groups 220Ga. For example, the sensor driver 200C may be configured to sense a change in mutual capacitance between the first electrode groups 210Gb and the second electrode groups 220Ga and calculate an input coordinate.

In the first mode MD1, a connection trace line 230*ct* may be grounded. Thus, noise may not be introduced through auxiliary electrodes 230*s*.

Figure 32:
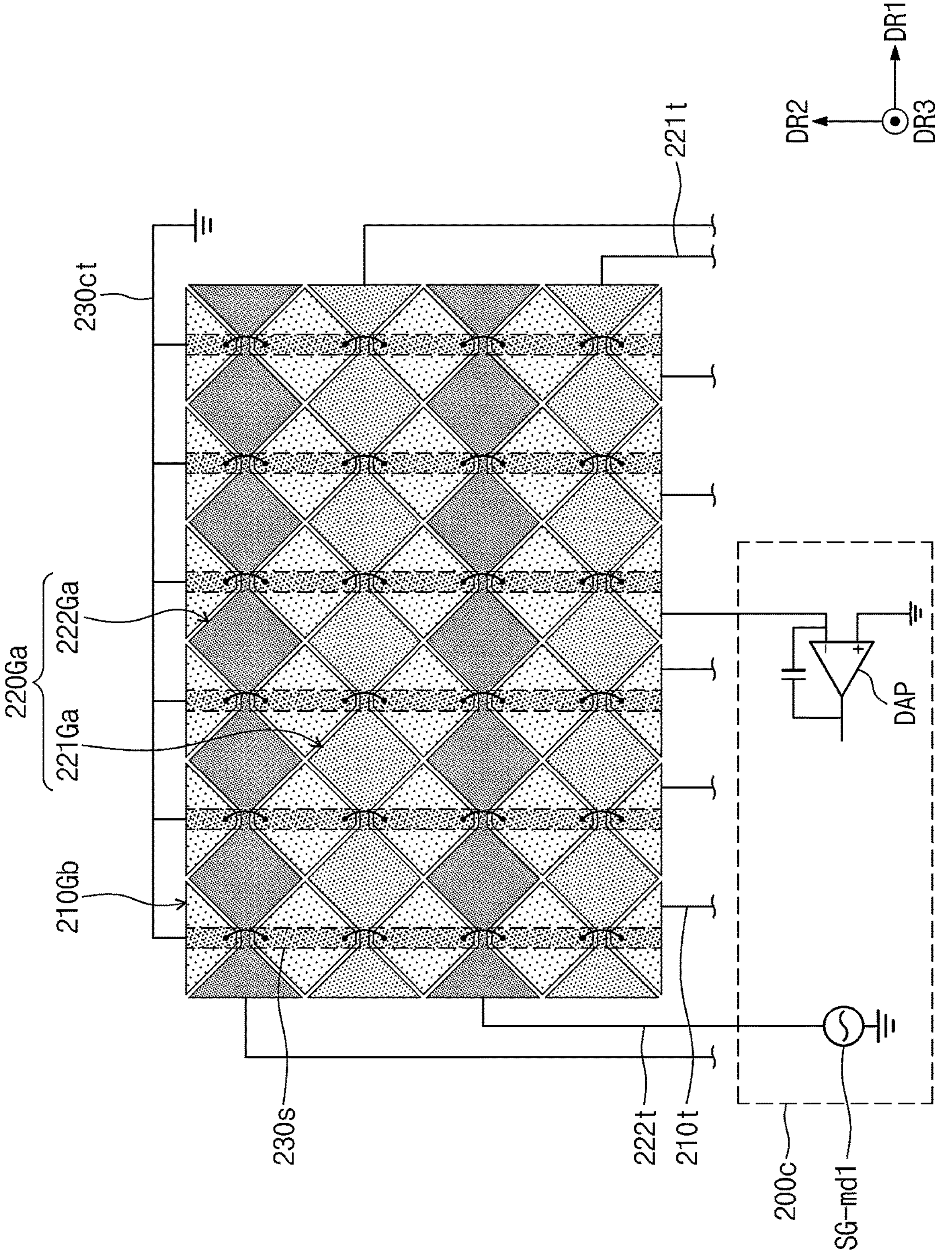
FIG. 32 is a plan view illustrating a portion of a sensor layer and a portion of a sensor driver according to an embodiment of the present inventive concept.

FIG. 32 is a plan view illustrating a portion of a sensor layer and a portion of a sensor driver according to an embodiment of the present inventive concept.

Referring to FIGS. 7 and 32, an operation of the sensor layer 200 in the first mode MD1 (see FIG. 9) is schematically illustrated. In an embodiment, the first mode MD1 may include a mutual capacitance detecting mode.

In an embodiment, a sensor driver 200C may include a differential amplifier DAP. In the first mode MD1, an inverting terminal of the differential amplifier DAP may be electrically connected to first electrode groups 210Gb. A non-inverting terminal of the differential amplifier DAP may be grounded or applied with a reference voltage.

In the first mode MD1, the sensor driver 200C may sequentially provide a transmission signal SG-md1 to second electrode groups 220Ga. The sensor driver 200C may detect a coordinate based on the first input 2000 (see FIG. 4) by using a reception signal detected through the first electrode groups 210Gb. For example, the sensor driver 200C may be configured to sense a change in mutual capacitance between the first electrode groups 210Gb and the second electrode groups 220Ga and calculate an input coordinate.

In the first mode MD1, a connection trace line 230*ct* may be grounded. Thus, noise may not be introduced through auxiliary electrodes 230*s*.

Figure 33:
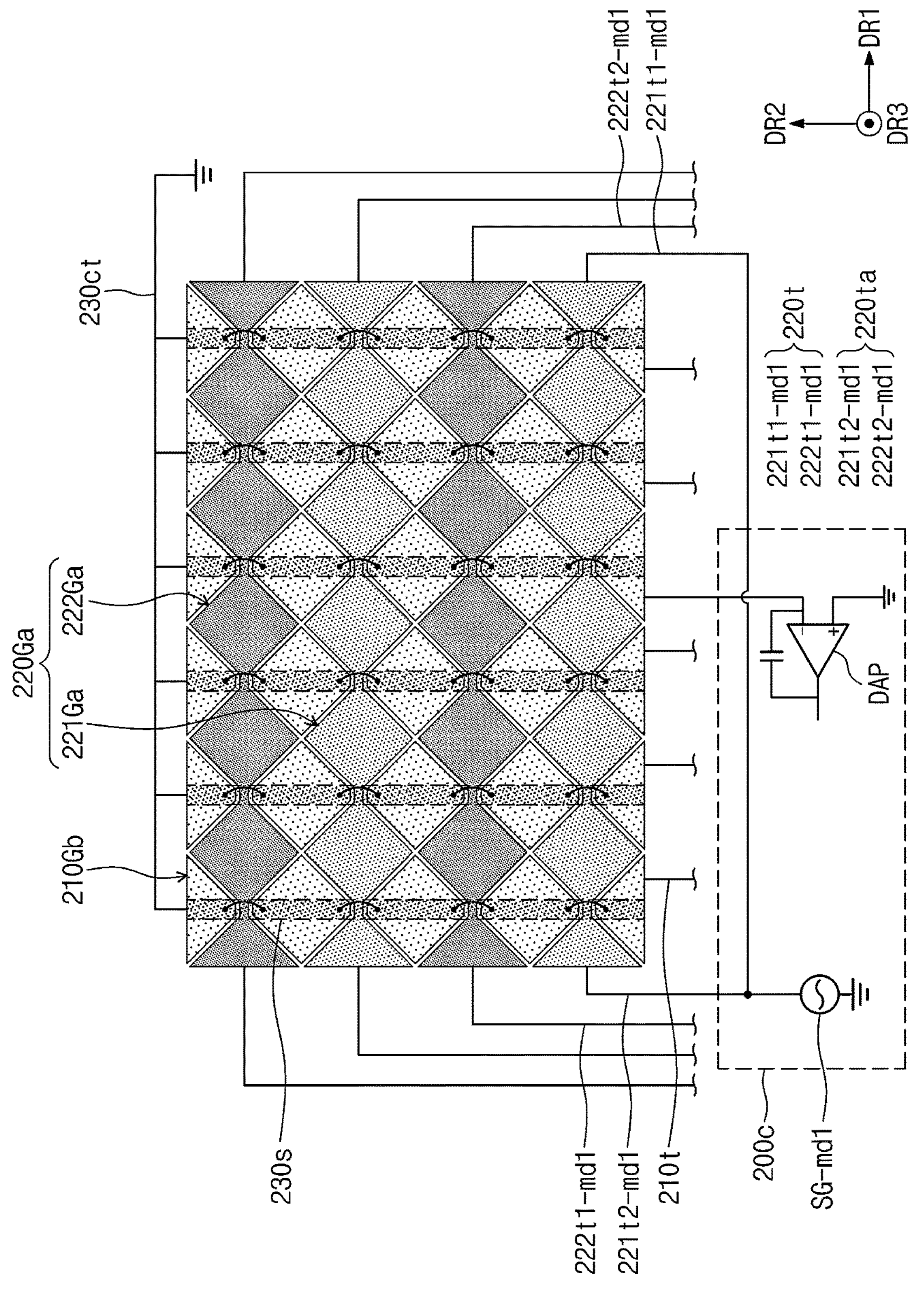
FIG. 33 is a plan view illustrating a portion of a sensor layer and a portion of a sensor driver according to an embodiment of the present inventive concept.

FIG. 33 is a plan view illustrating a portion of a sensor layer and a portion of a sensor driver according to an embodiment of the present inventive concept.

Referring to FIGS. 7 and 33, an operation of the sensor layer 200 in the first mode MD1 (see FIG. 9) is schematically illustrated. In an embodiment, the first mode MD1 may include a mutual capacitance detecting mode.

The sensor layer 200 may further include additional trace lines 220*ta*. The additional trace lines 220*ta* may include first additional trace lines 221*t*2-*md*1 and second additional trace lines 222*t*2-*md*1. (2-1)-th electrode groups 221Ga may each be connected to a first crossing trace line 221*t*1-*md*1 and the first additional trace line 221*t*2-*md*1. In an embodiment, the first crossing trace line 221*t*1-*md*1 may be connected to one side (e.g., a right end) of a corresponding (2-1)-th electrode group 221Ga, and the first additional trace line 221*t*2-*md*1 may be connected to another end (e.g., a left end) of a corresponding (2-1)-th electrode group 221Ga. (2-2)-th electrode groups 222Ga may each be connected to a second crossing trace line 222*t*1-*md*1 and the second additional trace line 222*t*2-*md*1. In the first mode MD1, the second crossing trace line 222*t*1-*md*1 may be connected to one side (e.g., a left end) of a corresponding (2-2)-th electrode group 222Ga, and the second additional trace line 222*t*2-*md*1 may be connected to another end (e.g., a right end) of a corresponding (2-2)-th electrode group 222Ga.

In the first mode MD1, the first additional trace line 221*t*2-*md*1 may be electrically connected to the first crossing trace line 221*t*1-*md*1. In an embodiment, in the first mode MD1, the second additional trace line 222*t*2-*md*1 may also be electrically connected to the second crossing trace line 222*t*1-*md*1.

In the first mode MD1, a sensor driver 200C may sequentially provide a transmission signal SG-md1 to second electrode groups 220Ga. The sensor driver 200C may detect a coordinate based on the first input 2000 (see FIG. 4) by using a reception signal detected through first electrode groups 210Gb. For example, the sensor driver 200C may be configured to sense a change in mutual capacitance between the first electrode groups 210Gb and the second electrode groups 220Ga and calculate an input coordinate.

In an embodiment, in the second mode MD2 (see FIG. 9), the first additional trace line 221*t*2-*md*1 may be electrically disconnected from the first crossing trace line 221*t*1-*md*1, and the second additional trace line 222*t*2-*md*1 may be electrically disconnected from the second crossing trace line 222*t*1-*md*1. In the second mode MD2, the first additional trace line 221*t*2-*md*1 and the second additional trace line 222*t*2-*md*1 may each be floated.

However, embodiments of the present inventive concept are not necessarily limited thereto. For example, in an embodiment of the present inventive concept, the first mode MD1 may include a self-capacitance detecting mode. The sensor driver 200C may be configured to output driving signals to the first electrode groups 210Gb and the second electrode groups 220Ga, sense a change in capacitance of each of the first electrode groups 210Gb and the second electrode groups 220Ga, and calculate an input coordinate in the self-capacitance detecting mode.

According to the description above, an input by a pen as well as a touch input may be sensed by using a sensor layer. Thus, since it may not be necessary to add an additional component (e.g., a digitizer) for pen sensing to an electronic device, an increase in thickness, an increase in weight, and deterioration in flexibility of the electronic device according to an addition of a digitizer may not occur. In addition, at least one electrode group disposed to be parallel to each other in the sensor layer may include two electrode groups of which routing directions are different. A magnitude of a signal received from an electrode may be increased through a coupling capacitance between the two electrode groups. As a result, a sensor driver may stably receive a signal from an electrode regardless of a distance between an input terminal and a region in which an input by a pen is inputted.

Although non-limiting embodiments of the present inventive concept have been described, it is understood that the present inventive concept should not be limited to the described embodiments, but various changes and modifications may be made by one ordinary skilled in the art within the spirit and scope of the present inventive concept. Therefore, the technical scope of the present inventive concept is not limited to the contents described in the detailed description of the specification.

What is claimed is:

1. An electronic device comprising:

a sensor layer; and a sensor driver driving the sensor layer and selectively operating in a first mode for sensing a touch input and in a second mode for sensing a pen input, wherein the sensor layer includes:

a plurality of first electrode groups arranged along a first direction;

a plurality of second electrode groups arranged along a second direction crossing the first direction, the plurality of second electrode groups crossing the plurality of first electrode groups, and including at least one (2-1)-th electrode group and at least one (2-2)-th electrode group spaced apart from each other in the second direction;

a first crossing trace line connected to one side of the at least one (2-1)-th electrode group; and a second crossing trace line connected to one side of the at least one (2-2)-th electrode group, the one side of the at least one (2-1)-th electrode group and the one side of the at least one (2-2)-th electrode group are opposite to each other with respect to the first direction, wherein a plurality of coupling capacitances are defined between adjacent (2-1)-th and (2-2)-th electrode groups, the plurality of coupling capacitances increasing a current sensing the pen input that is received by the sensor driver from the sensor layer in the second mode to increase a sensitivity of the sensing of the pen input.

2. The electronic device of claim 1, wherein:

each of the at least one (2-1)-th electrode group includes a plurality of (2-1)-th electrode groups and the at least one (2-2)-th electrode group includes a plurality of (2-2)-th electrode groups; and the plurality of (2-1)-th electrode groups and the plurality of (2-2)-th electrode groups are alternately arranged.

3. The electronic device of claim 2, wherein the plurality of coupling capacitances are defined between adjacent (2-1)-th electrode group and (2-2)-th electrode group among the plurality of (2-1)-th electrode groups and the plurality of (2-2)-th electrode groups.

4. The electronic device of claim 2, wherein:

the sensor driver outputs a first output signal by performing a differential operation on first signals received from the plurality of (2-1)-th electrode groups; and the sensor driver outputs a second output signal by performing a differential operation on second signals received from the plurality of (2-2)-th electrode groups.

5. The electronic device of claim 4, wherein:

the sensor driver comprises a first differential amplifier having an inverting terminal and a non-inverting terminal and a second differential amplifier having an inverting terminal and a non-inverting terminal; and the second mode comprises a pen sensing driving mode, wherein in the pen sensing driving mode, the inverting terminal of the first differential amplifier is electrically connected to a first (2-1)-th electrode group of the plurality of (2-1)-th electrode groups, and the non-inverting terminal of the first differential amplifier is electrically connected to a second (2-1)-th electrode group of the plurality of (2-1)-th electrode groups, and in the pen sensing driving mode, the inverting terminal of the second differential amplifier is electrically connected to a first (2-2)-th electrode group of the plurality of (2-2)-th electrode groups, and a non-inverting terminal of the second differential amplifier is electrically connected to a second (2-2)-th electrode group of the plurality of (2-2)-th electrode groups.

6. The electronic device of claim 4, wherein:

the sensor driver converts the first signals received from the plurality of (2-1)-th electrode groups into first digital signals and performs a difference operation on the first digital signals; and the sensor driver converts the second signals received from the plurality of (2-2)-th electrode groups into second digital signals and perform a difference operation on the second digital signals.

7. The electronic device of claim 4, wherein:

the sensor driver obtains a first output signal by performing a differential operation on the first signals, and obtains a second output signal by performing a differential operation on the second signals; and the sensor driver amplifies the first output signal by applying a gain value to the first output signal when a magnitude of the first output signal is less than a magnitude of the second output signal.

8. The electronic device of claim 1, wherein:

the plurality of first electrode groups comprise at least one (1-1)-th electrode group and at least one (1-2)-th electrode group spaced apart from each other in the first direction, the sensor layer comprises:

a third crossing trace line connected to one side of the at least one (1-1)-th electrode group; and a fourth crossing trace line connected to one side of the at least one (1-2)-th electrode group, the one side of the at least one (1-1)-th electrode group and the one side of the at least one (1-2)-th electrode group are opposite to each other with respect to the second direction.

9. The electronic device of claim 8, wherein:

each of the at least one (1-1)-th electrode group includes a plurality of (1-1)-th electrode groups and the at least one (1-2)-th electrode group includes a plurality of (1-2)-th electrode groups; and the plurality of (1-1)-th electrode groups and the plurality of (1-2)-th electrode groups are alternately arranged.

10. The electronic device of claim 9, wherein a plurality of coupling capacitances are defined between adjacent (1-1)-th electrode group and (1-2)-th electrode group among the plurality of (1-1)-th electrode groups and the plurality of (1-2)-th electrode groups.

11. The electronic device of claim 8, wherein:

each of the at least one (2-1)-th electrode group comprises a first sensing electrode, and each of the at least one (2-2)-th electrode group comprises a second sensing electrode;

the first sensing electrode includes first sensing patterns, first bridge patterns connecting adjacent first sensing patterns among the first sensing patterns, and a first cross pattern electrically connected to each of the first sensing patterns;

the second sensing electrode includes second sensing patterns, second bridge patterns connecting adjacent second sensing patterns among the second sensing patterns, and a second cross pattern electrically connected to each of the second sensing patterns;

the first and second sensing patterns and the first and second cross patterns are disposed on different layers from each other; and at least a portion of the first cross pattern overlaps an adjacent second sensing pattern among the second sensing patterns, and at least a portion of the second cross pattern overlaps an adjacent first sensing pattern among the first sensing patterns.

12. The electronic device of claim 11, wherein:
each of the at least one (1-1)-th electrode group comprises a third sensing electrode, and each of the at least one (1-2)-th electrode group comprises a fourth sensing electrode;
the third sensing electrode includes third sensing patterns, third bridge patterns connecting adjacent third sensing patterns among the third sensing patterns, and a third cross pattern electrically connected to each of the third sensing patterns;
the fourth sensing electrode includes fourth sensing patterns, fourth bridge patterns connecting adjacent fourth sensing patterns among the fourth sensing patterns, and a fourth cross pattern electrically connected to each of the fourth sensing patterns;
the third and fourth sensing patterns and the third and fourth cross patterns are disposed on different layers from each other; and
at least a portion of the third cross pattern overlaps an adjacent fourth sensing pattern among the fourth sensing patterns, and at least a portion of the fourth cross pattern overlaps an adjacent third sensing pattern among the third sensing patterns.

13. The electronic device of claim 8, wherein:
each of the at least one (2-1)-th electrode group comprises a first sensing electrode, and each of the at least one (2-2)-th electrode group comprises a second sensing electrode;
the first sensing electrode includes first sensing patterns, first bridge patterns connecting adjacent first sensing patterns among the first sensing patterns, and a first cross pattern electrically connected to each of the first sensing patterns;
the second sensing electrode includes second sensing patterns, second bridge patterns connecting adjacent second sensing patterns among the second sensing patterns, and a second cross pattern electrically connected to each of the second sensing patterns;
the first and second sensing patterns and the first and second cross patterns are disposed on a same layer as each other; and
the first cross pattern is disposed in an opening of adjacent second sensing patterns among the second sensing patterns, and the second cross pattern is disposed in an opening of adjacent first sensing patterns among the first sensing patterns.

14. The electronic device of claim 13, wherein;
each of the at least one (1-1)-th electrode group comprises a third sensing electrode, and each of the at least one (1-2)-th electrode group comprises a fourth sensing electrode,
the third sensing electrode includes third sensing patterns, third bridge patterns connecting adjacent third sensing patterns among the third sensing patterns, and a third cross pattern electrically connected to each of the third sensing patterns,
the fourth sensing electrode includes fourth sensing patterns, fourth bridge patterns connecting adjacent fourth sensing patterns among the fourth sensing patterns, and a fourth cross pattern electrically connected to each of the fourth sensing patterns,
the third and fourth sensing patterns and the third and fourth cross patterns are disposed on a same layer as each other, and
the third cross pattern is disposed in a recessed portion of an adjacent fourth sensing pattern among the fourth sensing patterns, and the fourth cross pattern is disposed in a recessed portion of an adjacent third sensing pattern among the third sensing patterns.

15. The electronic device of claim 1, wherein:
the sensor layer further comprises a plurality of auxiliary electrodes respectively overlapping the plurality of first electrode groups; and
a connection trace line connecting the plurality of auxiliary electrodes to each other.

16. The electronic device of claim 15, wherein the sensor layer further comprises a plurality of first trace lines electrically connected, in one-to-one correspondence, to the plurality of first electrode groups; and
the plurality of first trace lines are spaced apart from the connection trace line with the plurality of first electrode groups therebetween.

17. The electronic device of claim 15, wherein:
each of the at least one (2-1)-th electrode group comprises a first sensing electrode, each of the at least one (2-2)-th electrode group comprises a second sensing electrode, and each of the plurality of first electrode groups comprises a third sensing electrode;
the first sensing electrode includes first sensing patterns, first bridge patterns connecting adjacent first sensing patterns among the first sensing patterns, and a first cross pattern electrically connected to each of the first sensing patterns;
the second sensing electrode includes second sensing patterns, second bridge patterns connecting adjacent second sensing patterns among the second sensing patterns, and a second cross pattern electrically connected to each of the second sensing patterns,
the third sensing electrode includes third sensing patterns and third bridge patterns connecting adjacent third sensing patterns among the third sensing patterns, and
each of the third sensing patterns overlap one corresponding auxiliary electrode among the plurality of auxiliary electrodes.

18. The electronic device of claim 17, wherein the plurality of auxiliary electrodes and the first to third sensing patterns are disposed on different layers from each other.

19. The electronic device of claim 17, wherein:
the first and second sensing patterns and the first and second cross patterns are disposed on different layers from each other; and
at least a portion of the first cross pattern overlaps an adjacent second sensing pattern among the second sensing patterns, and at least a portion of the second cross pattern overlaps an adjacent first sensing pattern among the first sensing patterns.

20. The electronic device of claim 17, wherein:
the first and second sensing patterns and the first and second cross patterns are disposed on a same layer as each other; and
the first cross pattern is disposed in a recessed portion of an adjacent second sensing pattern among the second sensing patterns, and the second cross pattern is disposed in a recessed portion of an adjacent first sensing pattern among the first sensing patterns.

21. The electronic device of claim 17, wherein a plurality of holes respectively surrounding the third bridge patterns are defined in the one corresponding auxiliary electrode.

22. The electronic device of claim 15, wherein:

the sensor layer further comprises a plurality of loop trace lines electrically connected to the plurality of auxiliary electrodes; and the second mode comprises a charge driving mode and a pen sensing driving mode, wherein in the charge driving mode, the sensor driver applies a first signal to at least one among the connection trace line and the plurality of loop trace lines and applies a second signal to another of at least one among the connection trace line and the plurality of loop trace lines, and in the pen sensing driving mode, all of the plurality of loop trace lines are electrically floated.

23. The electronic device of claim 1, wherein in the first mode, the sensor driver sequentially provides a transmission signal to the plurality of first electrode groups and receives signals from the plurality of second electrode groups.

24. The electronic device of claim 1, wherein in the first mode, the sensor driver sequentially provides a transmission signal to the plurality of second electrode groups and receives signals from the plurality of first electrode groups.

25. The electronic device of claim 1, wherein the sensor layer further comprises:

a first additional trace line connected to another side of the at least one (2-1)-th electrode group that is different from the one side of the at least one (2-1)-th electrode group; and a second additional trace line connected to another side of the at least one (2-2)-th electrode group that is different from the one side of the at least one (2-2)-th electrode group, in the first mode, the first additional trace line is electrically connected to the first crossing trace line, and the second additional trace line is electrically connected to the second crossing trace line, and in the second mode, each of the first additional trace line and the second additional trace line is electrically floated.

26. The electronic device of claim 1, wherein each of the at least one (2-1)-th electrode group and the at least one (2-2)-th electrode group crosses all of the plurality of first electrode groups.

27. An electronic device comprising:

a sensor layer; and a sensor driver driving the sensor layer and selectively operating in a first mode for sensing a touch input and in a second mode for sensing a pen input, wherein the sensor layer includes:

a plurality of first electrode groups arranged along a first direction; and a plurality of second electrode groups arranged along a second direction crossing the first direction, the plurality of second electrode groups crossing the plurality of first electrode groups; and a plurality of coupling capacitances are defined between adjacent second electrode groups among the plurality of second electrode groups, the plurality of coupling capacitances increasing a current sensing the pen input that is received by the sensor driver from the sensor layer in the second mode to increase a sensitivity of the sensing of the pen input.

28. The electronic device of claim 27, wherein:

the plurality of second electrode groups comprise a (2-1)-th electrode group and a (2-2)-th electrode group spaced apart from each other in the second direction, the (2-1)-th electrode group includes a first sensing electrode, and the (2-2)-th electrode group includes a second sensing electrode;

the first sensing electrode includes first sensing patterns, first bridge patterns connecting adjacent first sensing patterns among the first sensing patterns, and a first cross pattern electrically connected to each of the first sensing patterns; and the second sensing electrode includes second sensing patterns, second bridge patterns connecting adjacent second sensing patterns among the second sensing patterns, and a second cross pattern electrically connected to each of the second sensing patterns.

29. The electronic device of claim 28, wherein:

the first and second sensing patterns and the first and second cross patterns are disposed on different layers from each other; and at least a portion of the first cross pattern overlaps an adjacent second sensing pattern among the second sensing patterns; and at least a portion of the second cross pattern overlaps an adjacent first sensing pattern among the first sensing patterns.

30. The electronic device of claim 28, wherein:

the first and second sensing patterns and the first and second cross patterns are disposed on a same layer as each other; and the first cross pattern is disposed in an opening of adjacent second sensing pattern among the second sensing patterns, and the second cross pattern is disposed in an opening of adjacent first sensing pattern among the first sensing patterns.

31. The electronic device of claim 27, wherein the sensor layer further comprises:

a first crossing trace line connected to one side of a first electrode group of the adjacent second electrode groups; and a second crossing trace line connected to one side of a second electrode group of the adjacent second electrode groups, and the one side of the first electrode group of the adjacent second electrode groups and the one side of the second electrode group of the adjacent second electrode groups are opposite to each other with respect to the first direction.

* * * * *